US007936493B2

(12) United States Patent
Ishida et al.

(10) Patent No.: US 7,936,493 B2
(45) Date of Patent: May 3, 2011

(54) DOT POSITION CORRECTING APPARATUS, OPTICAL SCANNING APPARATUS, IMAGING APPARATUS, AND COLOR IMAGING APPARATUS

(75) Inventors: Masaaki Ishida, Kanagawa (JP); Yasuhiro Nihei, Kanagawa (JP); Atsufumi Omori, Kanagawa (JP); Dan Ozasa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/471,640

(22) Filed: Jun. 21, 2006

(65) Prior Publication Data

US 2006/0285186 A1   Dec. 21, 2006

(30) Foreign Application Priority Data

Jun. 21, 2005  (JP) ................. 2005-180020
Jul. 4, 2005   (JP) ................. 2005-195442
Oct. 25, 2005  (JP) ................. 2005-309244

(51) Int. Cl.
*G02B 26/08* (2006.01)
*G02B 26/10* (2006.01)
*G02B 26/12* (2006.01)

(52) U.S. Cl. ............... 359/204.1; 359/205.1; 359/223.1

(58) Field of Classification Search .......... 359/216–219
See application file for complete search history.

(56) References Cited

U.S. PATENT DOCUMENTS 5,319,393 A    6/1994   Genovese
5,627,670 A *  5/1997   Minoura et al. ............. 359/212
5,703,860 A * 12/1997   Fukunaga et al. ........... 369/102
5,880,766 A *  3/1999   Murakami et al. ........... 347/236
2003/0179428 A1  9/2003  Suzuki et al.
2005/0099489 A1  5/2005  Nihei et al.

FOREIGN PATENT DOCUMENTS

JP    6-115155    4/1994

(Continued)

OTHER PUBLICATIONS

Auxiliary. (2009). In Merriam-Webster Online Dictionary. Retrieved Mar. 18, 2009, from http://www.merriam-webster.com/dictionary/auxiliary.*

(Continued)

Primary Examiner — Stephone B Allen
Assistant Examiner — Jade R Chwasz
(74) Attorney, Agent, or Firm — Oblon, Spivak, McClelland, Maier & Neustadt, L.L.P.

(57) ABSTRACT

An optical scanning apparatus that includes a light source unit having plural main light sources that are two-dimensionally arranged in the main scanning direction and the sub scanning direction, and plural sub light sources that are arranged between rows of the main light sources aligned in the main scanning direction. The optical scanning apparatus also includes an optical system configured to scan light emitted from the light source unit on a scanning object to form an image on the scanning object, and a control apparatus configured to adjust a main scanning direction image position by controlling two of the main light sources that are juxtaposed to each other with respect to the main scanning direction and adjust a sub scanning direction image position by controlling a main light source and a sub light source that are adjacent to each other.

4 Claims, 60 Drawing Sheets

FOREIGN PATENT DOCUMENTS

| | | |
|---|---|---|
| JP | 11-095141 | 4/1999 |
| JP | 2001-272615 | 10/2001 |
| JP | 2001-350111 | 12/2001 |
| JP | 2002-120395 | 4/2002 |
| JP | 2003-72135 | 3/2003 |
| JP | 2003-322811 | 11/2003 |
| JP | 2004-181648 | 7/2004 |
| JP | 2005-104096 | 4/2005 |

OTHER PUBLICATIONS

U.S. Appl. No. 11/512,122, filed Aug. 30, 2006, Omori, et al.
U.S. Appl. No. 12/029,115, filed Feb. 11, 2008, Omori, et al.
U.S. Appl. No. 12/055,666, filed Mar. 26, 2008, Tanabe, et al.
Office Action issued Nov. 10, 2010, in Japan, Patent Application No. 2005-180020, filed Jun. 21, 2005.

* cited by examiner

FIG.8
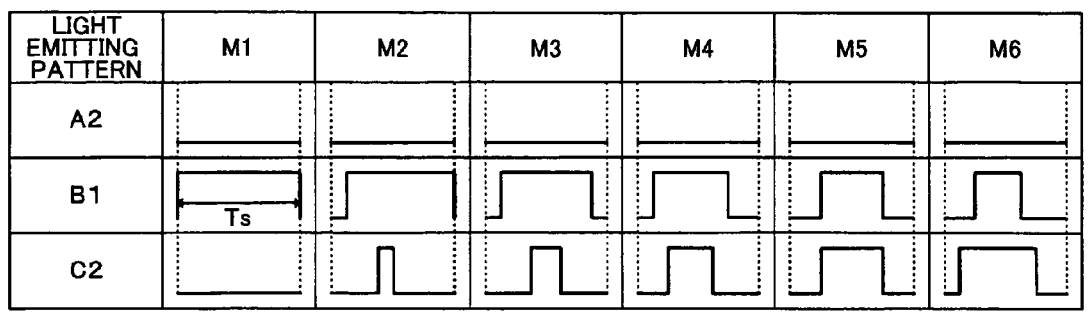
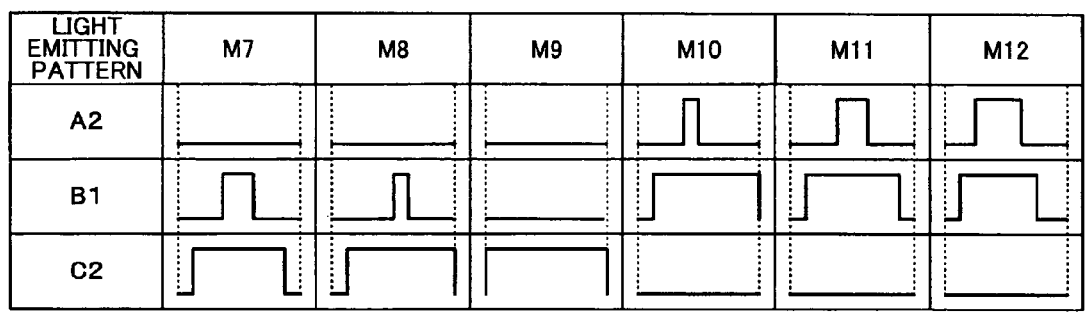
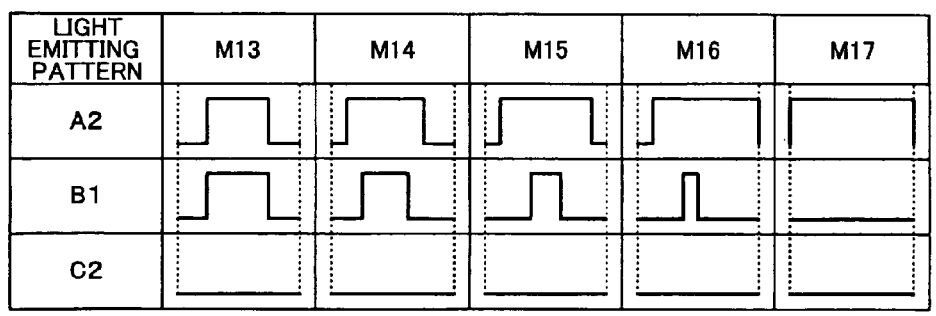

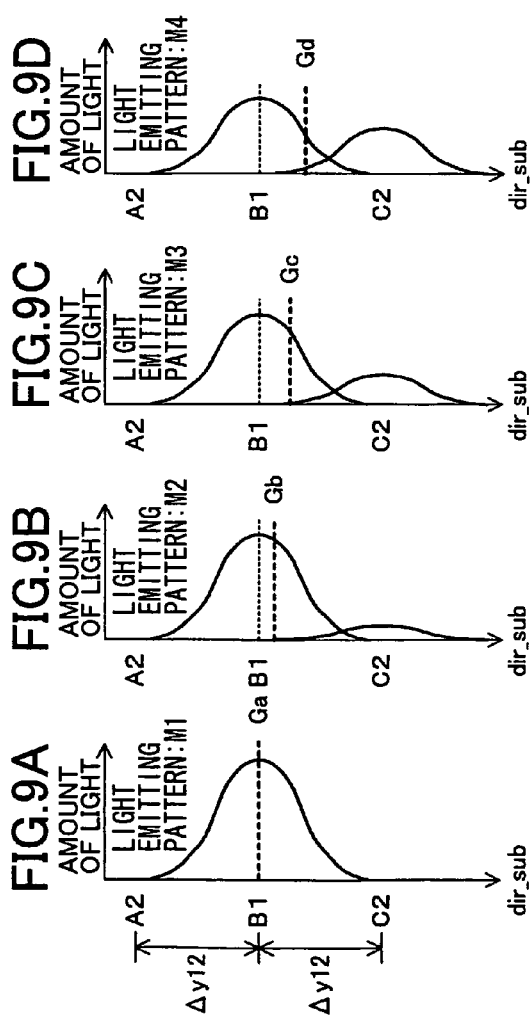
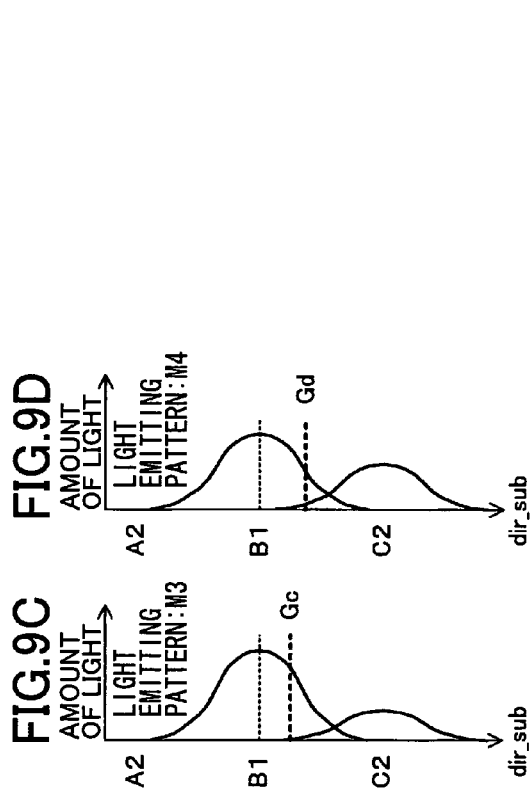
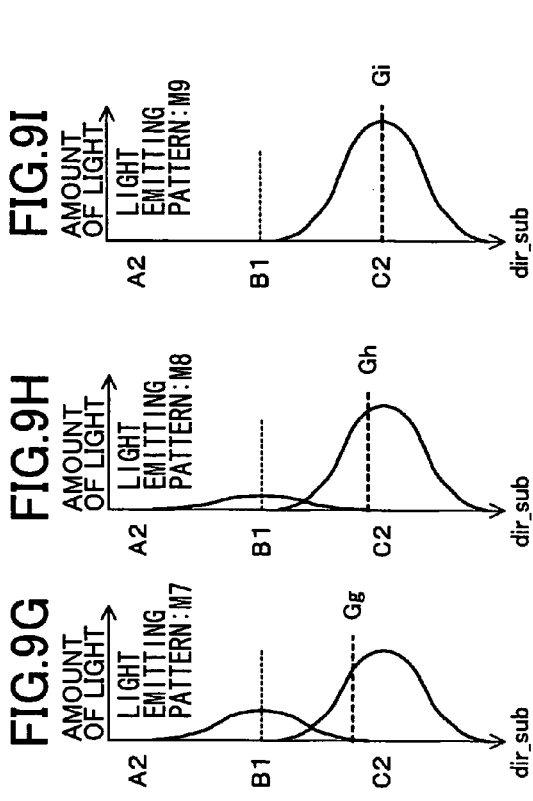

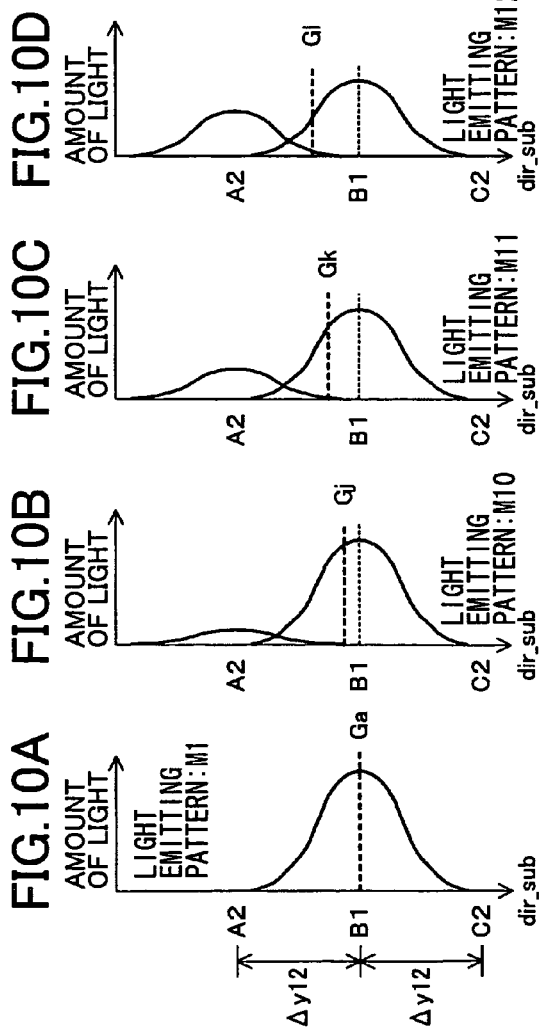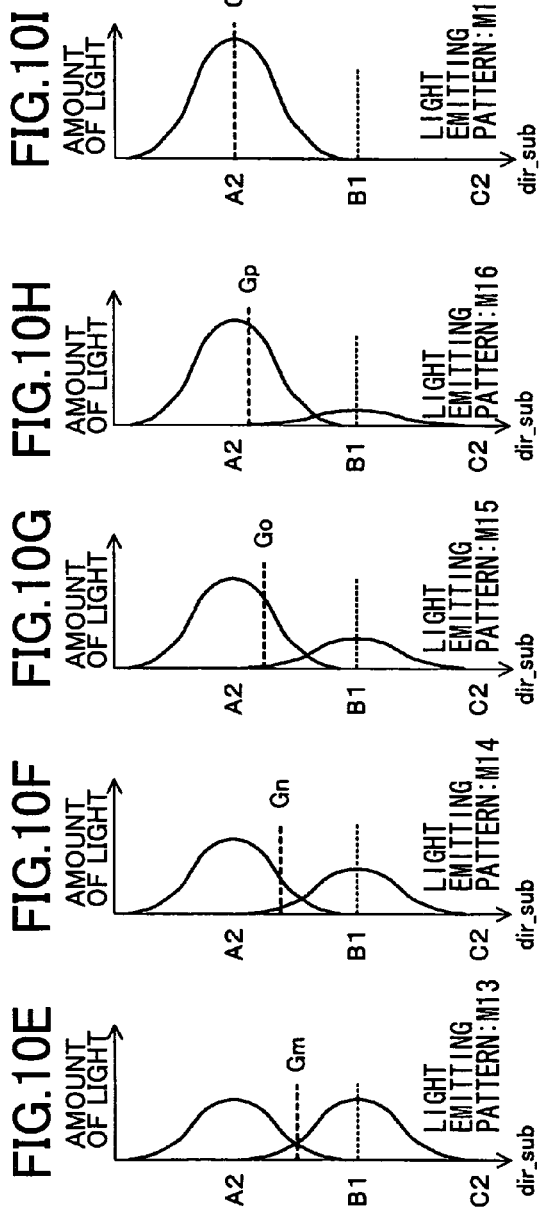

FIG.11A
IMAGE DATA
FIG.11B
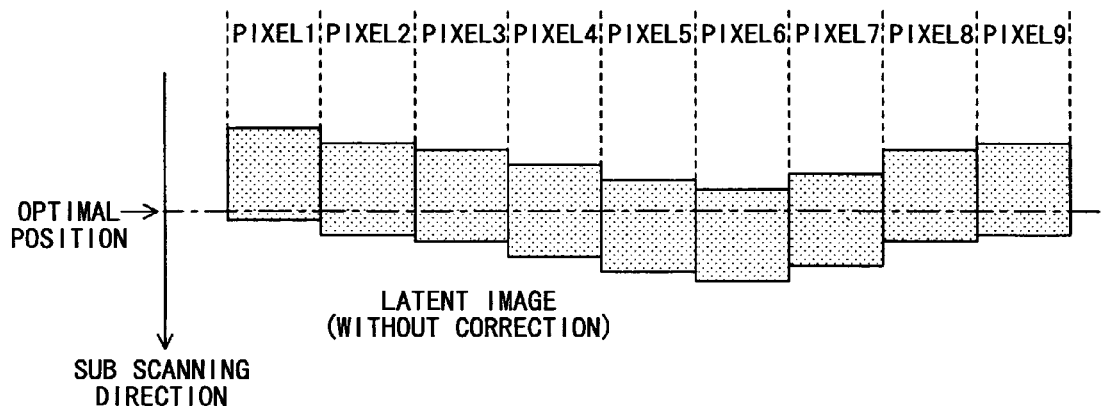
LATENT IMAGE
(WITHOUT CORRECTION)
FIG.11C
|  | PIXEL1 | PIXEL2 | PIXEL3 | PIXEL4 | PIXEL5 | PIXEL6 | PIXEL7 | PIXEL8 | PIXEL9 |
|---|---|---|---|---|---|---|---|---|---|
| LIGHT EMITTING PATTERN | M8 | M6 | M4 | M1 | M12 | M14 | M11 | M4 | M6 |
FIG.11D
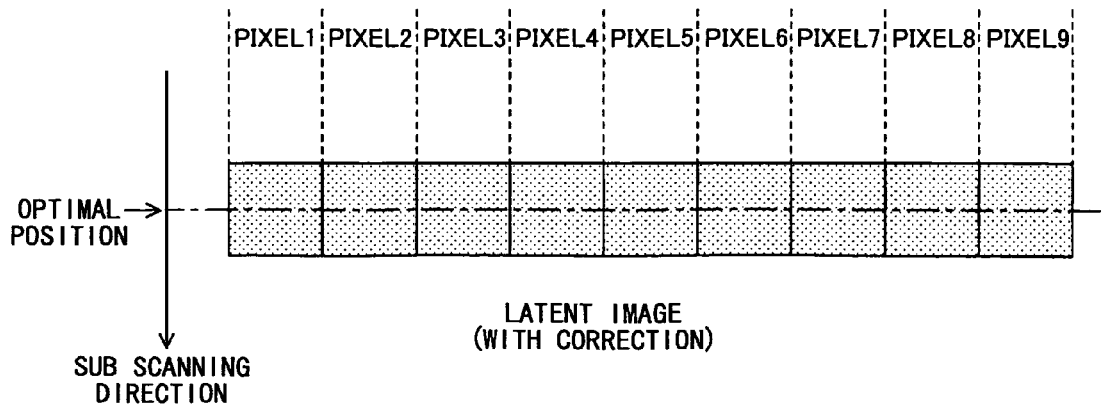
LATENT IMAGE
(WITH CORRECTION)

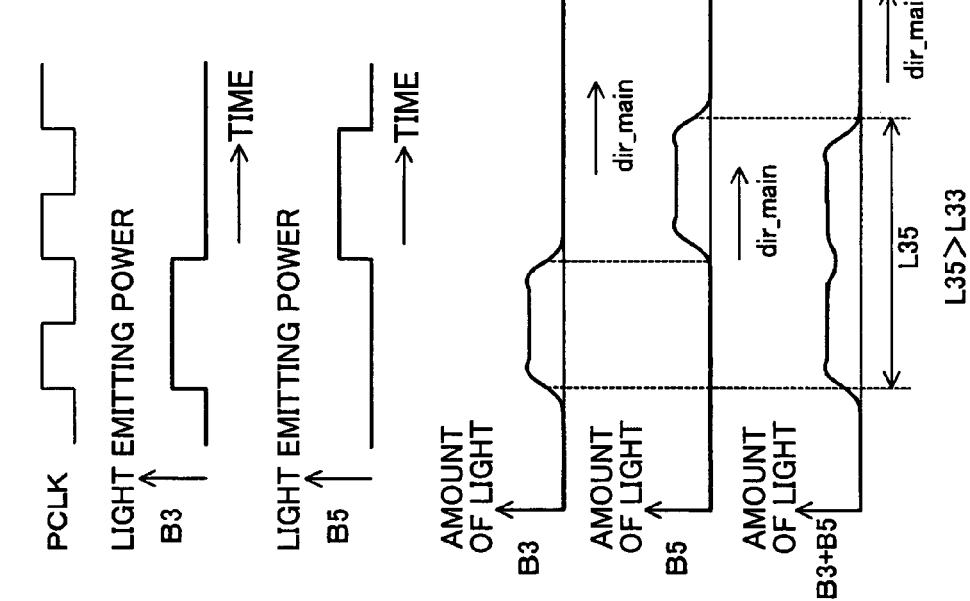
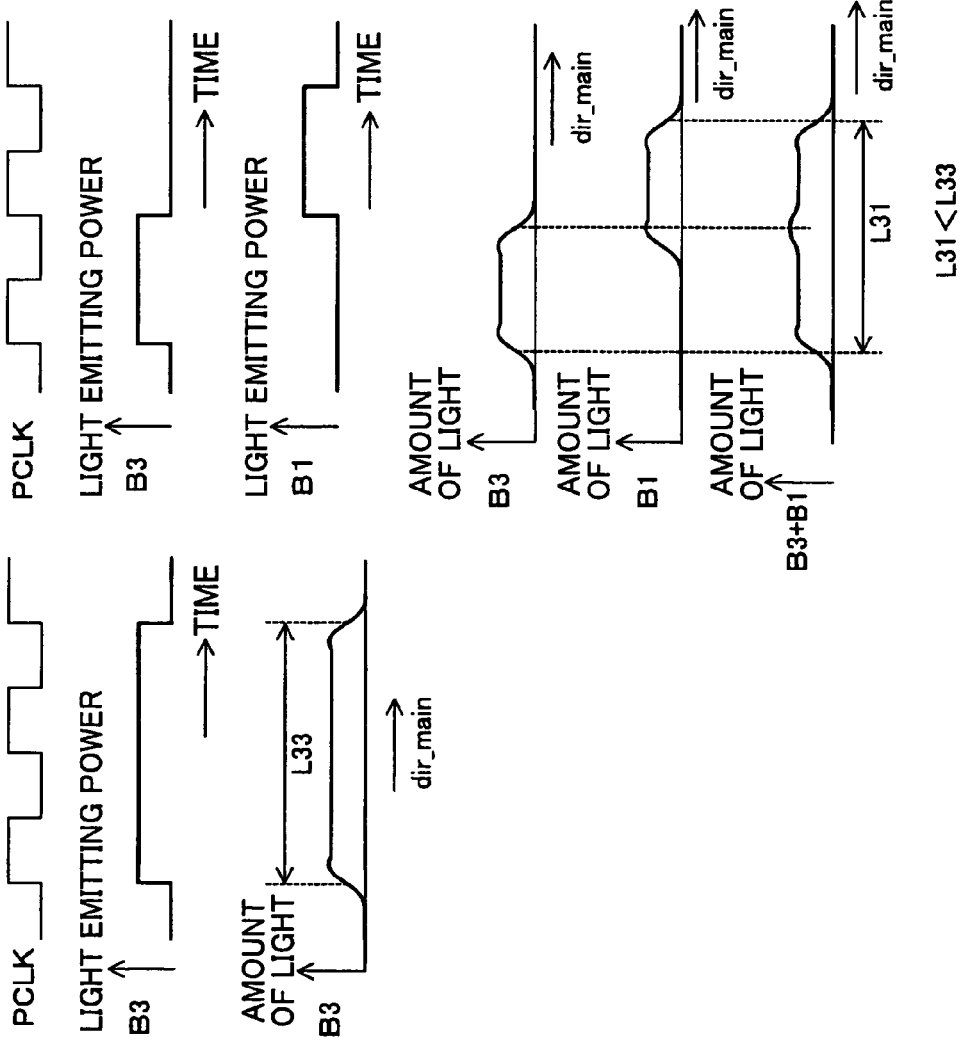

● : MAIN LIGHT SOURCE

○ : SUB LIGHT SOURCE

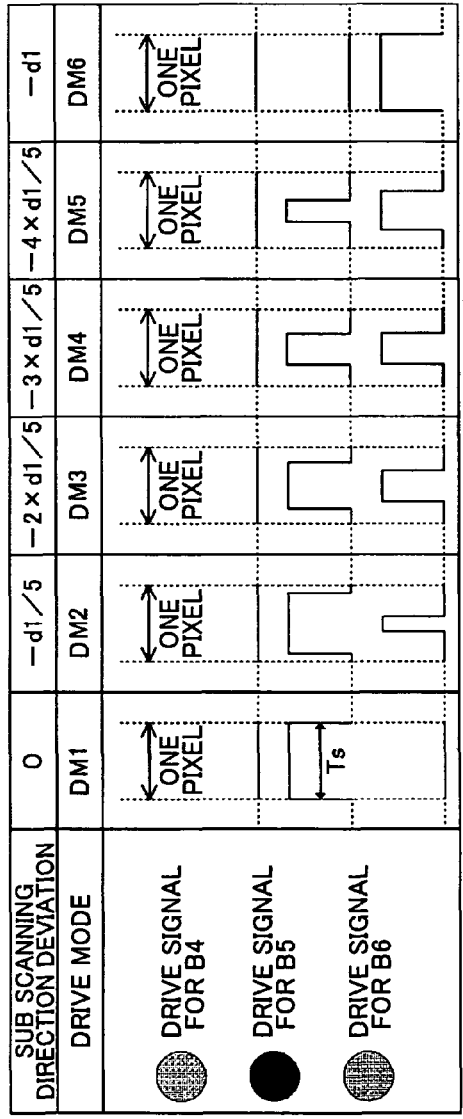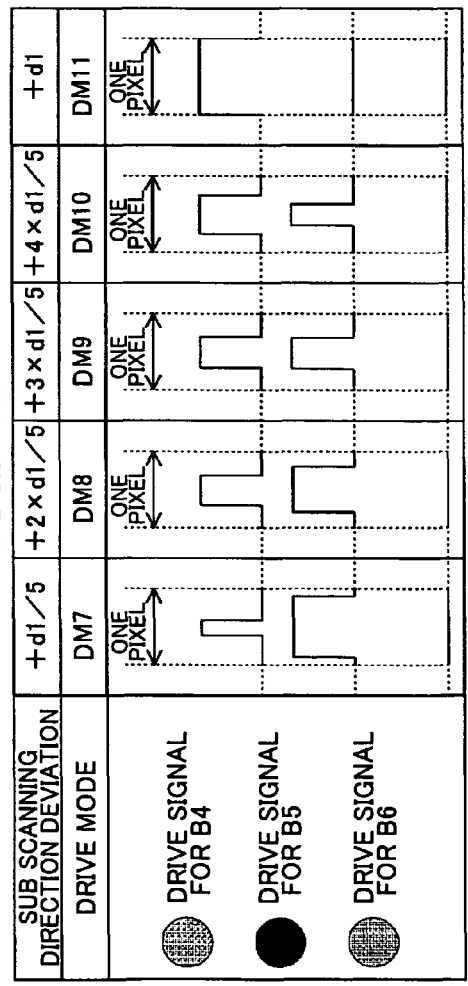

FIG.28A
IMAGE DATA
FIG.28B
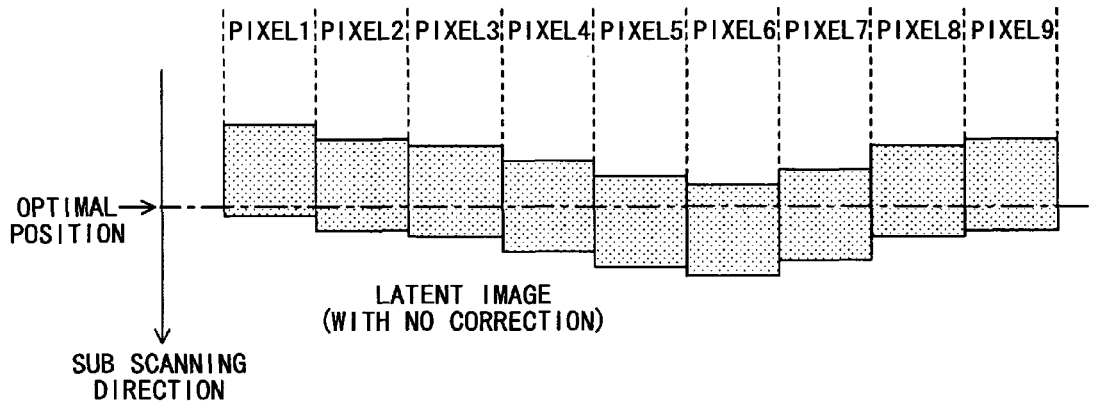
FIG.28C
|  | PIXEL1 | PIXEL2 | PIXEL3 | PIXEL4 | PIXEL5 | PIXEL6 | PIXEL7 | PIXEL8 | PIXEL9 |
|---|---|---|---|---|---|---|---|---|---|
| DRIVE MODE | DM5 | DM4 | DM3 | DM1 | DM8 | DM9 | DM7 | DM3 | DM4 |
FIG.28D
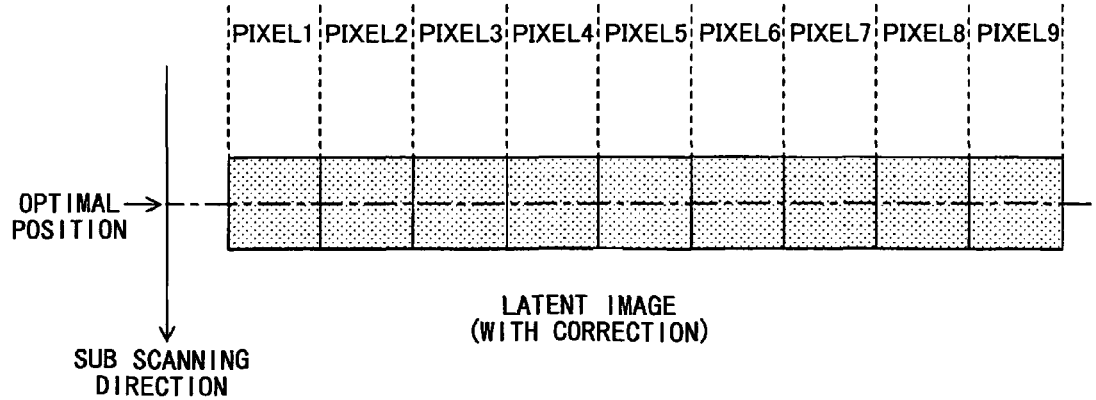

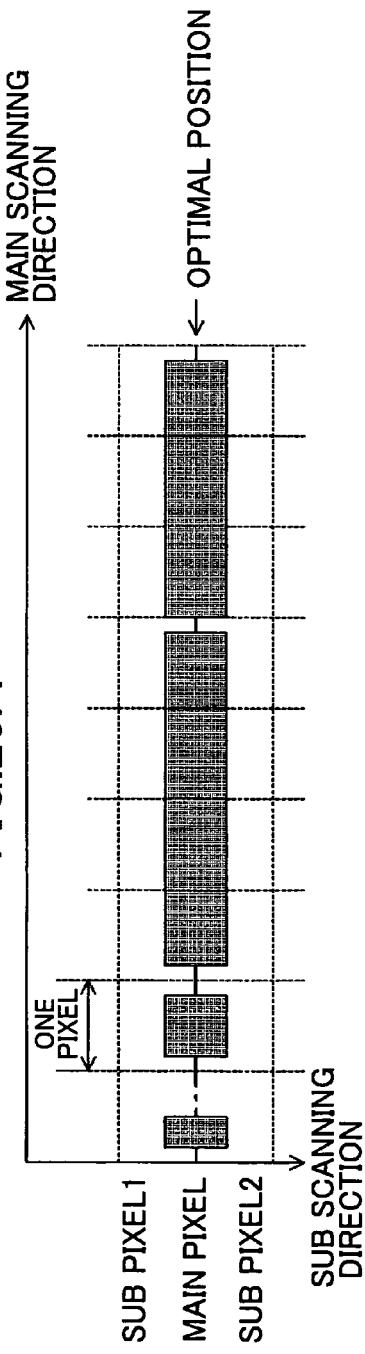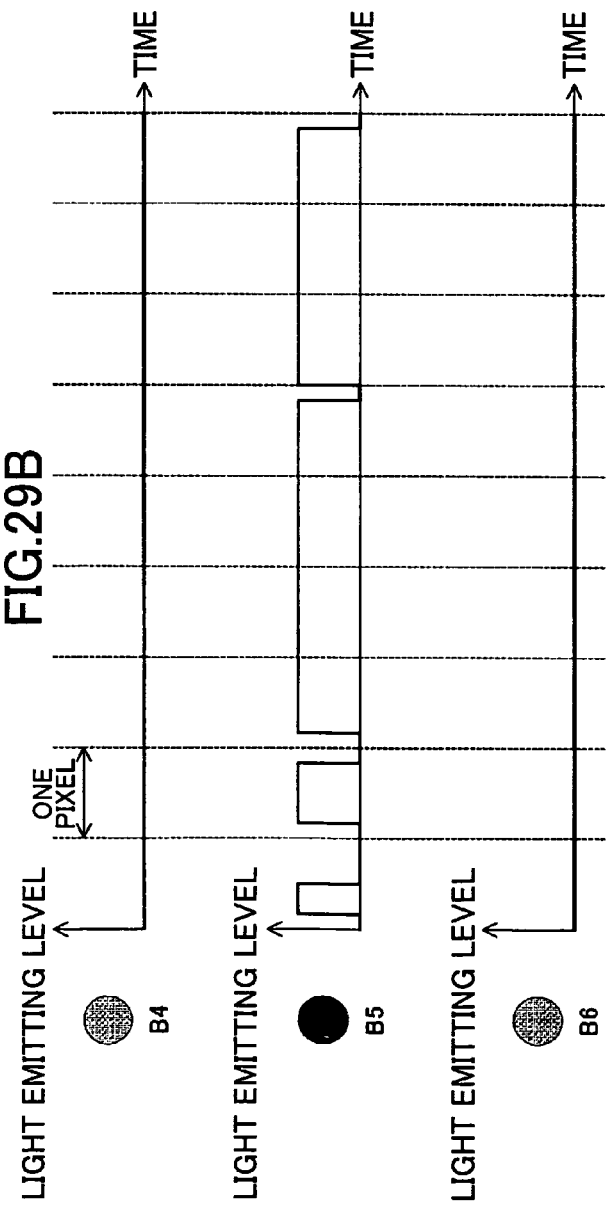

WITHOUT CORRECTION

WITH CORRECTION

FIG.40

| PHASE DATA 3bit | STATUS SIGNAL | CONTROL DATA 1 | CONTROL DATA 2 |
|---|---|---|---|
| 000 | 0 | 010 | 010 |
| 000 | 1 | 010 | 010 |
| 001 | 0 | 010 | 001 |
| 001 | 1 | 001 | 010 |
| 010 | 0 | 001 | 001 |
| 010 | 1 | 001 | 001 |
| 011 | 0 | 001 | 000 |
| 011 | 1 | 000 | 001 |
| 111 | 0 | 011 | 010 |
| 111 | 1 | 010 | 011 |
| 110 | 0 | 011 | 011 |
| 110 | 1 | 011 | 011 |
| 101 | 0 | 100 | 011 |
| 101 | 1 | 011 | 100 |

FIG.44

|  | LIGHT SOURCE A | LIGHT SOURCE B | LIGHT SOURCE C |
|---|---|---|---|
| PATTERN 1 | 0 | 0 | 8 |
| PATTERN 2 | 0 | 1 | 7 |
| PATTERN 3 | 0 | 2 | 6 |
| PATTERN 4 | 0 | 3 | 5 |
| PATTERN 5 | 0 | 4 | 4 |
| PATTERN 6 | 0 | 5 | 3 |
| PATTERN 7 | 0 | 6 | 2 |
| PATTERN 8 | 0 | 8 | 0 |
| PATTERN 9 | 2 | 4 | 2 |
| PATTERN 10 | 2 | 6 | 0 |
| PATTERN 11 | 3 | 5 | 0 |
| PATTERN 12 | 4 | 4 | 0 |
| PATTERN 13 | 5 | 3 | 0 |
| PATTERN 14 | 6 | 2 | 0 |
| PATTERN 15 | 7 | 1 | 0 |
| PATTERN 16 | 8 | 0 | 0 |

| OUTPUT TERMINAL | SHIFT DATA | | | |
|---|---|---|---|---|
| | 00 | 01 | 10 | 11 |
| s1 | Din1 | Din8 | Din1 | Din2 |
| s2 | Din2 | Din1 | Din2 | Din3 |
| s3 | Din3 | Din2 | Din3 | Din4 |
| s4 | Din4 | Din3 | Din4 | Din5 |
| s5 | Din5 | Din4 | Din5 | Din6 |
| s6 | Din6 | Din5 | Din6 | Din7 |
| s7 | Din7 | Din6 | Din7 | Din8 |
| s8 | Din8 | Din7 | Din8 | Din1 |

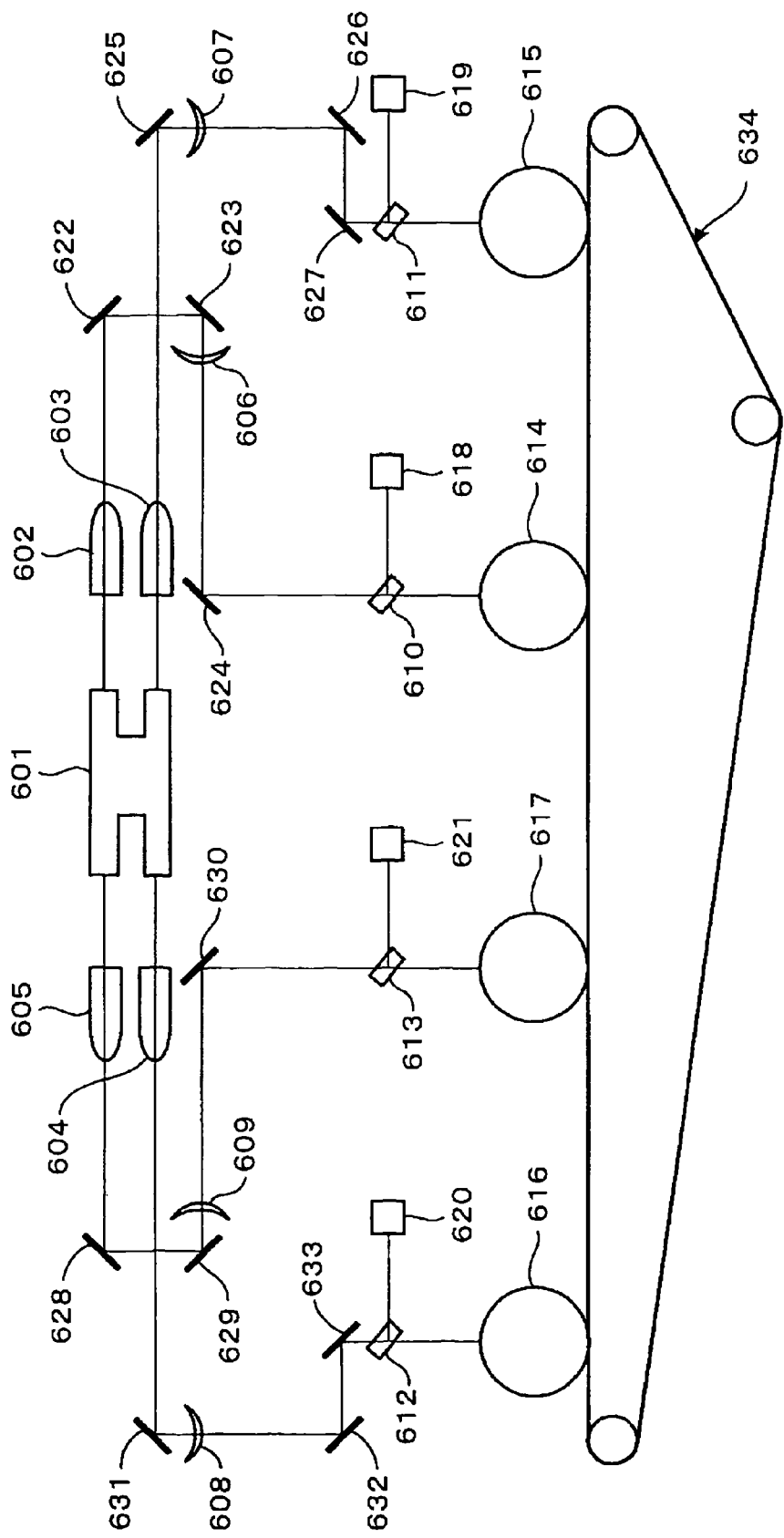

DOT POSITION CORRECTING APPARATUS, OPTICAL SCANNING APPARATUS, IMAGING APPARATUS, AND COLOR IMAGING APPARATUS

BACKGROUND OF THE INVENTION

1. Field of the Invention

The present invention relates to an optical scanning apparatus that is configured to scan light emitted from a light source on a scanning object, and an imaging apparatus that includes such an optical scanning apparatus. The present invention also relates to a dot position correcting apparatus, an optical scanning apparatus, and an imaging apparatus such as a laser printer or a digital copying machine and a color imaging apparatus that use such dot position correcting apparatus and optical scanning apparatus.

2. Description of the Related Art

An imaging apparatus such as a laser printer or a digital copier may be configured to focus light emitted from a light source that is modulated according to image information on a photoconductor (scanning object) via a polygon mirror and a scanning optical system such as a scanning lens, and scan the light on the surface of the photoconductor in a predetermined direction (main scanning direction) to form a latent image (electrostatic image) on the photoconductor. Then, the imaging apparatus may apply toner to the latent image to develop the image.

FIG. 1 is a diagram showing a typical configuration of an optical scanning apparatus used in an imaging apparatus such as a laser printer or a digital copier that performs an electrophotographic imaging process. The optical scanning apparatus 400 shown in FIG. 1 includes a semiconductor laser unit 401 corresponding to a light source, a polygon mirror 402 corresponding to a rotating deflector, a scanning lens (fθ lens) 403, a photoconductor 404 corresponding to a scanning medium, a photodetector 405, a phase synchronizing circuit 406, a clock generating circuit 407, an image processing unit 408, and a laser drive circuit 409, for example. In this optical scanning apparatus 400, laser emitted from the semiconductor laser 401 is deflected and scanned by the polygon mirror 402 to be irradiated on the photoconductor 404 via the scanning lens 403 to form a beam spot, and in turn, the photoconductor 404 is scanned by the beam spot in the main scanning direction to thereby be exposed. The photoconductor 404 is rotated by a drive unit (not shown) and evenly charged by a charger (not shown) after which the laser exposure process as is described is performed so that a latent image is formed on the photoconductor 404. Then, the latent image is developed by a developer (not shown) to form a toner image. The toner image formed on the photoconductor 404 is transferred onto transfer paper by a transfer unit (not shown), and the transferred toner image is fixed to the transfer paper by a fixing unit (not shown) after which the transfer paper with the toner image fixed thereon is discharged.

The photodetector 405 positioned in front of the image forming region of the photoconductor 405 is configured to detect laser being irradiated from the polygon mirror 402 via the scanning lens (fθ lens) 403. The phase synchronizing circuit 406 is configured to generate an image clock (pixel clock) that is set to a phase in synch with an output signal of the photodetector 405 based on a clock output from the clock generating circuit 407 with respect to each line, and supply the generated image clock to the image processing unit 408 and the laser drive circuit 409. The laser drive circuit 409 is configured to control the formation of the latent image on the photoconductor 404 by driving the semiconductor laser unit 401 according to image data generated by the image processing unit 408 and the image clock that is phase-controlled with respect to each line by the phase synchronizing circuit 6, and controlling the semiconductor laser light emitting time of the semiconductor laser unit 401.

In recent years and continuing, with the growing demand for higher printing speed and higher image quality in the imaging apparatus, techniques have been developed for increasing the rotational speed of the polygon mirror, and increasing the frequency of a clock signal (e.g., pixel clock) used for modulating the light from the light source in order to meet such demands, for example. However, the effects of increasing the printing speed obtained by these techniques are limited, and in turn, a so-called multi-beam scheme involving the use of plural light sources has been developed for responding to the demand for a further increase in the printing speed (e.g., see Japanese Laid-Open Patent Publications No. 2001-272615, No. 2003-72135, and No. 2001-350111).

Also it is noted that variations in the distance from the axis of rotation to the deflection reflective surface of a deflector such as the polygon mirror may cause scanning speed variations in the scanning speed of the beam spot (scanning beam) being scanned on a scanning surface. Such scanning speed variations may cause image drifts that may lead to image quality degradation. Thus, scanning deviations have to be corrected in order to obtain high image quality.

In this respect, a light source that emits plural laser beams (multi-beam laser) so that the plural laser beams are irradiated via the scanning lens (fθ lens) to simultaneously scan a scanning surface with respect to the main scanning direction may be used as the semiconductor laser unit in order to respond to the demand for speed increase and improved image quality in the imaging apparatus, for example. By employing the multi-beam optical scanning scheme as is described above, the rotational speed of the polygon mirror corresponding to the deflector and the pixel clock frequency may be reduced so that high-speed and stable optical scanning and imaging may be realized.

It is noted that a laser diode (LD) array made up of plural single beam laser chips or a single laser chip having plural laser elements as light sources may be used as the light source for generating the multi-beam laser. Further, the light source may be a VCSEL (Vertical Cavity Surface Emitting Laser) that emits laser in a vertical direction, for example.

A multi-beam semiconductor laser such as a LD array is small in size and capable of performing direct modulation at high speed using a drive current. Accordingly, such a multi-beam semiconductor laser is currently being widely used as the light source for a laser printer. However, it is noted that the relationship between the drive current of the semiconductor laser and the light output may vary depending on the temperature. Therefore, there may be difficulties in setting the light intensity of the semiconductor laser to a desired value. It is particularly noted that in the case of using a VCSEL (Vertical Cavity Surface Emitting Laser), temperature change and temperature crosstalk may easily occur in response to light emission and light extinction since the distance between the light sources is relatively small, and thereby, the laser may be vulnerable to light intensity fluctuation.

Also, it is noted that in the case of using a multi-beam optical system in which chromatic aberration of a scanning lens is not corrected, exposure position deviations may occur when there are differences in the oscillating wavelength between light sources, and the scanning width of the light sources for scanning spots on a scanning medium may vary depending on each light source. In this case, the scanning width has to be corrected in order to prevent image quality degradation.

For example, Japanese Laid-Open Patent Publication No. 2001-272615 discloses an optical scanning apparatus including plural light sources in a two-dimensional arrangement that scans the surface of a scanning medium by deflecting plural light fluxes with a deflector, the optical scanning device being configured to maximize the density of light emitting points while avoiding influence from crosstalk that may be caused by heat generated between the light emitting points.

Japanese Laid-Open Patent Publication No. 2003-72135 discloses an imaging apparatus with a surface-emitting laser which imaging apparatus includes means for varying the light intensity of each laser chip in pixel units and means for controlling the light emitting time to thereby control the electrostatic latent images of the pixels.

Japanese Laid-Open Patent Publication No. 2001-350111 discloses an imaging apparatus with a surface-emitting laser which imaging apparatus adjusts the arrangement of light sources to prevent the occurrence of heat stroke and realize high density image recording at the same time.

It is noted that in a typical optical scanning apparatus that uses a light source unit having plural light sources such as a surface-emitting laser, each light source is configured to form one pixel, and thereby, variations in the light emitting levels of the light sources may directly lead to variations in image density. It is particularly noted that measures for correcting variations of pixels with respect to the sub scanning direction do not exist.

Also, in a case where one light source is degraded, the reduction in the light emitting level of the degraded light source directly leads to a decrease in image density.

Also, deviations in the scanning position of a beam spot (scanning beam) scanned on a photoconductor and variations in the scanning speed may occur due to face tangle errors of the polygon mirror and variations in the distance from the rotational axis of the polygon mirror to its deflection reflective surface, for example. Such scanning position deviations and scanning speed variations may cause degradation of image quality.

As is described above, there is an increasing demand for higher image quality in response to the dramatic increase in the resolution of the digital camera, for example; however the apparatuses disclosed in the above references cannot adequately satisfy such a demand for higher image quality without increasing manufacturing costs. It is particularly noted that the demand for higher image quality cannot be adequately satisfied by the above-disclosed apparatuses owing to the fact that pixel position deviations with respect to the sub scanning direction are not properly taken into account.

SUMMARY OF THE INVENTION

According to an embodiment of the present invention, an optical scanning apparatus is provided that is capable of accurately scanning light on a scanning object without causing cost increase.

According to another embodiment of the present invention, an imaging apparatus is provided that is capable of forming a high quality image without causing cost increase.

According to another embodiment of the present invention, an optical scanning apparatus is provided that is capable of accurately scanning plural light beams from a light source unit on a scanning object.

According to another embodiment of the present invention, an imaging apparatus is provided that is capable of forming a high quality image at high speed.

According to another embodiment of the present invention, a dot position correcting apparatus, an optical scanning apparatus, an imaging apparatus, and a color imaging apparatus are provided that are capable of performing high-speed and accurate optical scanning, scanning deviation correction, scanning width correction, and correction of even relatively wide-range fluctuations with respect to linearity.

According to a first specific embodiment of the present invention, an optical scanning apparatus is provided that includes:

a light source unit including plural main light sources and plural sub light sources, the main light sources being two-dimensionally arranged in the main scanning direction and the sub scanning direction, and the sub light sources being arranged between rows of the main light sources which rows are aligned in the main scanning direction;

an optical system configured to scan light emitted from the light source unit on a scanning object and form an image on the scanning object; and a control apparatus configured to adjust a main scanning direction image position by controlling two main light sources that are juxtaposed to each other with respect to the main scanning direction, and adjust a sub scanning direction image position by controlling a main light source and a sub light source that are adjacent to each other.

In one aspect of the present embodiment, image position deviations in the main scanning direction and the sub scanning direction may be accurately corrected, and light may be accurately scanned on the scanning object without causing cost increase.

According to a second specific embodiment of the present invention, an imaging apparatus is provided that includes:

a scanning object;

an optical scanning apparatus according to an embodiment of the present invention that is configured to scan light containing image information on the scanning object and form a corresponding image on the scanning object; and a transfer apparatus that is configured to transfer the corresponding image formed on the scanning object on a transferring object.

In one aspect of the present embodiment, by including an optical scanning apparatus according to an embodiment of the present invention, a high-quality image may be formed without causing cost increase.

According to a third specific embodiment of the present invention, an optical scanning apparatus is provided that scans light including image information on a scanning object and forms an image on the scanning object, the optical scanning apparatus including:

a light source unit including a plurality of light sources which light sources are two-dimensionally arranged in the sub scanning direction and the main scanning direction, the light sources including a plurality of main light sources configured to form a plurality of main pixels on the scanning object and at least one auxiliary light source configured to correct a positional deviation with respect to the sub scanning direction of at least one main pixel of the main pixels; and a signal generating circuit configured to generate a plurality of main light source control signals for the main light sources based on the image information, and an auxiliary light source control signal for the auxiliary light source based on positional deviation information pertaining to the positional deviation of the main pixel, the auxiliary light source control signal being generated when an amount of the positional deviation of the main pixel is greater than or equal to a single pixel size.

In one aspect of the present embodiment, when scanning light including image information emitted from the light unit made up of plural light sources on a scanning object, control signals for plural main light sources configured to form main pixels on the scanning object are generated by the signal generating circuit based on the image information, and at the same time, a control signal for at least one auxiliary light source is generated by the signal generating circuit based on positional deviation information pertaining to positional deviation with respect to the sub scanning direction that exceeds the size of one pixel so that the positional deviation may be corrected. In this way, positional deviation with respect to the sub scanning direction may be corrected upon scanning the light from the plural light sources on the scanning object. Accordingly, plural sets of light emitted from the light source unit may be accurately scanned on the scanning object.

According to a fourth specific embodiment of the present invention, an optical scanning apparatus is provided that scans light including image information on a scanning object and forms an image on the scanning object, the optical scanning apparatus including:

a light source unit including a plurality of light sources which light sources include a plurality of main light sources and at least one auxiliary light source, the main light sources being used for forming a plurality of main pixels on the scanning object according to the image information, and the auxiliary light source being used for correcting a positional deviation with respect to a sub scanning direction of at least one main pixel of the main pixels when an amount of the positional deviation of the main pixel is greater than or equal to a single pixel size; and a signal generating circuit configured to generate an auxiliary light source control signal for the auxiliary light source based on positional deviation information pertaining to the positional deviation of the main pixel with respect to the sub scanning direction when the amount of the positional deviation of the main pixel is greater than or equal to the single pixel size.

In one aspect of the present embodiment, when scanning light including image information emitted from a light source unit having plural light sources, a control signal for at least one auxiliary light source is generated by the signal generating circuit based on positional deviation information pertaining to positional deviation of a main pixel with respect to the sub scanning direction that exceeds the size of one pixel so that the positional deviation of the main pixel with respect to the sub scanning direction that exceeds the size of one pixel may be corrected. In this way, the positional deviation with respect to the sub scanning direction may be corrected upon scanning light from plural light sources on a scanning object. Accordingly, plural sets of light emitted from the light source unit may be accurately scanned on the scanning object.

According to a fifth embodiment of the present invention, an imaging apparatus is provided that includes:

a scanning object;

a scanning apparatus according to an embodiment of the present invention that is configured to scan light including image information on the scanning object and form an image on the scanning object; and a transfer apparatus configured to transfer the image formed on the scanning object onto a transferring object.

In one aspect of the present embodiment, since a scanning apparatus according to an embodiment of the present invention that is capable of accurately scanning plural sets of light from the light source unit on the scanning object is included, a high quality image may be formed at high speed.

According to a sixth specific embodiment of the present invention, a dot position correcting apparatus is provided that includes:

a pixel clock generating unit including a high frequency clock generating unit that generates a high frequency clock;

a control data generating unit that generates first control data and second control data based on phase data representing a pixel clock phase shift amount and a status signal representing a pixel clock status;

a first clock generating unit that generates a first clock based on the high frequency clock and the first control data;

a second clock generating unit that generates a second clock based on the high frequency clock and the second control data; and a clock selecting unit that outputs one of the first clock and the second clock as a pixel clock;

wherein the first clock generating unit includes a first detecting unit that detects a transition of the first clock;

a first control signal generating unit that generates a first control signal based on an output of the first detecting unit and the first control data; and a first signal transitioning unit that transitions a signal at a first transition timing of the high frequency clock based on the first control signal and outputs the transitioned signal as the first clock;

a main scanning direction dot position correcting unit configured to perform dot position correction with respect to a main scanning direction based on the pixel clock phase shift amount of the pixel clock generated by the pixel clock generating unit; and a sub scanning direction dot position correcting unit configured to perform dot position correction in a sub scanning direction by controlling light emission of a light source unit that is configured to scan plural light beams on a scanning medium along the main scanning direction through a deflector, the light source unit including plural main light sources and plural sub light sources that are configured to scan the light beams along differing scanning lines;

wherein light emitting timings of the main light sources and the sub light sources are based on the pixel clock generated by the pixel clock generating unit.

According to a seventh specific embodiment of the present invention, an optical scanning apparatus that forms an image by scanning plural light beams emitted from a light source unit on a scanning medium through a deflector is provided, the optical scanning apparatus including the dot position correcting apparatus according to an embodiment of the present invention.

According to an eighth specific embodiment of the present invention, an imaging apparatus is provided that includes the dot position correcting apparatus or the optical scanning apparatus according to an embodiment of the present invention.

According to a ninth specific embodiment of the present invention, a color imaging apparatus that forms a color image by overlaying plural images in different colors is provided, the color imaging apparatus including the dot position correcting apparatus or the optical scanning apparatus according to an embodiment of the present invention that is configured to perform dot position correction on the images in different colors using dot position deviation information pertaining to an image of a predetermined color of the different colors as a reference.

According to a tenth specific embodiment of the present invention, a color imaging apparatus that forms a color image is provided, the color imaging apparatus including plural imaging systems each including the dot position correcting apparatus or the optical scanning apparatus according to an embodiment of the present invention.

BRIEF DESCRIPTION OF THE DRAWINGS

FIG. 8 is a table showing different types of light emitting patterns used for correcting sub scanning direction deviations;

FIGS. 9A-9I are diagrams illustrating the different types of light emitting patterns for correcting sub scanning direction deviations in the negative direction;

FIGS. 10A-10I are diagrams illustrating the different types of light emitting patterns for correcting sub scanning direction deviations in the positive direction;

FIGS. 11A-11D are diagrams illustrating an example of correcting sub scanning direction deviations;

FIGS. 12A-12C are diagrams illustrating an example of correcting a pixel width with respect to the main scanning direction;

FIGS. 25A and 25B are tables showing different types of drive modes to be employed for correcting sub scanning direction deviations;

FIGS. 28A-28D are diagrams illustrating an exemplary case of correcting sub scanning direction deviations using the drive modes;

FIGS. 29A and 29B are diagrams illustrating an exemplary case in which the sub scanning direction deviations of pixels are within a permissible range;

FIG. 40 is a table showing a relationship between phase data, status signals, and control data of the pixel clock generating circuit of FIG. 39;

FIG. 44 is a table showing patterns of supplying image data to plural light sources;

FIG. 64 is a diagram showing an exemplary configuration of a tandem color imaging apparatus as a color imaging apparatus according to an embodiment of the present invention.

DESCRIPTION OF THE PREFERRED EMBODIMENTS

In the following, preferred embodiments of the present invention are described with reference to the accompanying drawings.

Figure 1:
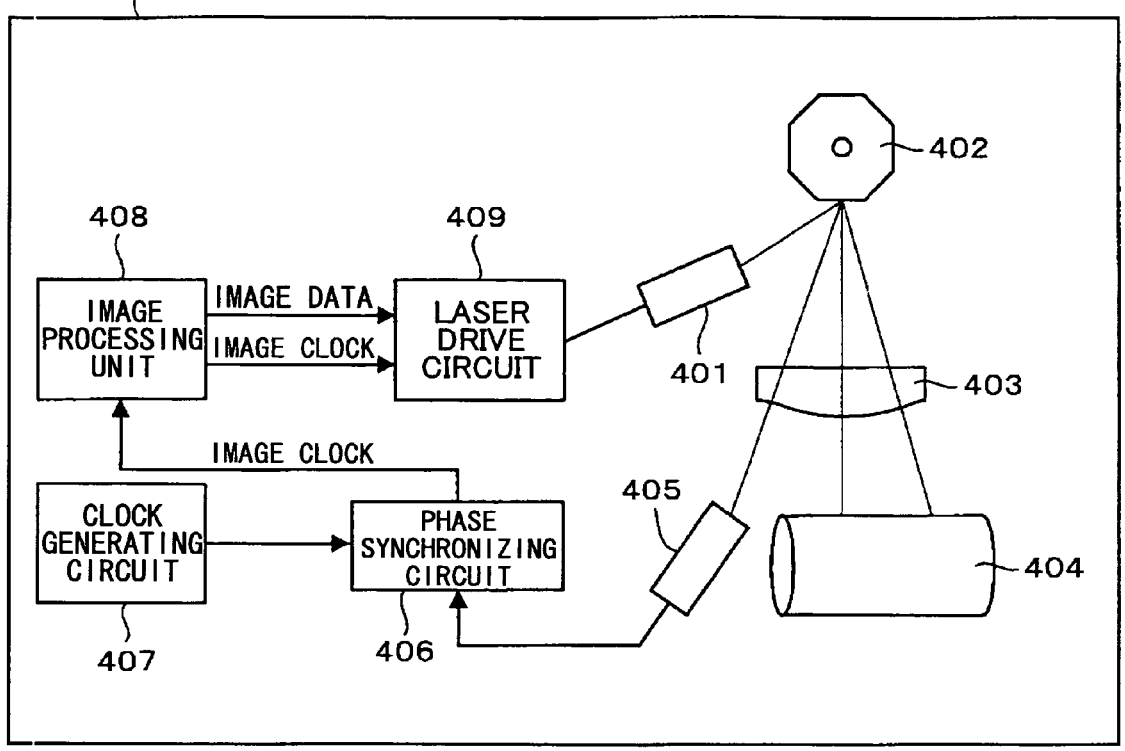
FIG. 1 is a diagram showing an exemplary configuration of an optical scanning apparatus.
Figure 2:
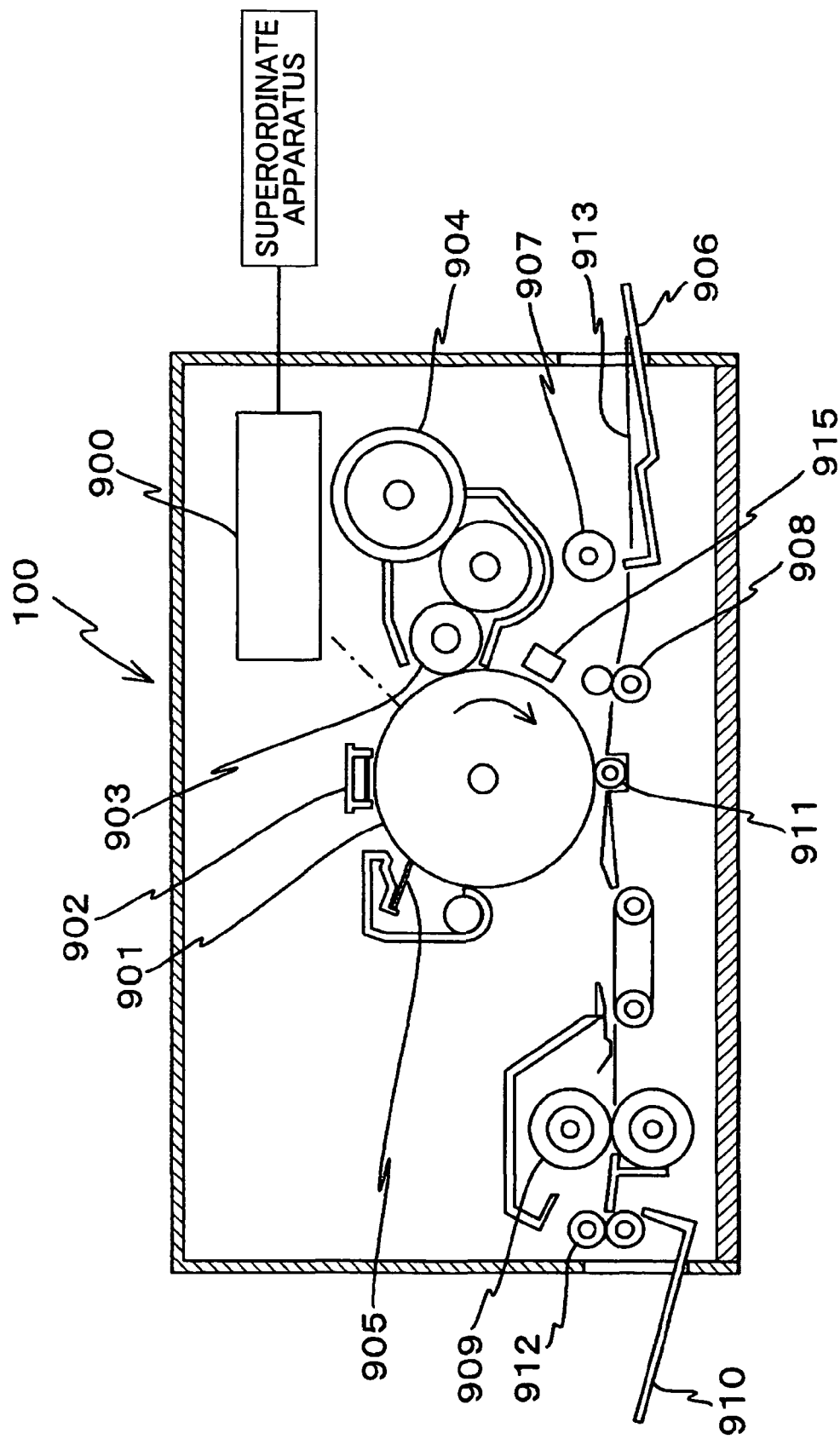
FIG. 2 is a diagram showing a configuration of a laser printer as an embodiment of an imaging apparatus according to the present invention.

FIG. 2 is a diagram showing a configuration of a laser printer 100 as an imaging apparatus according to an embodiment of the present invention.

The laser printer 100 shown in FIG. 2 includes an optical scanning apparatus 900, a photoconductor drum 901, a charger 902, a developing roller 903, a toner cartridge 904, a cleaning blade 905, a paper feeding tray 906, a paper feeding roller 907, a resist roller pair 908, a transfer roller 911, a fixing roller 909, a paper delivery tray 910, and a pixel position detector (positional deviation sensor) 915, for example.

The charger 902, the developing roller 903, the transfer roller 911, and the cleaning blade 905 are arranged near the surface of the photoconductor drum 901. Specifically, the charger 902, the developing roller 903, the transfer roller 911, and the cleaning blade 905 are arranged in this order along the rotating direction of the photoconductor drum 901.

It is noted that a photoconductive layer is arranged on the surface of the photoconductor drum 901. In the illustrated example, the photoconductor drum 901 is configured to rotate in the clockwise direction (see arrow shown in FIG. 2).

The charger 902 is configured to evenly charge the surface of the photoconductor drum 901.

The optical scanning apparatus 900 is configured to irradiate light from a superordinate apparatus (e.g., personal computer) that is modulated based on image information on the surface of the photoconductor drum 901 that is charged by the charger 902. It is noted that the electric charge is drained away from portions of the surface of the photoconductor drum 901 on which light is irradiated by the optical scanning apparatus 900 so that the irradiated portions become neutralized. In this way, a latent image corresponding to the image information is formed on the surface of the photoconductor drum 901. The latent image is then moved toward the developing roller 903 in sync with the rotation of the photoconductor drum 901. It is noted that in the following descriptions, the direction extending along the longer side of the photoconductor drum 901 (i.e., direction extending parallel to the rotational axis of the photoconductor drum 901) is referred to as 'main scanning direction', and the rotating direction of the photoconductor drum 901 is referred to as 'sub scanning direction'. Also, in the following descriptions, the length with respect to the main scanning direction of a pixel of a latent image formed on the surface of the photoconductor drum 901 is referred to as 'pixel width'.

The toner cartridge 904 is configured to store toner to be supplied to the developing roller 903. The amount of toner stored in the toner cartridge 904 may be checked when the power of the laser printer 100 is turned on or when printing is completed, for example. When the amount of toner remaining in the toner cartridge is small, a message may be displayed on a display unit (not shown) signaling that the toner cartridge should be replaced, for example.

With the rotation of the developing roller 903, toner supplied from the toner cartridge 904 is evenly applied to the surface of the developing roller 903. It is noted that a voltage is applied to the developing roller 903 so that opposite electric fields may be generated between a charged portion (portion that is not irradiated with light) and a non-charged portion (portion that is irradiated with light) of the photoconductor drum 901. By applying such a voltage to the developing roller 903, the toner adhered to the surface of the developing roller 903 is only applied to the irradiated portion of the photoconductor drum 901. Specifically, the developing roller 903 only applies toner to the latent image formed on the surface of the photoconductor drum 901 to thereby develop the corresponding image information. Then, the latent image with the toner adhered thereto is moved toward the transfer roller 911 in sync with the rotation of the photoconductor drum 901.

The paper feeding tray 906 is configured to accommodate recording paper 913 as a medium on which the developed image may be transferred. The paper feeding roller 907 is disposed close to the paper feeding tray 906 and is configured to extract the recording paper 913 one by one from the paper feeding tray 906 and convey the recording paper 913 between the pair of resist rollers 908. The pair of resist rollers 908 is disposed close to the transfer roller 911 and is configured to temporarily hold the recording paper 913 that is extracted by the paper feeding roller 907, and convey the recording paper 913 toward a gap portion between the photoconductor drum 901 and the transfer roller 911 in sync with the rotation of the photoconductor drum 901.

The transfer roller 911 is applied a voltage having an opposite polarity with respect to the polarity of the toner in order to electrically attract the toner onto the surface of the photoconductor drum 901. By applying such a voltage to the transfer roller 911, the image formed on the surface of the photoconductor drum 901 may be transferred to the recording paper 913. Then, the recording paper 913 with the image transferred thereto is conveyed to the fixing roller 909.

At the fixing roller 909, heat and pressure are applied to the recording paper 913, and in this way, the toner on the recording paper 913 may be fixed. Then, the recording paper 913 with the toner image fixed thereto is conveyed to the delivery tray 910 via the delivery roller 912.

The cleaning blade 905 is configured to remove toner remaining on the surface of the photoconductor drum 901 (residual toner). It is noted that the removed residual toner may be reused. Then, the surface of the photoconductor drum 901 from which the residual toner is removed is moved back to its initial position by the charger 902.

The pixel position detector (positional deviation sensor) 915 is disposed near the photoconductor drum 901, and is configured to detect the position of a pixel formed on the photoconductor drum 901 and output a signal including positional deviation information of the pixel.

First Embodiment

Figure 3:
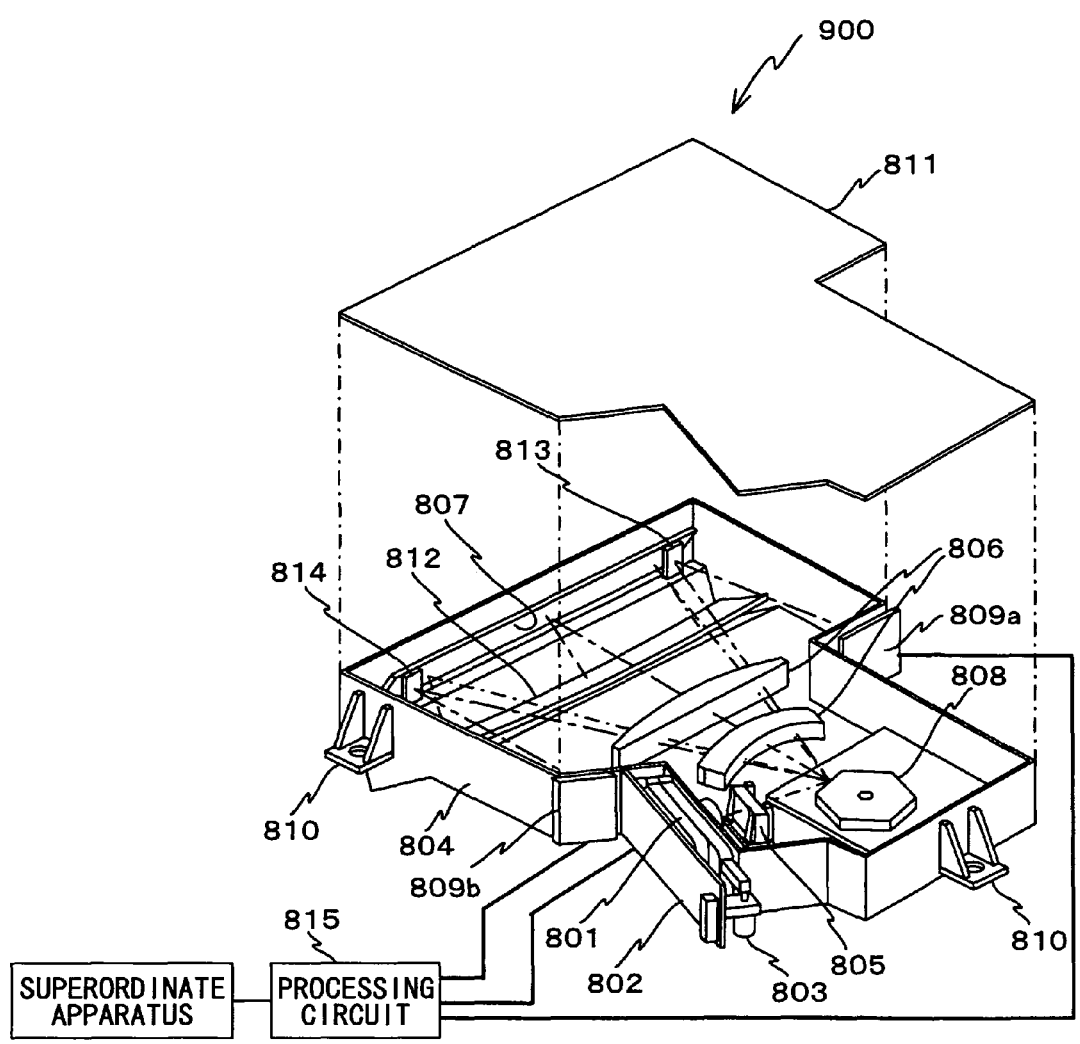
FIG. 3 is a diagram showing an exemplary configuration an optical scanning apparatus included in the laser printer of FIG. 2 according to a first embodiment of the present invention.

In the following, an exemplary configuration of the optical scanning apparatus 900 according to a first embodiment of the present invention is described with reference to FIGS. 2 and 3.

According to the present embodiment, the optical scanning apparatus 900 includes a light source unit 801, a collimating lens CL, a cylinder lens 805, polygon mirror 808, a polygon mirror motor (not shown) that rotates the polygon mirror 808, a fθ lens 806, a retro-reflection mirror 807, a toroidal lens 812, two reflection mirrors 813 and 814, a printed substrate 802, two PD substrates 809a and 809b, and a processing circuit 815, for example. It is noted that the collimating lens CL, the cylinder lens 805, the polygon mirror 808, the fθ lens 806, the retro-reflection mirror 807, and the toroidal lens 812 comprising an optical system that is arranged along a light path extending from the optical light unit 801 to the photoconductor drum 901 is also referred to as 'scanning optical system' hereinafter.

Figure 5:
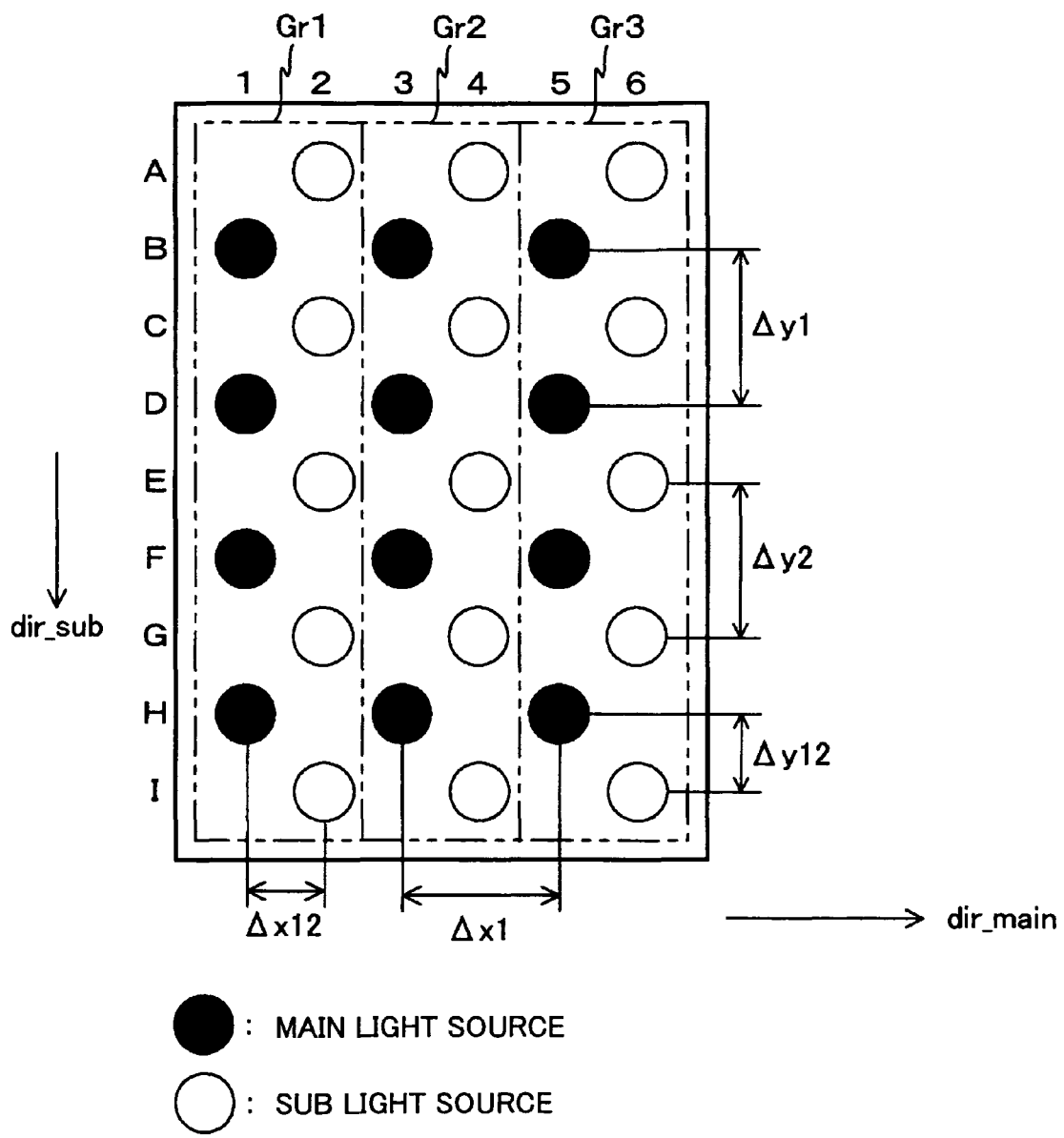
FIG. 5 is a diagram showing an exemplary configuration of a semiconductor laser included in the optical scanning apparatus of the first embodiment.

The light source unit 801 includes a coherent light source such as a semiconductor laser LD that irradiates laser light modulated according to image information on the polygon mirror 808. FIG. 5 is a diagram showing an exemplary configuration of the semiconductor laser LD used in the present embodiment. According to the example of FIG. 5, the semiconductor laser LD corresponds to the so-called VCSEL (Vertical Cavity Surface Emitting Laser). The illustrated semiconductor laser LD includes twenty-seven light emitting elements having substantially the same light emitting characteristics.

In the present example, the twenty-seven light emitting elements are two-dimensionally arranged in a direction corresponding to the sub scanning direction (referred to as 'dir_sub' hereinafter) and a direction corresponding to the main scanning direction (referred to as 'dir_main' hereinafter) to realize a lattice arrangement. Specifically, in the present example, the light emitting elements are arranged into nine rows extending in the direction dir_main (see rows A-I in FIG. 5) and six lines extending in the direction dir_sub (see lines 1-6 in FIG. 5). In the following descriptions, the light emitting element arranged on row B in the direction dir_main and line 3 in the direction dir_sub is referred to as light emitting element B3, and the light emitting element arranged on row F in the direction dir_main and line 6 in the direction dir_sub is referred to as light emitting element F6, for example. Also, the direction extending toward the right side of FIG. 5 is referred to as direction +dir_main, and the direction extending toward the lower side of FIG. 5 is referred to as direction +dir_sub. Also, it is noted that the twenty-seven light emitting elements are arranged to be equidistant from each other.

In the present example, the light emitting elements B1, B3, B5, D1, D3, D5, F1, F3, F5, H1, H3, and H5 correspond to main light sources used for generating the so-called main pixels. The light emitting elements A2, A4, A6, C2, C4, C6, E2, E4, E6, G2, G4, G6, I2, I4, and I6 correspond to sub light sources used for generating the so-called sub pixels. The light source unit 801 of the present example includes twelve main light sources (i.e., B1, B3, B5, D1, D3, D5, F1, F3, F5, H1, H3, and H5) that are two-dimensionally arranged in the directions dir_main and dir_sub, and nine sub light sources (i.e., C2, C4, C6, E2, E4, E6, G2, G4, and G6) that are arranged between rows of the main light sources aligned in the direction dir_main. In the following descriptions, the main light source and the sub light source may simply be referred to as 'light source' when no distinction is made between the two types of light sources. Also, the distance between adjacent main light sources with respect to the direction dir_sub is denoted as $\Delta y1$, the distance between adjacent sub light sources with respect to the direction dir_sub is denoted as $\Delta y2$, and the distance with respect to the direction dir_sub between a main light source and a sub light source that are adjacent to each other is denoted as $\Delta y12$. In the present example, the condition $\Delta y1=\Delta y2=\Delta y12$ is satisfied. Also, the distance between adjacent main light sources with respect to the direction dir_main is denoted as $\Delta x1$, the distance between adjacent sub light sources with respect to the direction dir_main is denoted as $\Delta x2$, the distance with respect to the direction dir_main between a main light source and a sub light source that are adjacent to each other is denoted as $\Delta x12$, and the condition $\Delta x1=\Delta x2=\Delta x12$ is satisfied.

In the present example, the group of light emitting elements consisting of the four main light sources arranged on line 1 and the five sub light sources arranged on line 2 is referred to as first light emitting element group Gr1, the group of light emitting elements consisting of the four main light sources arranged on line 3 and the five sub light sources arranged on line 4 is referred to as second light emitting element group Gr2, and the group of light emitting elements consisting of the main light sources arranged on line 5 and the sub light sources arranged on line 6 is referred to as third light emitting element group Gr3.

It is noted that positional deviations may occur in the latent image formed on the surface of the photoconductor drum 901 due to scanning deviations caused by the fθ lens 806, face tangle errors of the deflection reflective surface of the polygon mirror 808, variations in the distance from the rotational axis to the deflection reflective surface, rotation deviations of the polygon mirror 808, and/or fluctuations in the wavelength of laser light irradiated from the semiconductor laser LD. In the following descriptions, the positional deviation with respect to the main scanning direction is referred to as main scanning direction deviation and the positional deviation with respect to the sub scanning direction is referred to as sub scanning direction deviation.

Figure 4:
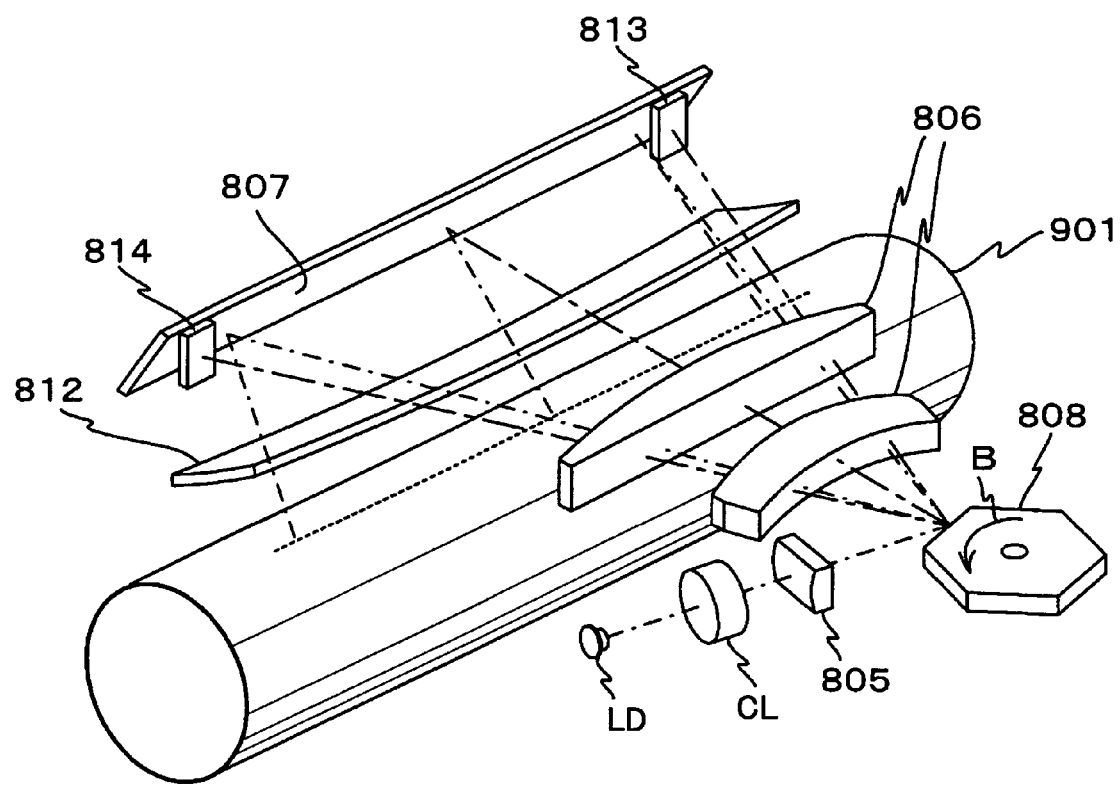
FIG. 4 is a diagram showing the optical scanning apparatus of the first embodiment and a photoconductor drum included in the laser printer of FIG. 2.

Referring back to FIG. 3, the light source unit 801 with the printed substrate 802 attached to its rear face is held in contact with a side wall of an optical housing 804 by a spring (not shown). The contacting position of the light source unit 801 with respect to the side wall of the housing 804 may be adjusted by an adjustment screw 803. In this way, the direction of light irradiated from the light source unit 801 may be adjusted. The adjustment screw 803 is screwed to a protruding portion arranged at the side wall of the optical housing 804. As is shown in FIG. 4, the collimating lens CL, the cylinder lens 805, the polygon mirror 808, the polygon mirror motor (not shown), the fθ lens 806, the retro-reflection mirror 807, the toroidal lens 812, and the two reflection mirrors 813 and 814 are arranged at predetermined positions within the optical housing 804. The PD substrates 809a and 809b are arranged at the outer side of the optical housing 804. The upper portion of the optical housing 804 is sealed by a cover 811. The optical housing 804 has plural attachment portions 810 protruding from its side walls which attachment portions 810 are fixed to a frame member of the laser printer 100 by screws.

The collimating lens CL is configured to arrange the light emitted from the light source unit 801 to be substantially parallel. The cylinder lens 805 is configured to rectify the light from the collimating lens CL.

In the following, operations of the scanning optical system are described. First, light emitted from the light source unit 801 is focused near a deflection surface of the polygon mirror 808 via the collimating lens CL and the cylinder lens 805. The polygon mirror 808 is rotated by the polygon mirror motor (not shown) at a predetermined speed in the direction of the arrow B shown in FIG. 4. The light focused near the deflection surface of the polygon mirror 808 is deflected at a constant angular velocity with respect to the rotation of the polygon mirror 808. The light deflected by the polygon mirror 808 is incident on the retro-reflection mirror 807 via the fθ lens 806 and reflected by the retro-reflection mirror 807 to thereby scan the light on the surface of the photoconductor drum 901 in the main scanning direction via the toroidal lens 812. It is noted that in the following descriptions, one scanning operation from a scanning start position to a scanning end position in the main scanning direction may be referred to as unit scanning.

The two reflection mirrors 813 and 814 are arranged at the side edges of the retro-reflection mirror 807 with respect to the main scanning direction. Light reflected by the reflection mirror 813 is received by a light receiving element (denoted as PD1 in FIG. 6) that is arranged in the PD substrate 809a, and light reflected by the reflection mirror 814 is received by a light receiving element (denoted as PD2 in FIG. 6) that is arranged in the PD substrate 809b. It is noted that the light receiving elements PD1 and PD2 are arranged at positions equivalent to the image plane. In the present example, the reflection mirrors 813 and 814 are positioned such that light deflected by the polygon mirror 808 may be incident on the light receiving element PD1 before unit scanning is performed and incident on the light receiving element PD2 after the unit scanning is performed. The light receiving elements PD1 and PD2 are configured to output signals (photo-electric converted signals) according to the amount of received light.

Figure 6:
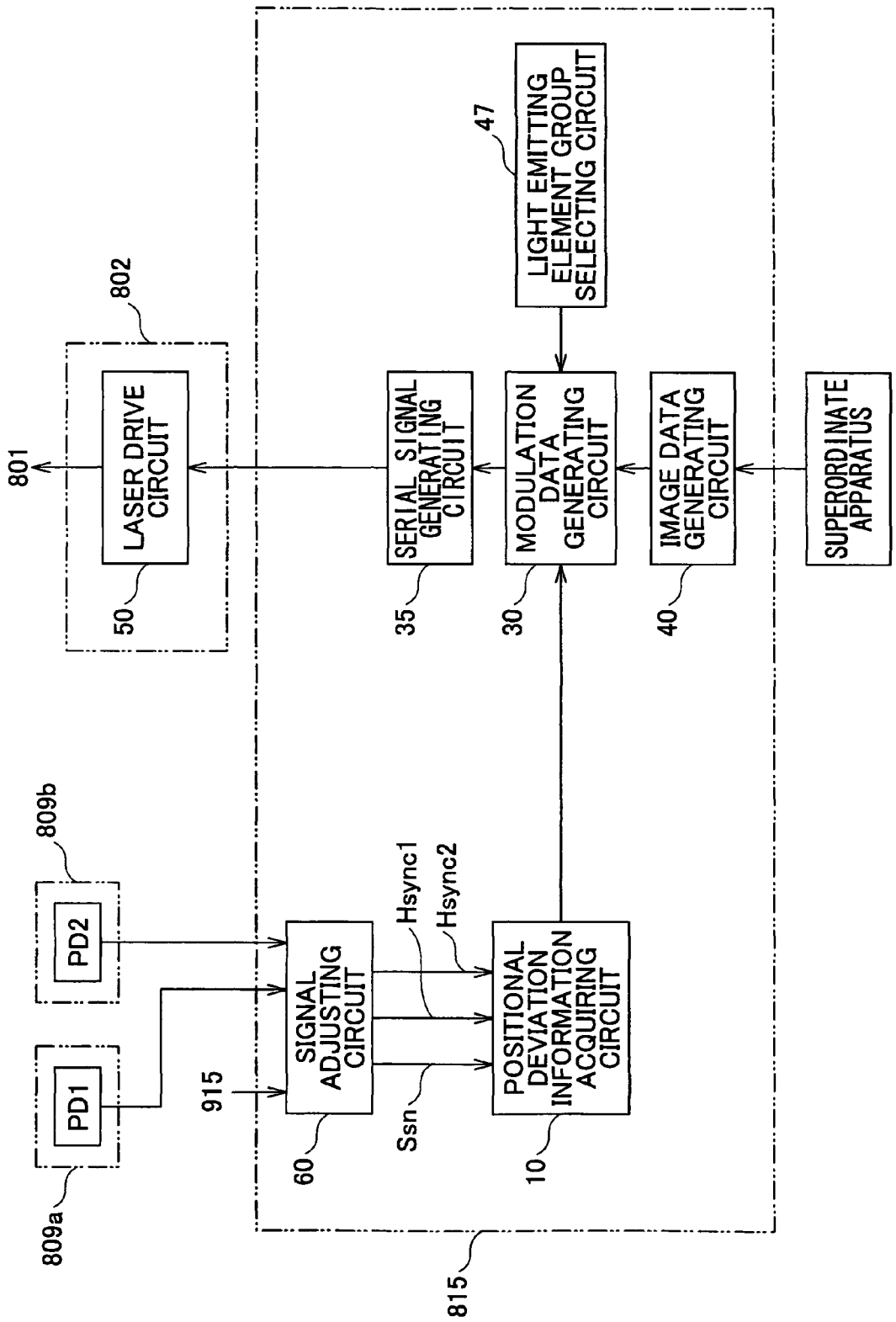
FIG. 6 is a block diagram showing circuits included in a printed substrate and a processing circuit of the optical scanning apparatus of the first embodiment.

As is shown in FIG. 6, the printed substrate 802 includes a laser drive circuit 50 that is configured to generate drive signals for the main light source and the sub light source based on a serial signal from the processing circuit 815. The generated drive signals are output to the light source unit 801. The light source unit 801 supplies the received drive signals to the semiconductor laser LD.

The processing circuit 815 includes a signal adjusting circuit 60, a positional deviation information acquiring circuit 10, a modulation data generating circuit 30, a serial signal generating circuit 35, an image data generating circuit 40, and a light emitting element group selecting circuit 47.

The signal adjusting circuit 60 is configured to generate a signal Hsync1 by amplifying, inverting, and binarizing the output signal of the light receiving element PD1; and generate a signal Hsync2 by amplifying, inverting, and binarizing the output signal of the light receiving element PD2. It is noted that when light is incident on the light receiving element PD1, the signal Hsync1 changes from 'H (high level)' to 'L (low level)', and when light is incident on the light receiving element PD2, the signal Hsync2 changes from 'H' to 'L'. Also, the signal adjusting circuit 60 is configured to generate a signal Ssn by amplifying and binarizing an output signal of the pixel position detector (positional deviation sensor) 915.

The positional deviation information acquiring circuit 10 is configured to acquire information pertaining to deviations in the main scanning direction and the sub scanning direction based on the signals Hsync1, Hsync2, and Ssn that are used for acquiring positional deviation information before performing actual scanning according to image information.

Upon performing actual scanning based on image information, the positional deviation information acquiring circuit 10 generates a main scanning direction correction information signal including correction information for correcting the pixel position and pixel width in the main scanning direction based on the main scanning direction deviation information, and a sub scanning direction correction information signal including correction information for correcting the pixel position in the sub scanning direction based on the sub scanning direction deviation information. Such correction information signals are output to the modulation data generating circuit 30.

The image data generating circuit 40 is configured to generate image data based on image information from a superordinate apparatus.

The light emitting element group selecting circuit 47 is configured to select one of the three light emitting element groups Gr1, Gr2, or Gr3, and inform the modulation data generating circuit 30 of the selected light emitting element group. In the present example, the light emitting element group selecting circuit 47 is arranged to switch the selected light emitting element group with respect to each page. In other examples, the light emitting element group may be switched with respect to each line or with respect to each job. In this way, the service life of the light emitting elements may be prolonged without changing the resolution. In another example, a temperature sensor may be disposed in the vicinity of the light source unit 801, and the light emitting element group selecting circuit 47 may be arranged to switch the selected light emitting element group according to the temperature change occurring in the vicinity of the light source unit 801. It is noted that in the following descriptions, the term 'switch' is generally used to refer to a change associated with light sources, for example.

The modulation data generating circuit 30 is configured to generate modulation data based on the image data from the image data generating circuit 40, the correction signals from the positional deviation information acquiring circuit 10, and the selection information from the light emitting element group selecting circuit 47. In the present example, sub scanning direction deviation correction, main scanning direction deviation correction, and pixel width correction are performed at the modulation data generating circuit 30.

The serial signal generating circuit 35 is configured to convert the modulation data from the modulation data generating circuit 30 into a serial signal and output the serially converted signal to the laser drive circuit 50. In one example, the serial signal generating circuit 35 may use a shift register.

(Sub Scanning Direction Deviation Correction)

In the following, sub scanning direction deviation correction that is performed at the modulation data generating circuit 30 based on the sub scanning direction correction information signal is described.

Figure 7:
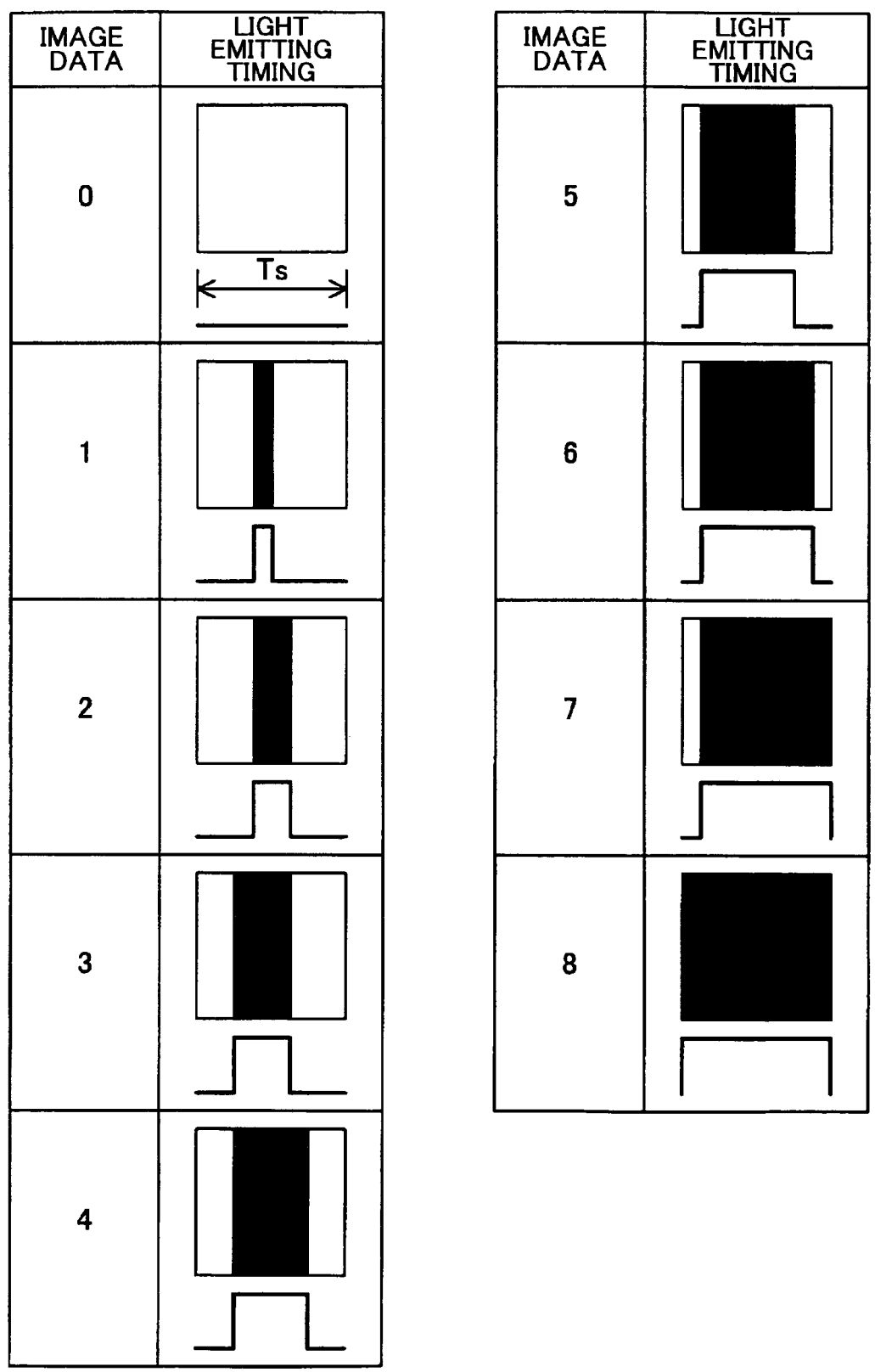
FIG. 7 is a table showing exemplary correspondences between image data and light emitting timings.

FIG. 7 is a diagram showing exemplary correspondences between image data and light emitting timings. As is shown in FIG. 7, the light emitting time of the light sources may be controlled based on a pulse width of ⅛ the time width Ts for one pixel. In this case, the modulation data generating circuit 30 may be configured to select a light emitting pattern from seventeen different types of light emitting patterns M1-M17 based on sub scanning direction correction information signal, for example, as is shown in FIG. 8. In the following, a case of correcting sub scanning direction deviation of a pixel (main pixel) formed by the light emitting element B1 using the light emitting element A2 or C2 is described as one specific example. In this case, the light emitting timing of the light emitting elements A2 or C2 is adjusted in consideration of its distance from the light emitting element B1 with respect to the direction dir_main (i.e., $\Delta x12$ in the present example). It is noted that in the following descriptions, the term 'shift' is generally used to refer to a change associated with a pixel or a latent image, for example.

The light emitting pattern M1 is used when the sub scanning direction deviation is 0, and according to this pattern, the light emitting element B1 emits light for a normal pulse width Ts while the light emitting elements A2 and C2 emit no light. As is shown in FIG. 9A, the center of gravity Ga of the emitted light in this case substantially corresponds to the light emitting point of the light emitting element B1. In other words, the position of the pixel formed on the photoconductor drum 901 is not shifted with respect to the sub scanning direction.

The light emitting pattern M2 is used when a sub scanning direction deviation of −(1/16) pixel occurs, and according to this pattern, the light emitting element B1 emits light for a pulse width of (⅞) Ts, the light emitting element C2 emits light for a pulse width of (⅛) Ts, and the light emitting element A2 emits no light. As is shown in FIG. 9B, the center of gravity Gb of the emitted light in this case is shifted in the direction +dir_sub by the distance (⅛)×$\Delta y12$ from Ga. In this way, the position of the pixel formed on the photoconductor drum 901 is shifted by +(1/16) pixel in the sub scanning direction.

The light emitting pattern M3 is used when a sub scanning direction deviation of −(2/16) pixel occurs, and according to this pattern, the light emitting element B1 emits light for a pulse width of (6/8) Ts, the light emitting element C2 emits light for a pulse width of (2/8) Ts, and the light emitting element A2 emits no light. As is shown in FIG. 9C, the center of gravity Gc of the emitted light in this case is shifted in the direction +dir_sub by the distance (2/8)×$\Delta y12$ from Ga. In this way, the position of the pixel formed on the photoconductor drum 901 is shifted by +(2/16) pixel in the sub scanning direction.

The light emitting pattern M4 is used when a sub scanning direction deviation of −(3/16) pixel occurs, and according to this pattern, the light emitting element B1 emits light for a pulse width of (⅝) Ts, the light emitting element C2 emits light for a pulse width of (⅜) Ts, and the light emitting element A2 emits no light. As is shown in FIG. 9D, the center of gravity Gd of the emitted light in this case is shifted in the direction +dir_sub by the distance (⅜)×$\Delta y12$ from Ga. In this way, the position of the pixel formed on the photoconductor drum 901 is shifted by +(3/16) pixel in the sub scanning direction.

The light emitting pattern M5 is used when a sub scanning direction deviation of −(4/16) pixel occurs, and according to this pattern, the light emitting element B1 emits light for a pulse width of (4/8) Ts, the light emitting element C2 emits light for a pulse width of (4/8) Ts, and the light emitting element A2 emits no light. As is shown in FIG. 9E, the center of gravity Ge of the emitted light in this case is shifted in the direction +dir_sub by the distance (4/8)×$\Delta y12$ from Ga. In this way, the position of the pixel formed on the photoconductor drum 901 is shifted by +(4/16) pixel in the sub scanning direction.

The light emitting pattern M6 is used when a sub scanning direction deviation of −(5/16) pixel occurs, and according to this pattern, the light emitting element B1 emits light for a pulse width of (⅜) Ts, the light emitting element C2 emits light for a pulse width of (⅝) Ts, and the light emitting element A2 emits no light. As is shown in FIG. 9F, the center of gravity Gf of the emitted light in this case is shifted in the direction +dir_sub by the distance (⅝)×$\Delta y12$ from Ga. In this way, the position of the pixel formed on the photoconductor drum 901 is shifted by +(5/16) pixel in the sub scanning direction.

The light emitting pattern M7 is used when a sub scanning direction deviation of −(6/16) pixel occurs, and according to this pattern, the light emitting element B1 emits light for a pulse width of (2/8) Ts, the light emitting element C2 emits light for a pulse width of (6/8) Ts, and the light emitting element A2 emits no light. As is shown in FIG. 9G, the center of gravity Gg of the emitted light in this case is shifted in the direction +dir_sub by the distance (6/8)×$\Delta y12$ from Ga. In this way, the position of the pixel formed on the photoconductor drum 901 is shifted by +(6/16) pixel in the sub scanning direction.

The light emitting pattern M8 is used when a sub scanning direction deviation of −(7/16) pixel occurs, and according to this pattern, the light emitting element B1 emits light for a pulse width of (⅛) Ts, the light emitting element C2 emits light for a pulse width of (⅞) Ts, and the light emitting element A2 emits no light. As is shown in FIG. 9H, the center of gravity Gh of the emitted light in this case is shifted in the direction +dir_sub by the distance (⅞)×$\Delta y12$ from Ga. In this way, the position of the pixel formed on the photoconductor drum 901 is shifted by +(7/16) pixel in the sub scanning direction.

The light emitting pattern M9 is used when a sub scanning direction deviation of −(8/16) pixel occurs, and according to this pattern, the light emitting element C2 emits light for the pulse width Ts, and the light emitting elements B1 and A2 emit no light. As is shown in FIG. 9I, the center of gravity Gi of the emitted light in this case is substantially corresponds to the light emitting point of the light emitting element C2. In this way, the position of the pixel formed on the photoconductor drum 901 is shifted by +(8/16) pixel in the sub scanning direction.

The light emitting pattern M10 is used when a sub scanning direction deviation of +(1/16) pixel occurs, and according to this pattern, the light emitting element B1 emits light for a pulse width of (7/8) Ts, the light emitting element A2 emits light for a pulse width of (1/8) Ts, and the light emitting element C2 emits no light. As is shown in FIG. 10B, the center of gravity Gj of the emitted light in this case is shifted in the direction −dir_sub by the distance (1/8)×Δy12 from Ga. In this way, the position of the pixel formed on the photoconductor drum 901 is shifted by −(1/16) pixel in the sub scanning direction.

The light emitting pattern M11 is used when a sub scanning direction deviation of +(2/16) pixel occurs, and according to this pattern, the light emitting element B1 emits light for a pulse width of (6/8) Ts, the light emitting element A2 emits light for a pulse width of (2/8) Ts, and the light emitting element C2 emits no light. As is shown in FIG. 10C, the center of gravity Gk of the emitted light in this case is shifted in the direction −dir_sub by the distance (2/8)×Δy12 from Ga. In this way, the position of the pixel formed on the photoconductor drum 901 is shifted by −(2/16) pixel in the sub scanning direction.

The light emitting pattern M12 is used when a sub scanning direction deviation of +(3/16) pixel occurs, and according to this pattern, the light emitting element B1 emits light for a pulse width of (5/8) Ts, the light emitting element A2 emits light for a pulse width of (3/8) Ts, and the light emitting element C2 emits no light. As is shown in FIG. 10D, the center of gravity Gl of the emitted light in this case is shifted in the direction −dir_sub by the distance (3/8)×Δy12 from Ga. In this way, the position of the pixel formed on the photoconductor drum 901 is shifted by −(3/16) pixel in the sub scanning direction.

The light emitting pattern M13 is used when a sub scanning direction deviation of +(4/16) pixel occurs, and according to this pattern, the light emitting element B1 emits light for a pulse width of (4/8) Ts, the light emitting element A2 emits light for a pulse width of (4/8) Ts, and the light emitting element C2 emits no light. As is shown in FIG. 10E, the center of gravity Gm of the emitted light in this case is shifted in the direction −dir_sub by the distance (4/8)×Δy12 from Ga. In this way, the position of the pixel formed on the photoconductor drum 901 is shifted by −(4/16) pixel in the sub scanning direction.

The light emitting pattern M14 is used when a sub scanning direction deviation of +(5/16) pixel occurs, and according to this pattern, the light emitting element B1 emits light for a pulse width of (3/8) Ts, the light emitting element A2 emits light for a pulse width of (5/8) Ts, and the light emitting element C2 emits no light. As is shown in FIG. 10F, the center of gravity Gn of the emitted light in this case is shifted in the direction −dir_sub by the distance (5/8)×Δy12 from Ga. In this way, the position of the pixel formed on the photoconductor drum 901 is shifted by −(5/16) pixel in the sub scanning direction.

The light emitting pattern M15 is used when a sub scanning direction deviation of +(6/16) pixel occurs, and according to this pattern, the light emitting element B1 emits light for a pulse width of (2/8) Ts, the light emitting element A2 emits light for a pulse width of (6/8) Ts, and the light emitting element C2 emits no light. As is shown in FIG. 10G, the center of gravity Go of the emitted light in this case is shifted in the direction −dir_sub by the distance (6/8)×Δy12 from Ga. In this way, the position of the pixel formed on the photoconductor drum 901 is shifted by −(6/16) pixel in the sub scanning direction.

The light emitting pattern M16 is used when a sub scanning direction deviation of +(7/16) pixel occurs, and according to this pattern, the light emitting element B1 emits light for a pulse width of (1/8) Ts, the light emitting element A2 emits light for a pulse width of (7/8) Ts, and the light emitting element C2 emits no light. As is shown in FIG. 10H, the center of gravity Gp of the emitted light in this case is shifted in the direction −dir_sub by the distance (7/8)×Δy12 from Ga. In this way, the position of the pixel formed on the photoconductor drum 901 is shifted by −(7/16) pixel in the sub scanning direction.

The light emitting pattern M17 is used when a sub scanning direction deviation of +(8/16) pixel occurs, and according to this pattern, the light emitting element A2 emits light for the pulse width Ts, and the light emitting elements B1 and C2 emit no light. As is shown in FIG. 10I, the center of gravity Gq of the emitted light in this case substantially corresponds to the light emitting point of the light emitting element A2. In this way, the position of the pixel formed on the photoconductor drum 901 is shifted by −(8/16) pixel in the sub scanning direction.

For example, when image information of a straight line as is shown in FIG. 11A is transmitted from a superordinate apparatus, and it is determined in the scanning operation for acquiring positional deviation information that a non-linear latent image as is shown in FIG. 11B will be formed based on the line image information of FIG. 11A, light emitting patterns may be selected for the respective pixels of the line image as is shown in FIG. 11C so that each pixel may be formed at its optimal position in the sub scanning direction to create a latent image as is shown in FIG. 11D.

In the above example, the total amount of light emitted from the main light source and the sub light source is arranged to correspond to a predetermined value, and in this way, the center of gravity of light emitted from the light source unit 801 may be shifted with respect to the direction dir_sub while maintaining the amount of light emitted from the light source unit 801 to be constant.

In the following, pixel width correction and main scanning direction deviation correction that are performed by the modulation data generating circuit 30 based on the main scanning direction correction information signal are described. As one specific example, a case of correcting the main scanning direction deviation of the main pixel formed by the light emitting element B3 using the light emitting element B1 or B5 is described below. It is noted that in the present example, the light emitting timing of the light emitting elements are arranged to be substantially the same. Also, it is noted that in the present case, the selection information from the light emitting element group selecting circuit 47 is invalidated.

(Pixel Width Correction)

FIGS. 12A-12C are diagrams illustrating an exemplary manner in which pixel width correction is performed. In the present example, the width L33 of two pixels formed on the photoconductor drum 901 upon illuminating the light emitting element B3 for two pixel clocks (see FIG. 12A), the width L31 of two pixels formed on the photoconductor drum 901 by illuminating the light emitting element B3 for one pixel clock and then illuminating the light emitting element B1 for one pixel clock (see FIG. 12B), and the width L35 of two pixels formed on the photoconductor drum 901 by illuminating the light emitting element B3 for one pixel clock and then illuminating the light emitting element B5 for one pixel clock (see FIG. 12C) are arranged to be different. Specifically L31 is arranged to be less than L33 (i.e., L31<L33), and L35 is arranged to be greater than L33 (i.e., L35>L33). According to the present example, the pixel width of an image formed on the photoconductor drum 901 may be corrected by controlling the illumination of plural main light sources arranged on the same row in the direction dir_main. It is noted that in the present example, a pixel clock signal PCLK as is shown in FIGS. 12A-12C is generated within the modulation data generating circuit 30.

(Main Scanning Direction Deviation Correction)

Figure 13A:
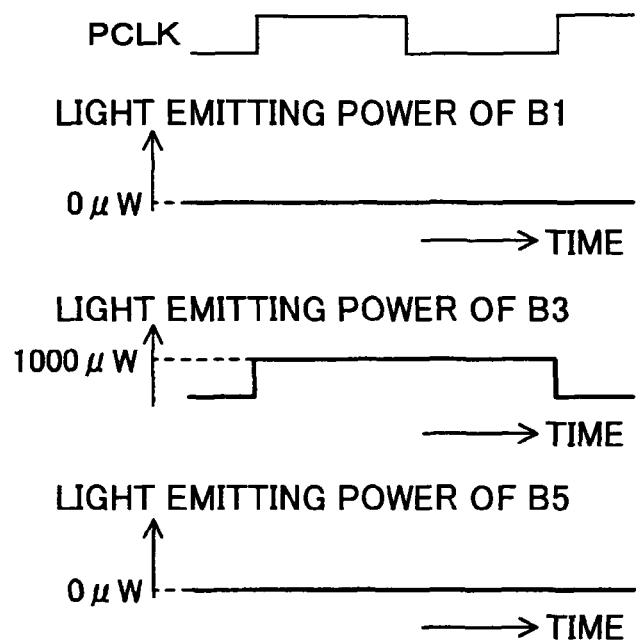
FIGS. 13A and 13B are diagrams illustrating an exemplary pixel position with respect to the main scanning direction realized by illuminating a light emitting element at a predetermined light emitting power.
Figure 13B:
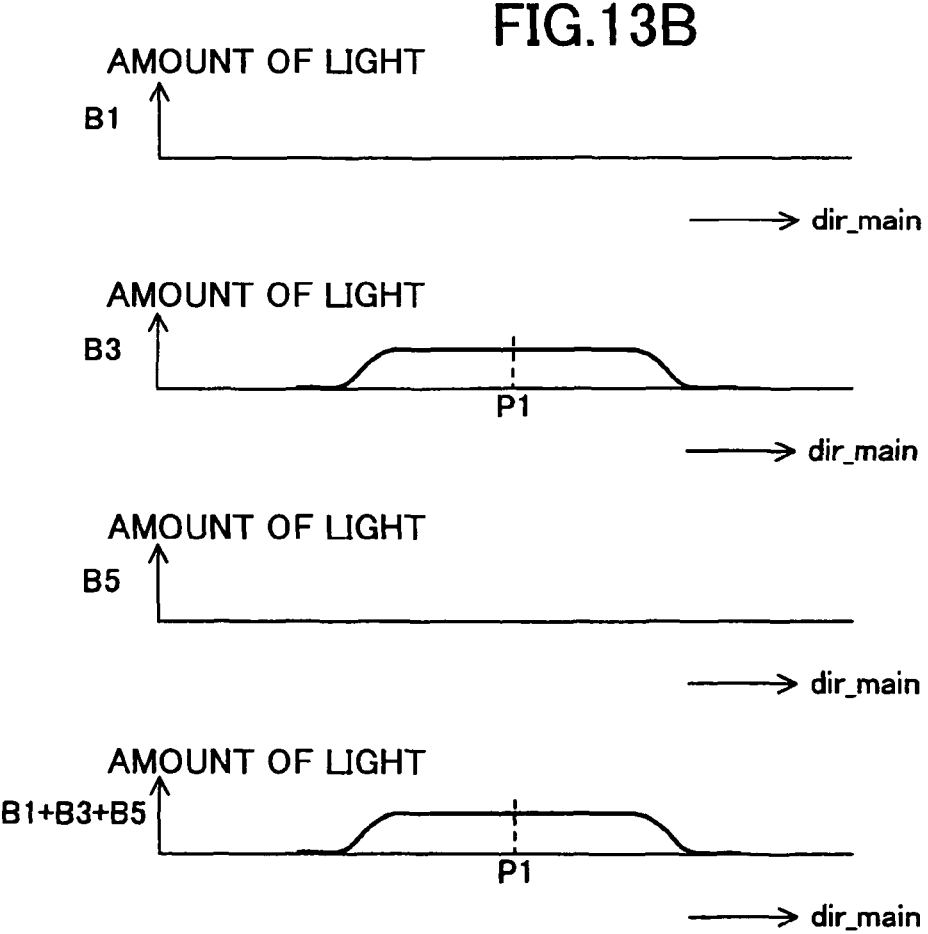
Figure 14A:
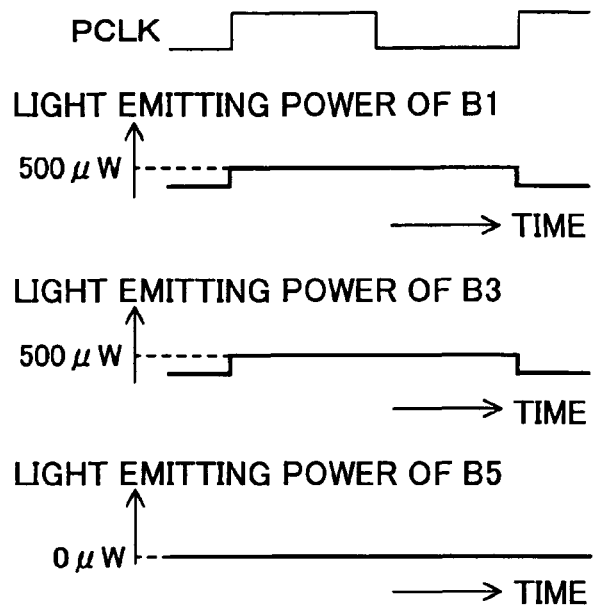
FIGS. 14A and 14B are diagrams illustrating another exemplary pixel position with respect to the main scanning direction realized by illuminating light emitting elements at a predetermined light emitting power.
Figure 14B:
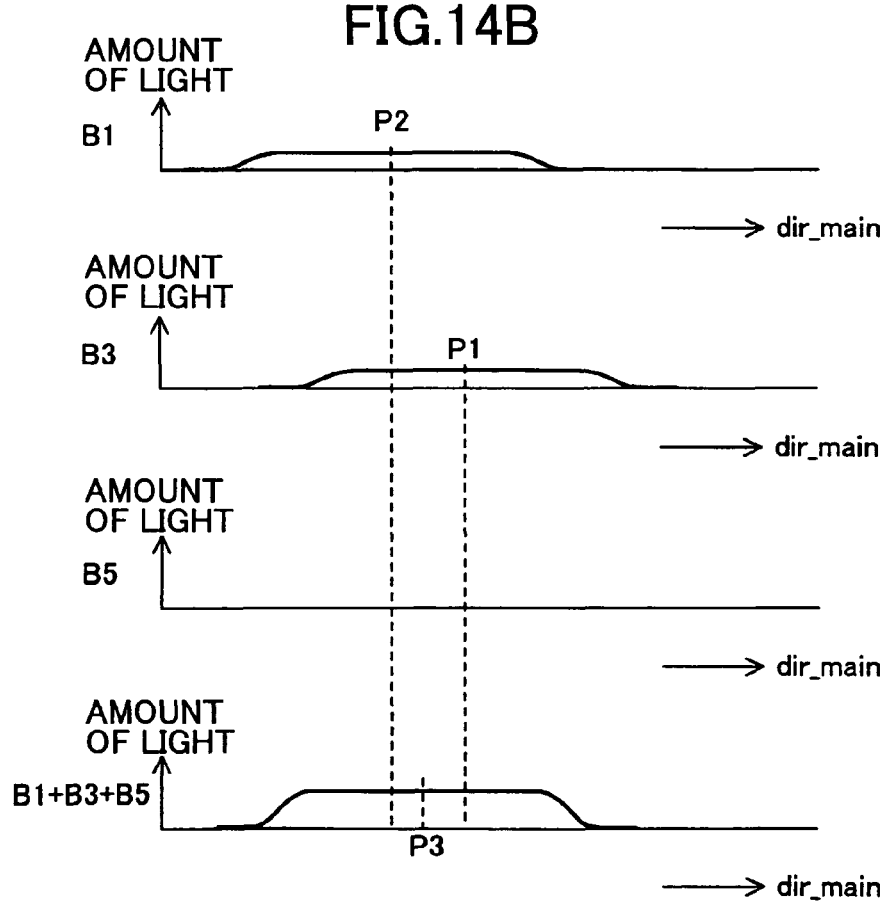
Figure 15A:
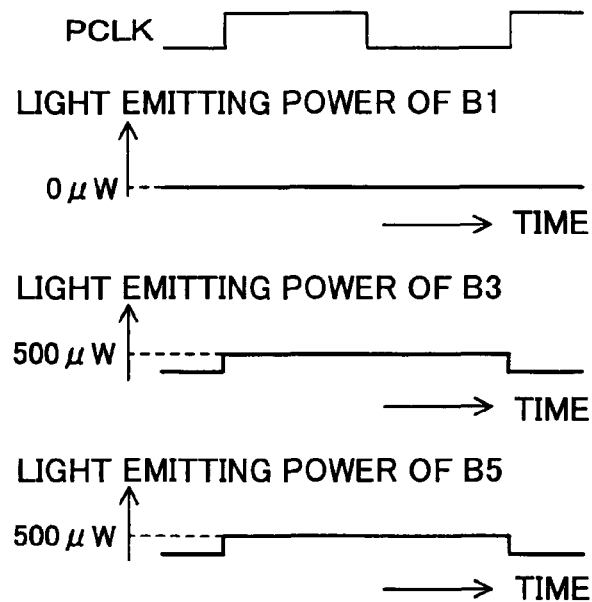
FIGS. 15A and 15B are diagrams illustrating another exemplary pixel position with respect to the main scanning direction realized by illuminating light emitting elements at a predetermined light emitting power.
Figure 15B:
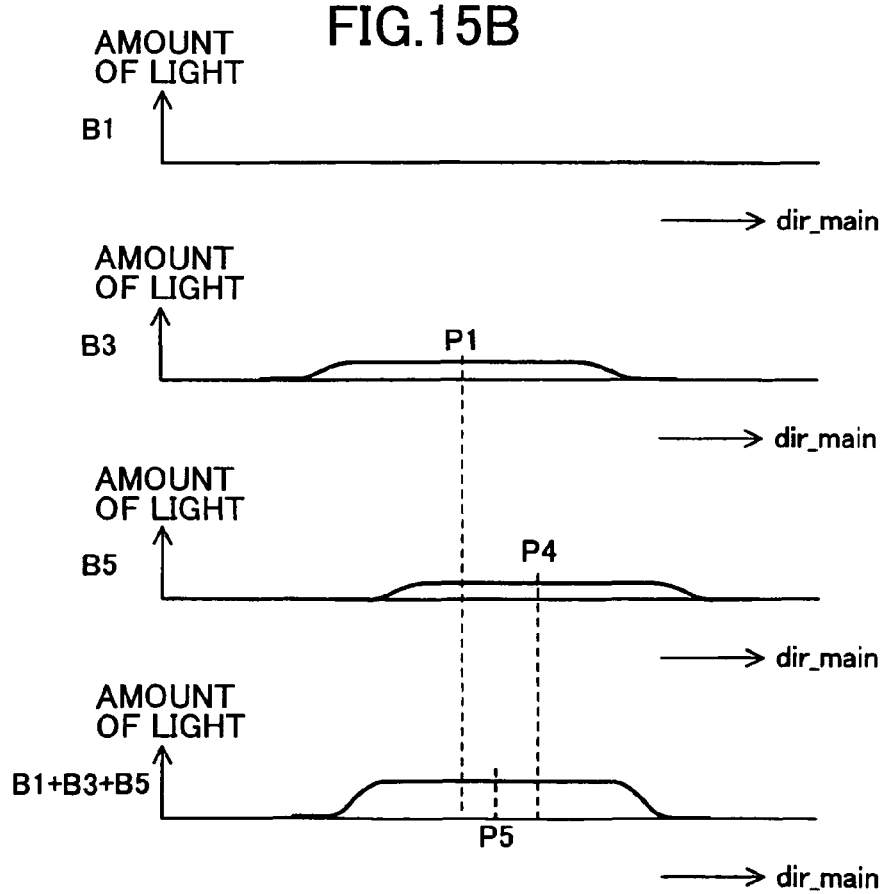

In the following, an exemplary main scanning direction deviation correction method is described with reference to FIGS. 13A, 13B, 14A, 14B, 15A, and 15B. FIG. 13A illustrates a case in which the light emitting element B3 is illuminated at a light emitting power of 1000 μW for one pixel clock, and FIG. 13B illustrates the light distribution of light emitted on the surface of the photoconductor drum 901 in such a case. It is noted that the center of gravity of the emitted light with respect to the main scanning direction is denoted as P1. FIG. 14A illustrates a case in which the light emitting elements B1 and B3 are respectively illuminated at a light emitting power of 500 μW at the same time for one pixel clock, and FIG. 14B illustrates the light distribution of light emitted on the surface of the photoconductor drum 901 in such a case. As can be appreciated from FIG. 14B, the center of gravity P3 with respect to the main scanning direction of the emitted light in this case is shifted in the negative (−) direction from P1. FIG. 15A illustrates a case in which the light emitting elements B3 and B5 are respectively illuminated at a light emitting power of 500 μW at the same time for one pixel clock, and FIG. 15B illustrates the light distribution of light emitted on the surface of the photoconductor drum 901 in such a case. As can be appreciated from FIG. 15B, the center of gravity P5 with respect to the main scanning direction of the emitted light in this case is shifted in the positive (+) direction from P1. According to the present example, the position of a pixel formed on the photoconductor drum 901 may be corrected by controlling the illumination of plural main light sources arranged along the direction dir_main. Specifically, the pixel position with respect to the main scanning direction may be shifted in the forward (+) direction or the backward (−) direction.

It is noted that when both sub scanning direction deviation and main scanning direction deviation occur at a pixel, the main scanning direction deviation correction as is described above may also be performed with respect to the sub light sources that are used for correcting sub scanning direction deviations.

Figure 16:
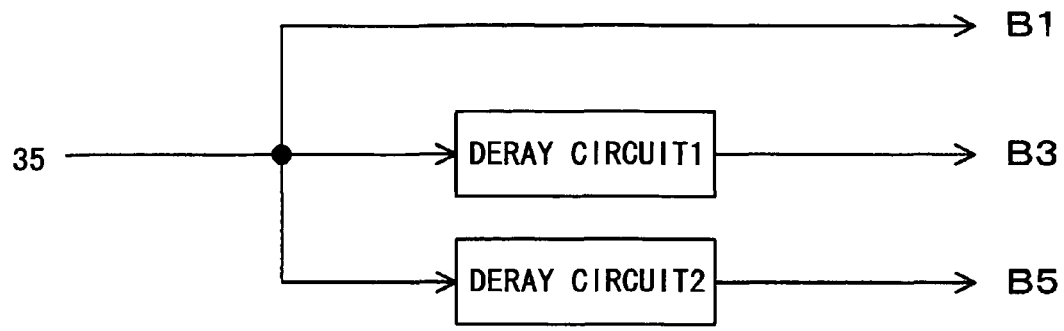
FIG. 16 is a diagram showing delay circuits for controlling the light emitting timings of light emitting elements.

Also, it is noted that when the light emitting timings of the light emitting elements are substantially the same, the amount of correction to be made with respect to the main scanning direction may be determined by the distance between the main light sources with respect to the direction dir_main (i.e., Δx1 in the present example) and the scanning speed. Accordingly, in one example, timing control means for controlling the light emitting timing of the light emitting elements may be used to correct main scanning direction deviations instead of relying on the distance between the light emitting elements and the scanning speed. In a specific example, as is shown in FIG. 16, a delay circuit that is configured to delay a serial signal generated at the serial signal generating circuit 35 according to the amount of main scanning direction deviation may be used as the timing control means.

As can be appreciated from the above descriptions, in the laser printer 100 according to the present embodiment, the charger 902, the developing roller 903, the toner cartridge 904, and the transfer roller 911 comprise a transfer apparatus.

Also, in the optical scanning apparatus 900 according to the present embodiment, the modulation data generating circuit 30 comprises a control apparatus.

Also, according to the present embodiment, the optical scanning apparatus 900 includes the light source unit 801 having twelve main light sources arranged two-dimensionally in the directions dir_main and dir_sub, and nine sub light sources arranged between the rows of the main light sources aligned in the direction dir_main. The modulation data generating circuit 30 is configured to shift an image to be formed on the photoconductor drum 901 in the main scanning direction by controlling two main light sources that are adjacent to each other with respect to the direction dir_main. Also, the modulation data generating circuit 30 is configured to shift the image to be formed on the photoconductor drum 901 in the sub scanning direction by controlling a main light source and a sub light source that are adjacent to each other. In this way, the positional deviations of an image with respect to the main scanning direction and the sub scanning direction may be accurately corrected without inducing cost increase, and light may be accurately scanned on the photoconductor drum 901.

Also, according to the present embodiment, the light source unit 801 of the optical scanning apparatus 900 includes three light emitting element groups, one of which is selected with respect to each page by the light emitting element group selecting circuit 47. When the main scanning direction deviation is small, the light emitting element group may be switched. In this way, the service life of the light emitting elements may be prolonged without changing the resolution.

Also, according to the present embodiment, plural light emitting elements are arranged within a common chip so that the distance between the light emitting elements may substantially be in accordance with the intended design. In this way, the positional deviations of an image with respect to the main scanning direction and the sub scanning direction may be accurately corrected. Also, power consumption may be reduced compared to a case of using plural individual light sources.

Also, according to the present embodiment, the sub light sources of the optical scanning apparatus 900 are arranged such that their respective distances to their corresponding neighboring main light sources with respect to the direction dir_sub are substantially equal so that a correction algorithm for sub scanning direction deviation may be simplified.

Also, according to the present embodiment, the modulation data generating circuit 30 of the optical scanning apparatus 900 is configured to shift an image to be formed on the photoconductor drum 901 in the sub scanning direction by controlling the pulse width of the respective drive signals of a main light source and a sub light source that are adjacent to each other so that a correction algorithm for sub scanning direction deviation may be simplified.

Also, according to the present embodiment, the modulation data generating circuit 30 of the optical scanning apparatus 900 is configured to control the total amount of light emitted from a main light source and a sub light source that are adjacent to each other to equal a predetermined value so that the generation of density variations may be prevented.

Also, according to the present embodiment, the modulation data generating circuit 30 of the optical scanning apparatus 900 is configured to shift an image to be formed on the photoconductor drum 901 in the main scanning direction by driving two main light sources that are adjacent to each other with respect to the direction dir_main at the same light emitting timing so that a correction algorithm for main scanning direction deviation may be simplified.

Also, the laser printer 100 according to the present embodiment uses the optical scanning apparatus 900 as is described above that is capable of accurately scanning light on the photoconductor drum 901 without inducing cost increase so that it may form a high quality image without requiring a cost increase.

It is noted that in the above-described embodiment of the present invention, seventeen types of light emitting patterns are used according to sub scanning direction deviations of different degrees. However, the present invention is not limited to such an embodiment.

Also, it is noted that in the above-described embodiment of the present invention, the same number of light emitting patterns are provided respectively for a case in which the sub scanning direction deviation is positive and a case in the sub scanning direction deviation is negative. However, the present invention is not limited to such an embodiment, and in other embodiments, a different number of light emitting patterns may be used for corresponding to sub scanning direction deviations in the positive side and the negative side.

Figure 17:
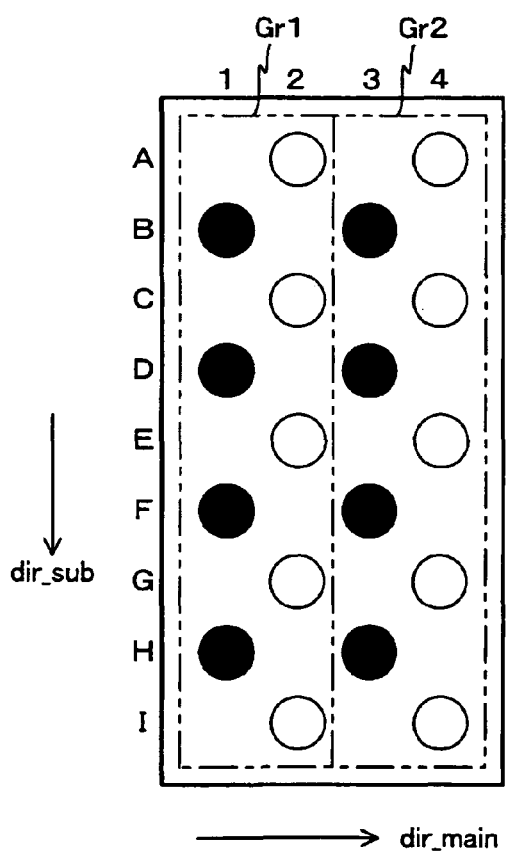
FIG. 17 is a diagram showing another exemplary configuration of the semiconductor laser.

Also, it is noted that in the above-described embodiment of the present invention, the semiconductor laser LD includes three light emitting element groups. However, the present invention is not limited to such an embodiment, and in one alternative embodiment, the semiconductor laser LD may include two light emitting element groups rather than three light emitting element groups as is shown in FIG. 17.

Also, it is noted that in the above-described embodiment of the present invention, one light emitting element group includes four main light sources and five sub light sources. However, the present invention is not limited to such an embodiment, and a light emitting element group may be arranged to include n (i.e., n being a natural number) main light sources and n or n+1 sub light sources.

Also, it is noted that in the above-described embodiment of the present invention, the pulse width of the respective drive signals for the main light source and the sub light source are adjusted. However, the present invention is not limited to such an arrangement, and in another example, the respective light emitting powers of the main light source and the sub light source may be adjusted. In this case, the total amount of light emitted from the main light source and the sub light source may be adjusted to equal a predetermined value in one preferred example.

Also, the present invention is not limited to using the processing circuit 815 as is described above, and other similar processing means may be used in alternative embodiments of the present invention.

For example, one or more circuits comprising the processing circuit 815 may be included in the printed substrate 802.

Also, it is noted that the present invention may be applied to an imaging apparatus that is configured to form a color image in which case an optical scanning apparatus according to an embodiment of the present invention that is adapted for scanning a color image may be used to realize high quality color imaging.

Figure 18:
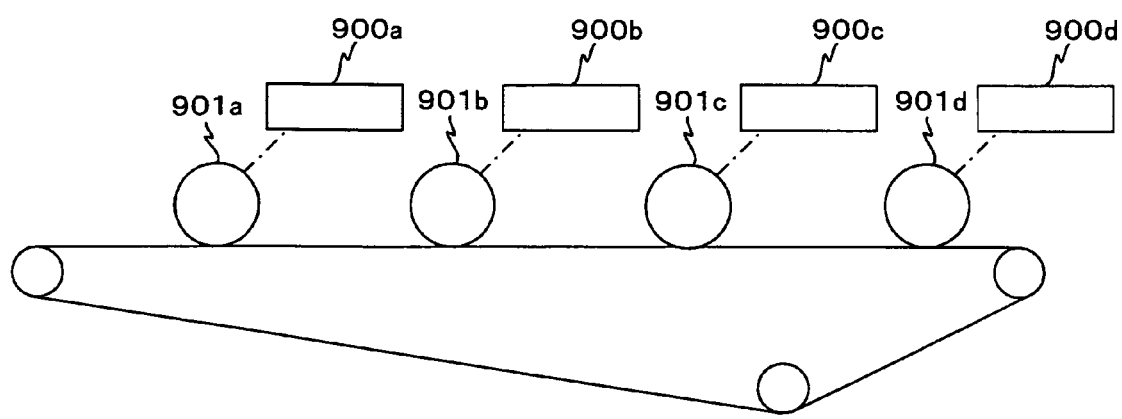
FIG. 18 is a diagram showing a configuration of a tandem color machine.

For example, an imaging apparatus according to an embodiment of the present invention may be a tandem color machine adapted for color imaging that includes a photoconductor drum for each set of image information. FIG. 18 is a diagram showing an exemplary configuration of a tandem color machine. The tandem color machine shown in FIG. 18 includes an optical scanning apparatus 900a that is configured to form a latent image according to Y image information on a photoconductor drum 901a for Y image information, an optical scanning apparatus 900b that is configured to form a latent image according to M image information on a photoconductor drum 901b for M image information, an optical scanning apparatus 900c that is configured to form a latent image according to C image information on a photoconductor drum 901c for C image information, and an optical scanning apparatus 900d that is configured to form a latent image according to K image information on a photoconductor drum 901d for K image information. It is noted that main scanning direction deviations and sub scanning direction deviations may be accurately corrected in the present arrangement by performing corrections similar to those described above to realize high quality imaging.

Also, it is noted that although the present invention is applied to the laser printer 100 in the above-described embodiment, the present invention may equally be applied to other types of imaging apparatuses. For example, the present invention may be applied to a digital copier, a scanner, a facsimile machine, a multifunction machine, or any other type of imaging apparatus that includes the optical scanning apparatus 900. In other words, an imaging apparatus according to an embodiment of the present invention uses the optical scanning apparatus 900 as is described above to realize high quality imaging without causing cost increase.

As can be appreciated from the above descriptions, an optical scanning apparatus according to the above-described embodiment is configured to be capable of accurately scanning light on a scanning object without causing cost increase, and an imaging apparatus according to the above-described embodiment is configured to be capable of forming a high quality image without causing cost increase.

Second Embodiment

Figure 20:
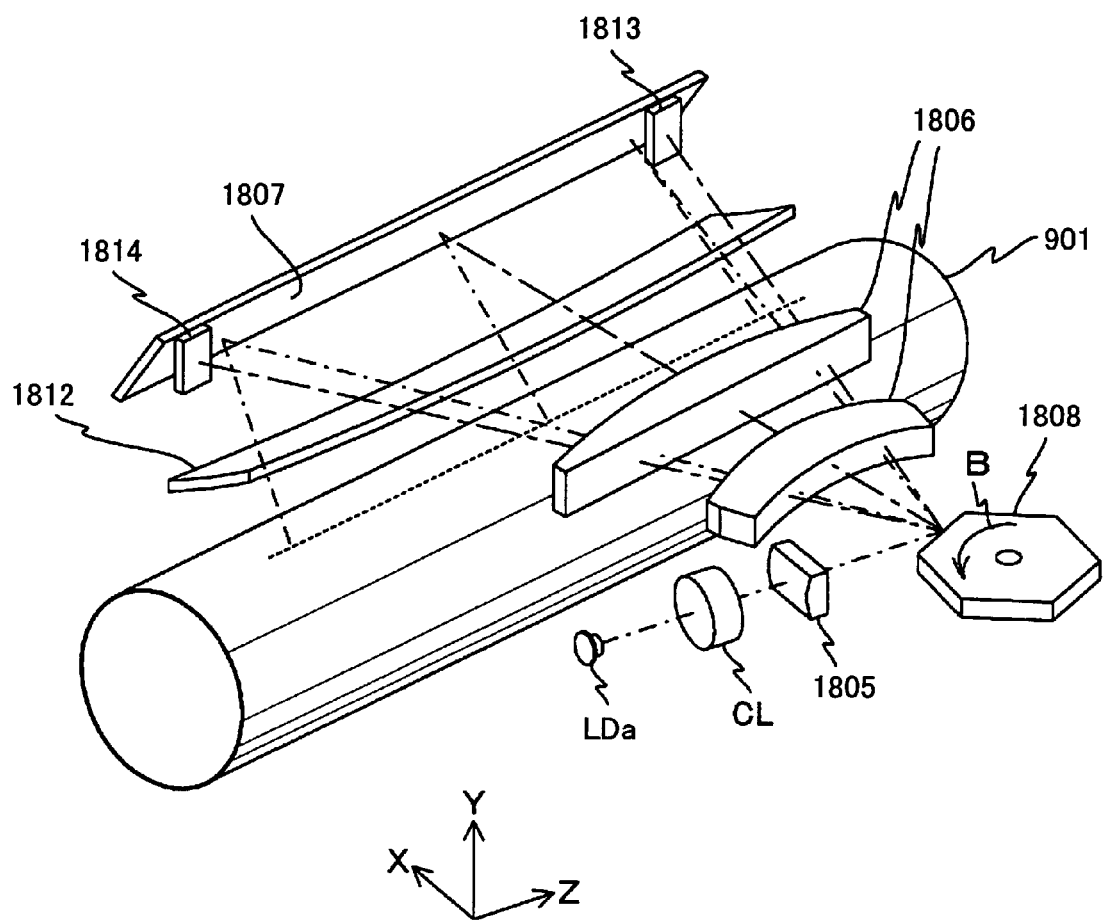
FIG. 20 is a diagram showing the optical scanning apparatus of the second embodiment and the photoconductor drum included in the laser printer of FIG. 2.
Figure 21:
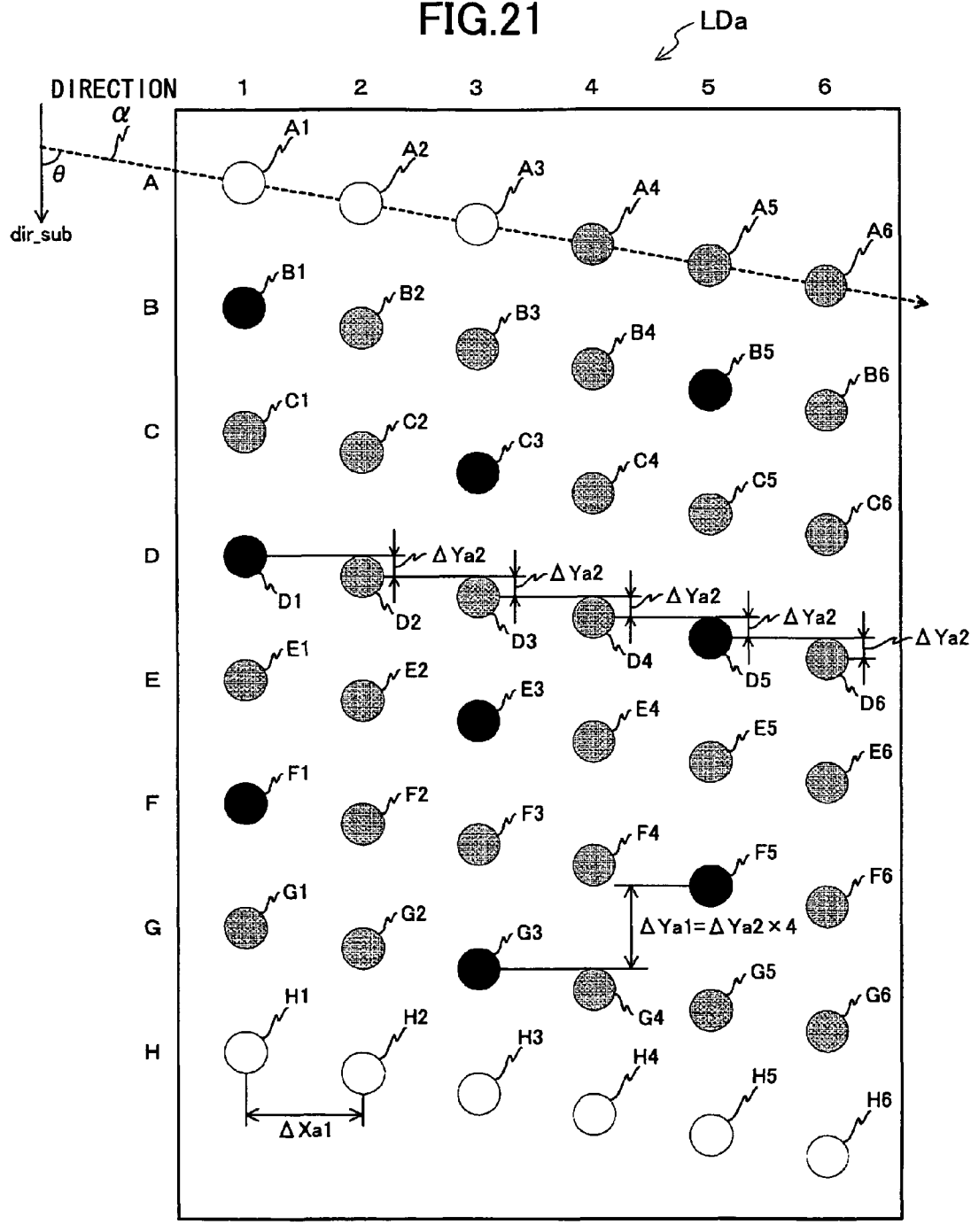
FIG. 21 is a diagram showing an exemplary configuration of a semiconductor laser included in the optical scanning apparatus of the second embodiment.

In the following, another exemplary configuration of the optical scanning apparatus 900 according to a second embodiment of the present invention is described with reference to FIGS. 20 and 21.

According to the present embodiment, the optical scanning apparatus 900 includes a light source unit 1801, a collimating lens CL, a cylinder lens 1805, polygon mirror 1808, a polygon mirror motor (not shown) that rotates the polygon mirror 808, a fθ lens 1806, a retro-reflection mirror 1807, a toroidal lens 1812, two light receiving elements 1813 and 1814, two printed substrates 1802 and 1809, and a processing circuit 1815, for example. It is noted that the collimating lens CL, the cylinder lens 1805, the polygon mirror 1808, the fθ lens 1806, the retro-reflection mirror 1807, and the toroidal lens 1812 comprising an optical system that is arranged along a light path extending from the optical light unit 1801 to the photoconductor drum 901 is also referred to as 'scanning optical system' hereinafter.

The light source unit 1801 includes a semiconductor laser LDa that irradiates laser light modulated according to image information on the polygon mirror 1808. FIG. 21 is a diagram showing a configuration of the semiconductor laser LDa used in the present embodiment. According to the example of FIG. 21, the semiconductor laser LDa corresponds to the so-called VCSEL (Vertical Cavity Surface Emitting Laser). The illustrated semiconductor laser LDa includes forty-eight light emitting elements having substantially the same light emitting characteristics.

In the present example, the forty-eight light emitting elements are two-dimensionally arranged in a direction corresponding to the sub scanning direction (referred to as 'dir_sub' hereinafter) and a direction (referred to as 'α' hereinafter) that is tilted from a direction corresponding to the main scanning direction (referred to as 'dir_main' hereinafter) to define an angle θ (0<θ<90) with the direction dir_sub. Specifically, in the present example, the light emitting elements are arranged into eight rows extending along the direction α (see rows A-H in FIG. 21) and six lines extending along the direction dir_sub (see lines 1-6 in FIG. 21). In the following descriptions, the light emitting element arranged on row B in the direction α and line 3 in the direction dir_sub is referred to as light emitting element B3, and the light emitting element arranged on row F in the direction α and line 6 in the direction dir_sub is referred to as light emitting element F6, for example. Also, the direction extending toward the lower side of FIG. 21 is referred to as direction +dir_sub, and the direction extending toward the right side of FIG. 21 is referred to as direction +α. Also, it is noted that the forty-eight light emitting elements are arranged to be equidistant from each other with respect to the directions dir_main and dir_sub. In the present example, the distance between the light emitting elements with respect to the direction dir_main is represented by ΔXa1, and the distance between the light emitting elements with respect to the direction dir_sub is represented by ΔYa1. Accordingly, the light emitting elements are arranged to be equidistant from each other with respect to the direction α as well.

In the present example, the light emitting elements B1, B5, C3, D1, D5, E3, F1, F5, and G3 correspond to main light sources used for generating the so-called main pixels. The light emitting elements A1, A2, A3, and H1-H6 correspond to auxiliary light sources used for correcting a positional deviation of a main pixel with respect to the sub scanning direction that is at least the size of one pixel. The remaining light emitting elements A4-A6, B2-B4, B6, C1, C2, C4-C6, D2-D4, D6, E1, E2, E4-E6, F2-F4, F6, G1, G2, and G4-G6 correspond to sub light sources used for correcting a positional deviation of a main pixel with respect to the sub scanning direction that is less than the size of one pixel. In other words, the light source unit 1801 according to the present example includes nine main light sources, thirty sub light sources, and nine auxiliary light sources.

It is noted that a positional deviation refers to a deviation in the position of a latent image formed on the surface of the photoconductor drum 901, which positional deviation may be caused by scanning deviations owing to the performance of the fθ lens 1806, face tangle errors of the deflection reflective surface of the polygon mirror 1808, variations in the distance from the rotational axis to the deflection reflective surface, rotation deviations of the polygon mirror 1808, and/or fluctuations in the wavelength of laser light irradiated from the semiconductor laser LDa, for example. In the following descriptions, a positional deviation with respect to the main scanning direction is referred to as main scanning direction deviation and a positional deviation with respect to the sub scanning direction is referred to as sub scanning direction deviation.

It is noted that in the present example, each of the main light sources is arranged such that either a sub light source or an auxiliary light source is adjacent to the main light source with respect to both the direction dir_sub and the direction α. Also, in view of the positioning of the light sources with respect to the direction dir_sub, it is noted that three sub light sources are arranged between two main light sources that are juxtaposed to each other with respect to the direction dir_sub. Accordingly, the distance between every two main light sources that are juxtaposed to each other with respect to the direction dir_sub may be represented as ΔYa1=←Ya2×4 wherein ΔYa2 represents the positional difference in the direction dir_sub between two light sources that are adjacent to each other with respect to the direction α. As can be appreciated from the above descriptions, in the present example, the size of one pixel with respect to the direction dir_sub is equal to ΔYa1 (ΔYa2×4).

Figure 22:
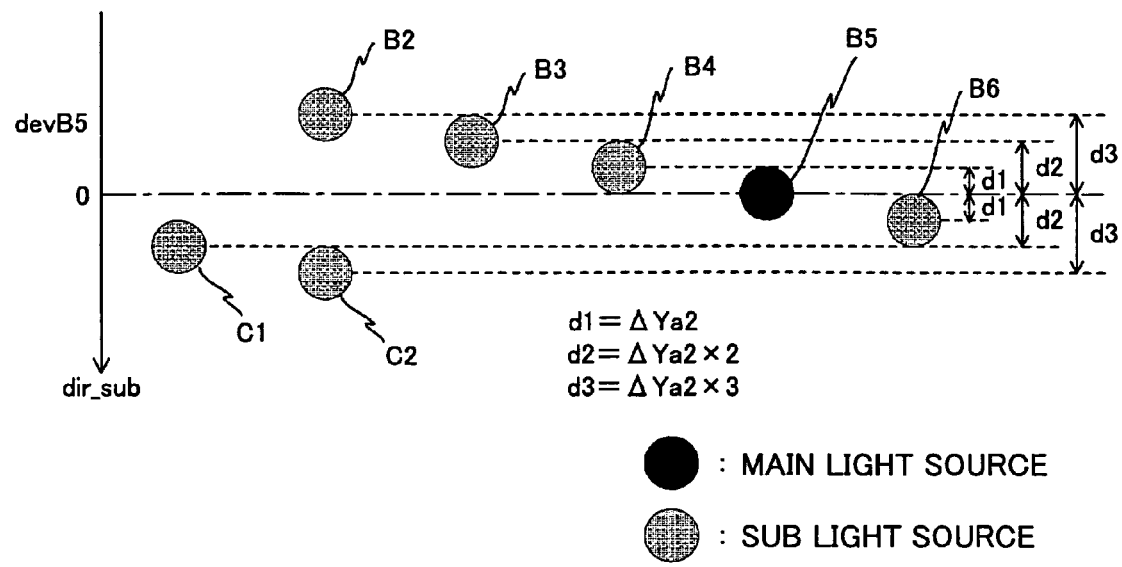
FIG. 22 is a diagram showing sub light sources to be used according to the amount of positional deviation in the sub scanning direction of a main pixel in one exemplary case.

FIG. 22 is diagram showing sub light sources to be used according to the amount of positional deviation in the sub scanning direction of a main pixel formed by the light emitting element (main light source) B5. As is shown in FIG. 22, when the amount of positional deviation in the sub scanning direction of a main pixel formed by the light emitting element B5 (referred to as devB5) is no more than ΔYa2, the light emitting element B4 or B6 is used as a sub light source for correcting the deviation devB5. In a case where ΔYa2<devB5≦ΔYa2×2, the light emitting element B3 or C1 is used as the sub light source for correcting the deviation devB5. In a case where ΔYa2×2<devB5≦ΔYa2×3, the light emitting element B2 or C2 is used as the sub light source for correcting the deviation devB5.

Figure 23A:
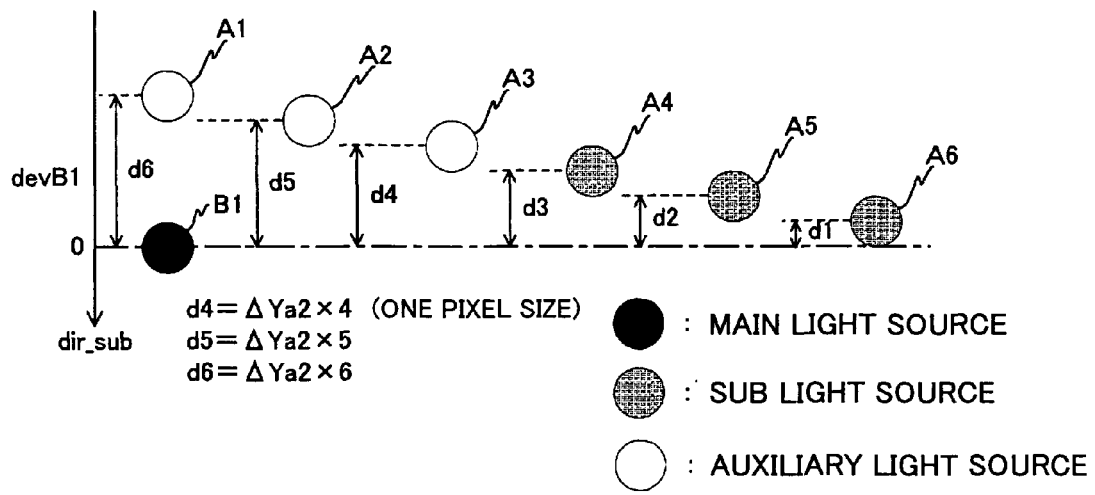
FIGS. 23A and 23B are diagrams showing sub light sources and auxiliary light sources to be used according to the amount of positional deviation in the sub scanning direction of a main pixel in other exemplary cases.

FIG. 23A is a diagram showing sub light sources and auxiliary light sources to be used according to the positional deviation in the sub scanning direction of a main pixel formed by the light emitting element (main light source) B1. As is shown in this drawing, when a main pixel formed by the light emitting element B1 is deviated in the positive (+) sub scanning direction, and the deviation (referred to as devB1 hereinafter) is no more than ΔYa2, the light emitting element B6 is used as a sub light source for correcting the deviation devB1. In a case where ΔYa2<devB1≦ΔYa2×2, the light emitting element A5 is used as the sub light source for correcting the deviation devB1. In a case where ΔYa2×2<devB1≦ΔYa2×3, the light emitting element A4 is used as the sub light source for correcting the deviation devB1. In a case where ΔYa2×3<devB1≦ΔYa2×4, the light emitting element A3 is used as an auxiliary light source for correcting the deviation devB1. In a case where ΔYa2×4<devB1≦ΔYa2×5, the light emitting element A2 is used as the auxiliary light source for correcting the deviation devB1. In a case where ΔYa2×5<devB1≦ΔYa2×6, the light emitting element A1 is used as the auxiliary light source for correcting the deviation devB1.

Figure 23B:
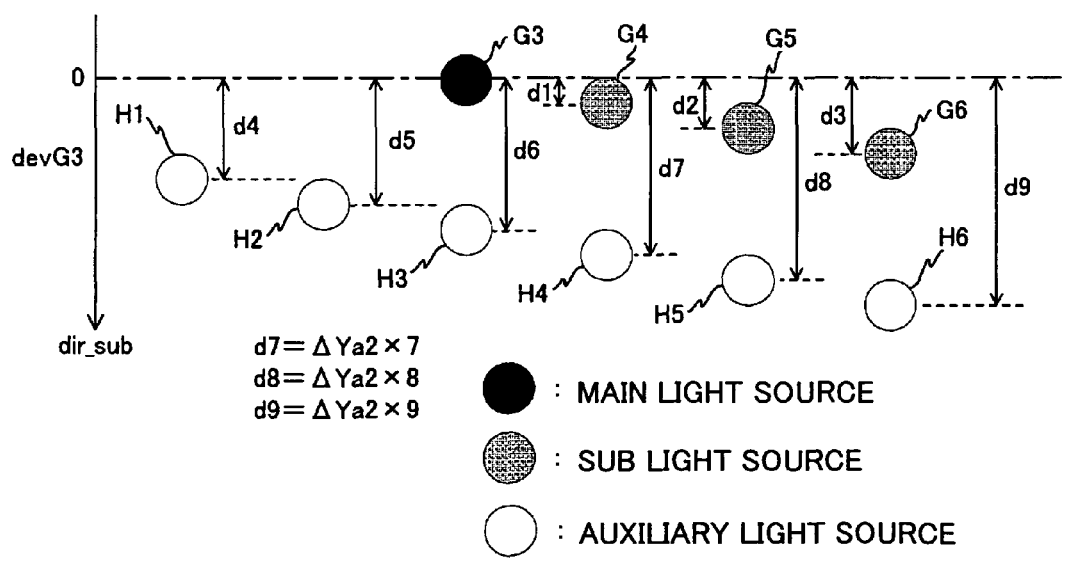

FIG. 23B is a diagram showing sub light sources and auxiliary light sources to be used according to the positional deviation in the sub scanning direction of a main pixel formed by the light emitting element (main light source) G3. As is shown in this drawing, when a main pixel formed by the light emitting element G3 is deviated in the negative (−) sub scanning direction, and the deviation (referred to as devG3 hereinafter) is no more than ΔYa2, the light emitting element G4 is used as a sub light source for correcting the deviation devG3. In a case where ΔYa2<devG3≦ΔYa2×2, the light emitting element G5 is used as the sub light source for correcting the deviation devG3. In a case where ΔYa2×2<devG3≦ΔYa2×3, the light emitting element G6 is used as the sub light source for correcting the deviation devG3. In a case where ΔYa2×3<devG3≦ΔYa2×4, the light emitting element H1 is used as an auxiliary light source for correcting the deviation devG3. In a case where ΔYa2×4<devG3≦ΔYa2×5, the light emitting element H2 is used as the auxiliary light source for correcting the deviation devG3. In a case where ΔYa2×5<devG3≦ΔYa2×6, the light emitting element H3 is used as the auxiliary light source for correcting the deviation devG3. In a case where ΔYa2×6<devG3≦ΔYa2×7, the light emitting element H4 is used as the auxiliary light source for correcting the deviation devG3. In a case where ΔYa2×7<devG3≦ΔYa2×8, the light emitting element H5 is used as the auxiliary light source for correcting the deviation devG3.

In a case where $\Delta Ya2 \times 8 < devG3 \leq \Delta Ya2 \times 9$, the light emitting element H6 is used as the auxiliary light source for correcting the deviation devG3.

Figure 19:
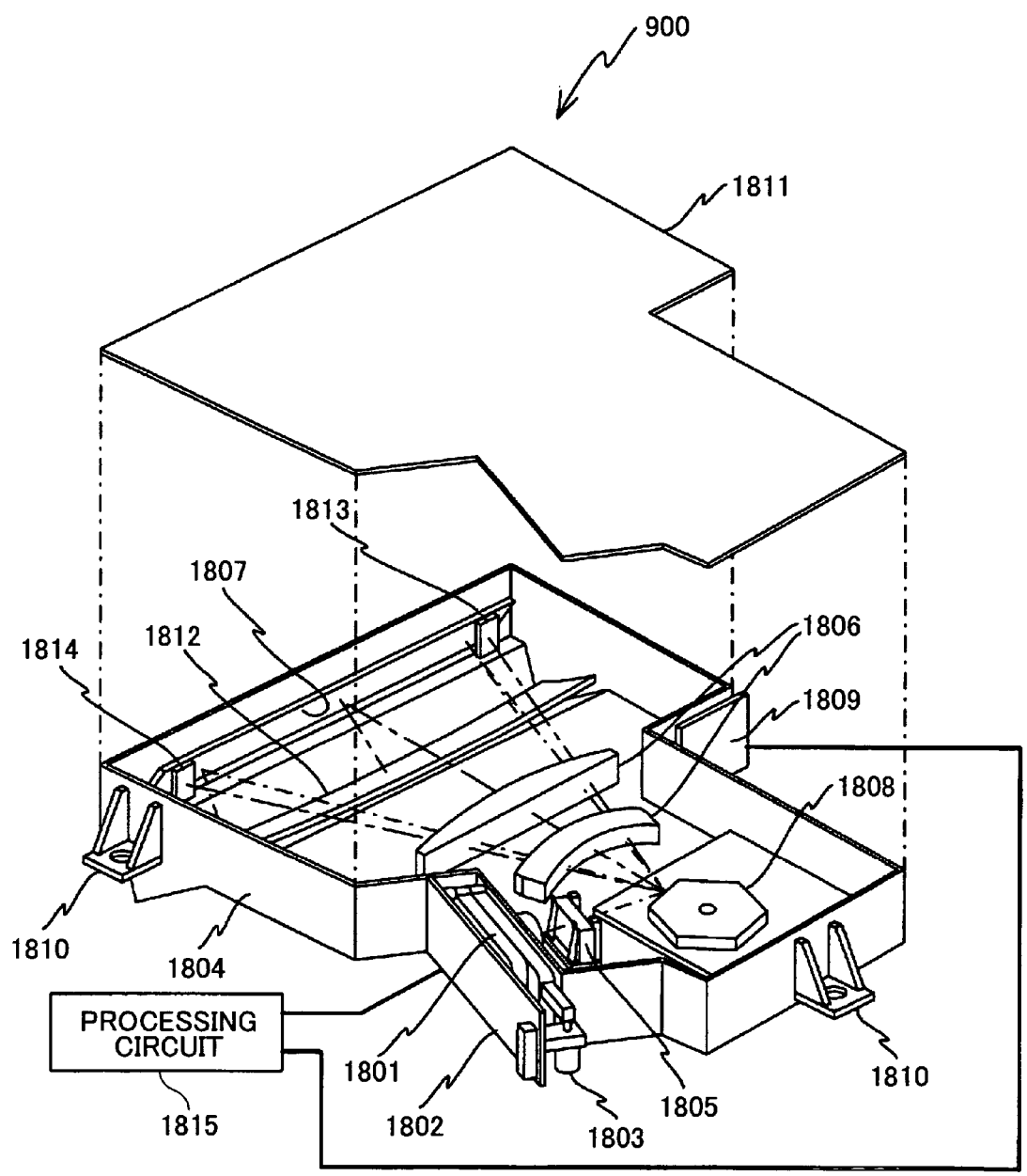
FIG. 19 is a diagram showing another exemplary configuration of the optical scanning apparatus included in the laser printer of FIG. 2 according to a second embodiment of the present invention.

Referring back to FIG. 19, the light source unit 1801 with the printed substrate 1802 attached to its rear face is held in contact with a side wall of an optical housing 1804 by a spring (not shown). The contacting position of the light source unit 1801 with respect to the side wall of the housing 1804 may be adjusted by an adjustment screw 1803. In this way, the direction of light irradiated from the light source unit 1801 may be adjusted. The adjustment screw 1803 is screwed to a protruding portion arranged at the side wall of the optical housing 1804. As is shown in FIG. 20, the collimating lens CL, the cylinder lens 1805, the polygon mirror 1808, the polygon mirror motor (not shown), the fθ lens 1806, the retro-reflection mirror 1807, the toroidal lens 1812, and the two light receiving elements 1813 and 1814 are arranged at predetermined positions within the optical housing 1804. The printed substrate 1809 is arranged at the outer side of the optical housing 1804. The upper portion of the optical housing 1804 is sealed by a cover 1811. The optical housing 1804 has plural attachment portions 1810 protruding from its side walls which attachment portions 1810 are fixed to a frame member of the laser printer 100 by screws.

The collimating lens CL is configured to arrange the light emitted from the light source unit 1801 to be substantially parallel. The cylinder lens 1805 is configured to rectify the light from the collimating lens CL.

In the following, operations of the scanning optical system are described. First, light emitted from the light source unit 1801 is focused near a deflection surface of the polygon mirror 1808 via the collimating lens CL and the cylinder lens 1805. The polygon mirror 1808 is rotated by the polygon mirror motor (not shown) at a predetermined speed in the direction of the arrow B shown in FIG. 20. The light focused near the deflection surface of the polygon mirror 1808 is deflected at a constant angular velocity with respect to the rotation of the polygon mirror 1808. The light deflected by the polygon mirror 1808 is incident on the retro-reflection mirror 1807 via the fθ lens 1806 and reflected by the retro-reflection mirror 1807 to scan the surface of the photoconductor drum 901 in the main scanning direction via the toroidal lens 1812. It is noted that in the following descriptions, one scanning operation from a scanning start position to a scanning end position in the main scanning direction may be referred to as one-line scanning.

The two light receiving elements 1813 and 1814 are arranged at the main scanning direction side edges of the retro-reflection mirror 1807 to detect the start and end of a one-line scanning operation, respectively. In the present example, the light receiving elements 1813 and 1814 are arranged such that light deflected by the polygon mirror 1808 for realizing one-line scanning is incident on the light receiving element 1813 before being incident on the surface of the photoconductor drum 901, and incident on the light receiving element 1814 after the one-line scanning operation is completed. The light receiving elements 1813 and 1814 are configured to output signals (photo-electric converted signals) according to the amount of received light.

Figure 24:
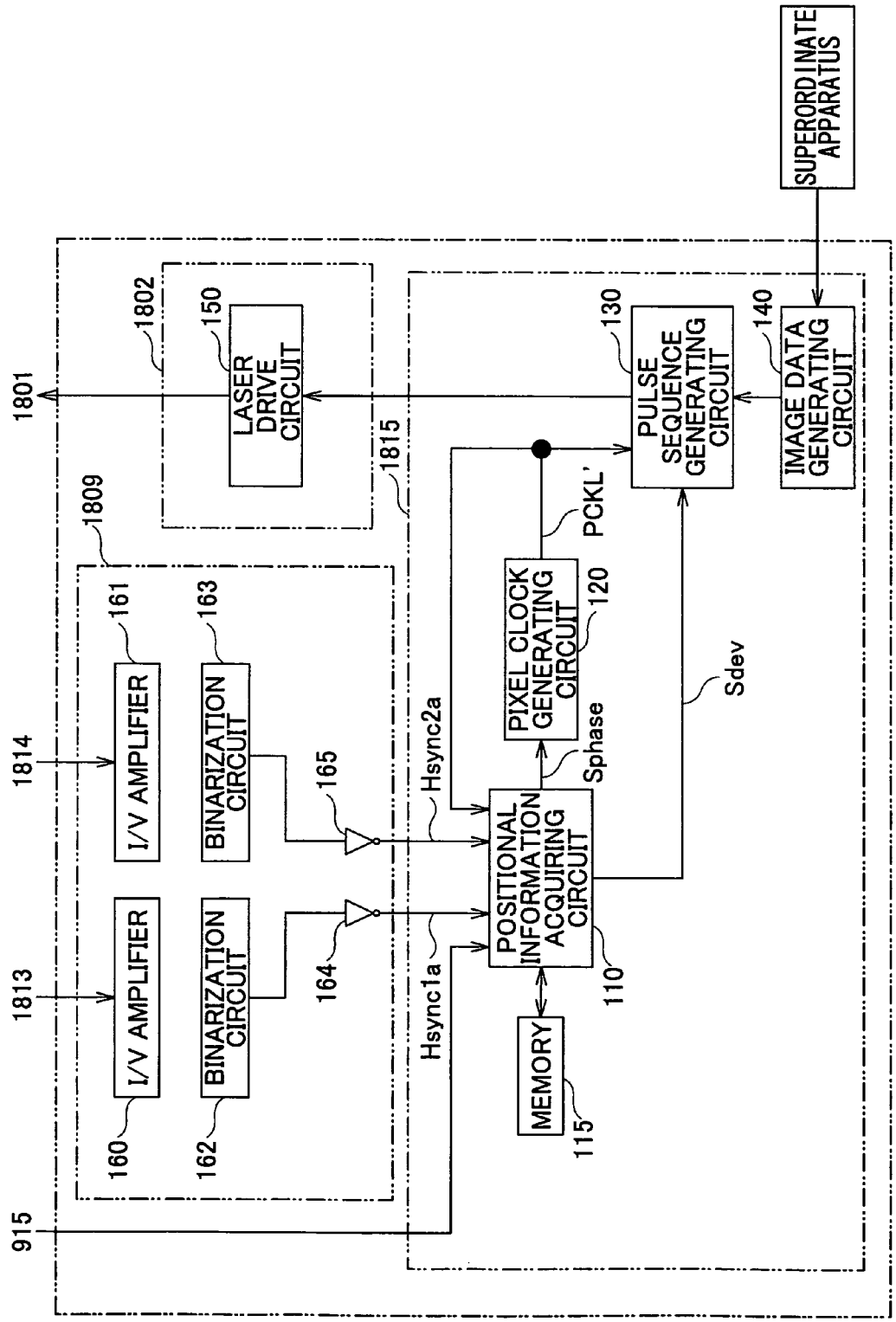
FIG. 24 is a block diagram showing circuits included in printed substrates and a processing circuit of the optical scanning apparatus according to the second embodiment.
Figure 26A:
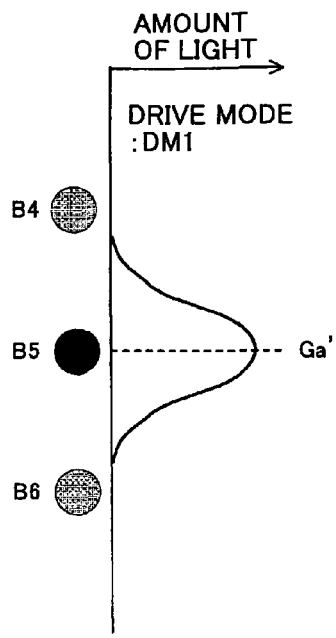
FIGS. 26A-26F are diagrams showing the different types of drive modes for correcting sub scanning direction deviations in the negative side.
Figure 26B:
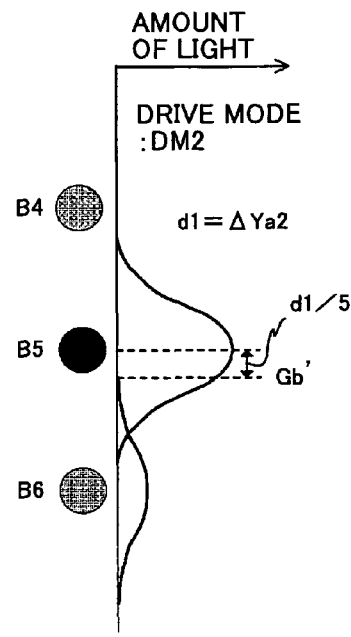
Figure 26C:
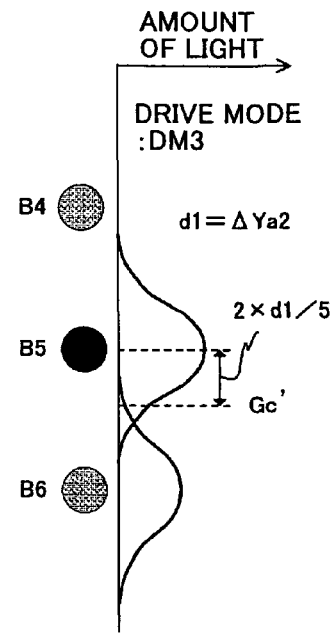
Figure 26D:
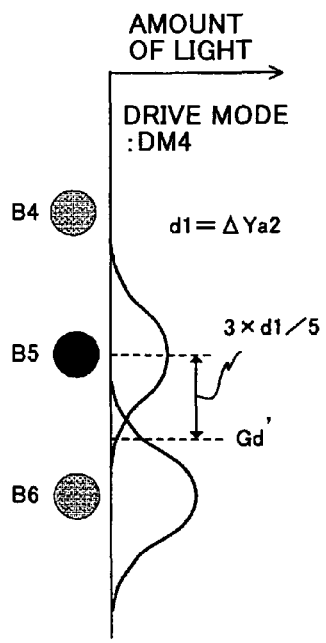
Figure 26E:
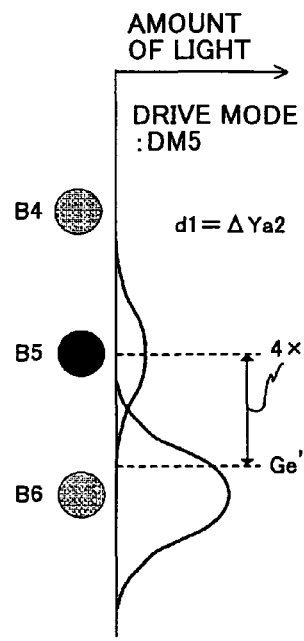
Figure 26F:
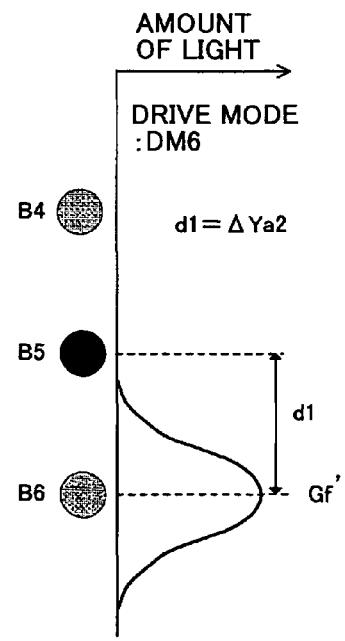
Figure 27A:
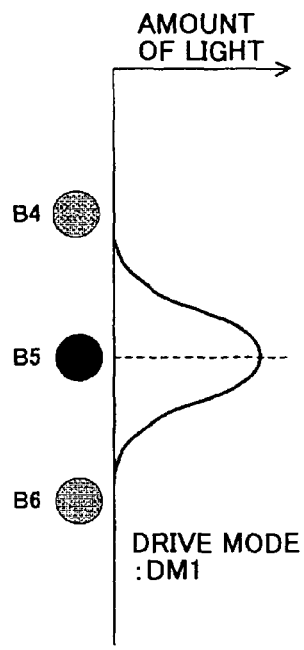
FIGS. 27A-27F are diagrams showing the different types of drive modes for correcting sub scanning direction deviations in the positive side.
Figure 27B:
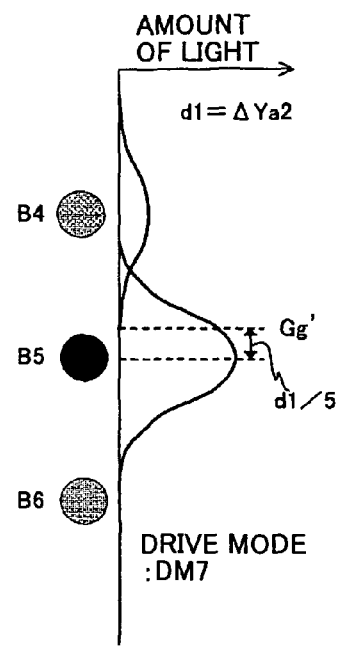
Figure 27C:
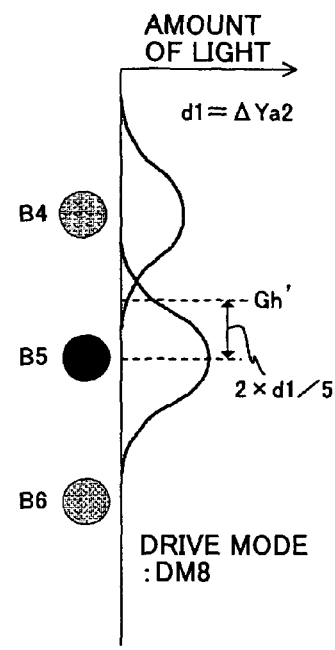
Figure 27D:
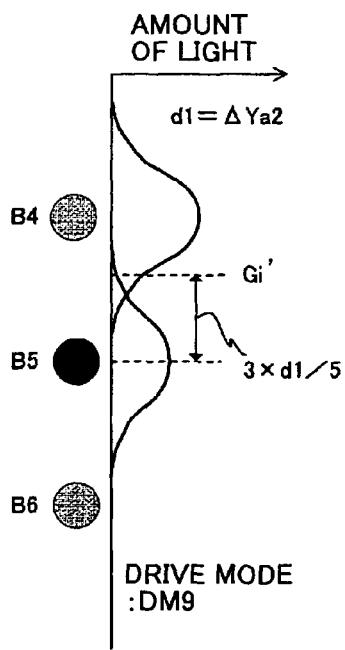
Figure 27E:
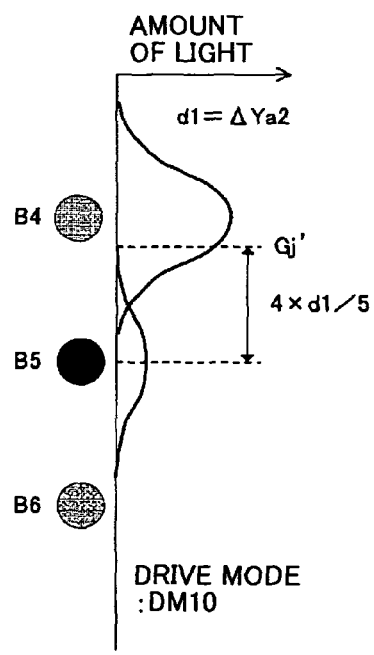
Figure 27F:
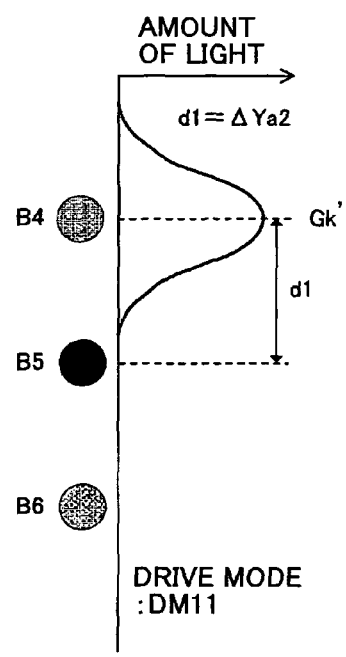

FIG. 24 is a block diagram showing circuits included in the printed substrates 1802, 1809, and the processing circuit 1815. As is shown in this drawing, the printed substrate 1809 includes two I/V amplifiers 160 and 161, two binarization circuits 162 and 163, and two inverters 164 and 165, for example.

The I/V amplifier 160 is configured to convert a photo-electric converted signal from the light receiving element 1813 into a voltage signal and amplify the voltage signal with a predetermined gain. The I/V amplifier 161 is configured to convert a photo-electric converted signal from the light receiving element 1814 into a voltage signal and amplify the voltage signal with a predetermined gain.

The binarization circuit 162 is configured to binarize the output signal of the I/V amplifier 160. The binarization circuit 163 is configured to binarize the output signal of the I/V amplifier 161.

The inverter 164 is configured to invert the output signal of the binarization circuit 162 and output a first horizontal synchronized signal Hsync1a. The inverter 165 is configured to invert the output signal of the binarization circuit 163, and output a second horizontal synchronized signal Hsync2a. When light is incident on the light receiving element 1813, the first horizontal synchronized signal Hsync1a changes from 'H (high level)' to 'L (low level)'. When light is incident on the light receiving element 1814, the second horizontal synchronized signal Hsync2a changes from 'H' to 'L'.

The printed substrate 802 includes a laser drive circuit 150 that is configured to generate a drive signal for the semiconductor laser LDa based on a pulse signal (control signal) from the processing circuit 1815, and output the generated drive signal to the light source unit 1801. In turn, the light source unit 1801 supplies the drive signal to the semiconductor laser LDa.

The processing circuit 1815 includes a positional deviation information acquiring circuit 110, a pixel clock generating circuit 120, a pulse sequence generating circuit 130, an image data generating circuit 140, and a memory 115, for example.

The positional deviation information acquiring circuit 110 is configured to acquire main scanning direction deviation information based on the first horizontal synchronized signal Hsync1a and the second horizontal synchronized signal Hsync2a, and sub scanning direction deviation information based on an output signal of the pixel position detector 915.

In the present example, the positional deviation information acquiring circuit 110 is configured to acquire main scanning direction deviation information based on a difference between the scanning time for one-line scanning that is calculated from the first horizontal synchronized signal Hsync1a and the second horizontal synchronized signal Hsync2a (simply referred to as 'scanning time' hereinafter) and a scanning reference time that is set beforehand (the difference being referred to as 'scanning time difference' hereinafter), and generate phase data Sphase by referring to a main scanning direction deviation correction information table that is stored in the memory 115. The generated phase data Sphase are output to the pixel clock generating circuit 20.

In the present example, main scanning direction deviations of pixels according to various scanning time differences are measured beforehand through tests, for example, and a map indicating the relationship between each of the scanning time differences and the pixel subject to phase change and the amount of phase change to be made is generated based on the measurement results, and the map for the scanning time differences is stored in the memory 115 as the main scanning direction deviation correction information table.

Also, in the present example, the positional deviation information acquiring circuit 10 acquires sub scanning direction deviation information from output signals of the pixel position detector 915 pertaining to scanning results of test scanning that is performed beforehand, and stores the acquired information as a sub scanning direction deviation information table in the memory 115. Thus, in the case of performing an actual scanning operation, the sub scanning direction deviation information table may be referenced to output a correction signal Sdev for correcting the sub scanning direction deviation to the pulse sequence generating circuit 30. Specifically, the correction signal Sdev may be configured to shift light emitted from the light source unit 1801 in a direction opposite the direction of the sub scanning direction deviation of this light by a distance corresponding to the amount of the sub scanning direction deviation of this light, for example.

In the following, the correction signal Sdev is described in detail with reference to FIGS. 25A-27F. It is noted that the drawings illustrate a specific example in which the amount of sub scanning direction deviation devB5 of a main pixel formed by the light emitting element B5 is no more than ΔYa2, and the light emitting elements B4 or B6 is used as a sub light source for correcting the deviation devB5. Further, in the specific example illustrated below, eleven types of drive modes (DM1-DM11) as is shown in FIGS. 25A and 25B are used for correcting the sub scanning direction deviation of emitted light.

The drive mode DM1 is used for a pixel with no sub scanning direction deviation (i.e., when the sub scanning direction deviation of the pixel is 0), and according to this drive mode DM1, only the light emitting element B5 is driven for a normal pulse width (referred to as 'Ts'). It is noted that the center of gravity of emitted light in this case (see Ga' of FIG. 26A) substantially corresponds to the light emitting point of the light emitting element B5. In other words, the pixel position is not shifted in this case.

The drive mode DM2 is used for a pixel with a sub scanning direction deviation of $-d\frac{1}{5}$, and according to this drive pattern DM2, the light emitting element B5 is driven for a pulse width of $(\frac{4}{5})$ Ts, and the light emitting element B6 is driven for a pulse width of $(\frac{1}{5})$ Ts. The center of gravity of emitted light in this case (see Gb' of FIG. 26B) is deviated toward the +dir_sub side by a distance $d\frac{1}{5}$ with respect to Ga'. In other words, the pixel position is shifted in the sub scanning direction by $+d\frac{1}{5}$ in this case. It is noted that in this example, d1=ΔYa2.

The drive mode DM3 is used for a pixel with a sub scanning direction deviation of $-2 \times d\frac{1}{5}$, and according to this drive mode DM3, the light emitting element B5 is driven for a pulse width of $(\frac{3}{5})$ Ts, and the light emitting element B6 is driven for a pulse width of $(\frac{2}{5})$ Ts. The center of gravity of emitted light in this case (see Gc' of FIG. 26C) is deviated toward the +dir_sub side by a distance of $2 \times d\frac{1}{5}$ with respect to Ga'. In other words, the pixel position is shifted in the sub scanning direction by $+2 \times d\frac{1}{5}$ in this case.

The drive mode DM4 is used for a pixel with a sub scanning direction deviation of $-3 \times d\frac{1}{5}$, and according to this drive mode DM4, the light emitting element B5 is driven for a pulse width of $(\frac{2}{5})$ Ts, and the light emitting element B6 is driven for a pulse width of $(\frac{3}{5})$ Ts. The center of gravity of emitted light in this case (see Gd' of FIG. 26D) is deviated toward the +dir_sub side by a distance of $3 \times d\frac{1}{5}$ with respect to Ga'. In other words, the pixel position is shifted in the sub scanning direction by $+3 \times d\frac{1}{5}$ in this case.

The drive mode DM5 is used for a pixel with a sub scanning direction deviation of $-4 \times d\frac{1}{5}$, and according to this drive mode DM5, the light emitting element B5 is driven for a pulse width of $(\frac{1}{5})$ Ts, and the light emitting element B6 is driven for a pulse width of $(\frac{4}{5})$ Ts. The center of gravity of emitted light in this case (see Ge' of FIG. 26E) is deviated toward the +dir_sub side by a distance of $4 \times d\frac{1}{5}$ with respect to Ga'. In other words, the pixel position is shifted in the sub scanning direction by $+4 \times d\frac{1}{5}$ in this case.

The drive mode DM6 is used for a pixel with a sub scanning direction deviation of −d1, and according to this drive mode DM6, only the light emitting element B6 is driven for a pulse width of Ts. The center of gravity of emitted light in this case (see Gf' of FIG. 26F) substantially corresponds to the light emitting point of the light emitting element B6, and is deviated toward the +dir_sub side with respect to Ga' by a distance of d1. In other words, the pixel position is shifted in the sub scanning direction by +d1 in this case.

The drive mode DM7 is used for a pixel with a sub scanning direction deviation of $+d\frac{1}{5}$, and according to this drive mode DM7, the light emitting element B5 is driven for a pulse width of $(\frac{4}{5})$ Ts, and the light emitting element B4 is driven for a pulse width of $(\frac{1}{5})$ Ts. The center of gravity of emitted light in this case (see Gg' of FIG. 27B) is deviated toward the −dir_sub side by a distance of $d\frac{1}{5}$ with respect to Ga'. In other words, the pixel position is shifted in the sub scanning direction by $-d\frac{1}{5}$ in this case.

The drive mode DM8 is used for a pixel with a sub scanning direction deviation of $+2 \times d\frac{1}{5}$, and according to this drive mode DM8, the light emitting element B5 is driven for a pulse width of $(\frac{3}{5})$ Ts, and the light emitting element B4 is driven for a pulse width of $(\frac{2}{5})$ Ts. The center of gravity of emitted light in this case (see Gh' of FIG. 27C) is deviated toward the −dir_sub side by a distance of $2 \times d\frac{1}{5}$ with respect to Ga'. In other words, the pixel position is shifted in the sub scanning direction by $-2 \times d\frac{1}{5}$ in this case.

The drive mode DM9 is used for a pixel with a sub scanning direction deviation of $+3 \times d\frac{1}{5}$, and according to this drive mode DM9, the light emitting element B5 is driven for a pulse width of $(\frac{2}{5})$ Ts, and the light emitting element B4 is driven for a pulse width of $(\frac{3}{5})$ Ts. The center of gravity of emitted light in this case (see Gi' of FIG. 27D) is deviated toward the −dir_sub side by a distance of $3 \times d\frac{1}{5}$ with respect to Ga'. In other words, the pixel position is shifted in the sub scanning direction by $-3 \times d\frac{1}{5}$ in this case.

The drive mode DM10 is used for a pixel with a sub scanning direction deviation of $+4 \times d\frac{1}{5}$, and according to this drive mode DM10, the light emitting element B5 is driven for a pulse width of $(\frac{1}{5})$ Ts, and the light emitting element B4 is driven for a pulse width of $(\frac{4}{5})$ Ts. The center of gravity of emitted light in this case (see Gj' of FIG. 27E) is deviated toward the −dir_sub side by a distance of $4 \times d\frac{1}{5}$ with respect to Ga'. In other words, the pixel position is shifted in the sub scanning direction by $-4 \times d\frac{1}{5}$ in this case.

The drive mode DM11 is used for a pixel with a sub scanning direction deviation of +d1, and according to this drive mode DM11, only the light emitting element B4 is driven for a pulse width of Ts. The center of gravity of emitted light in this case (see Gk' of FIG. 27F) is deviated toward the −dir_sub side by a distance of d1 with respect to Ga'. In other words, the pixel position is shifted in the sub scanning direction by −d1 in this case.

It is noted that the correction signal may correspond to the drive modes as is described above in a case where the pulse sequence generating circuit 130 is capable of recognizing these drive modes. In another example, the correction signal may correspond to pulse width information for the respective light sources (light emitting elements). In this way, the amount of light emitted from the light source unit 1801 may be maintained constant while shifting the center of gravity of light emitted from the light source unit 1801 with respect to the direction dir_sub.

For example, when image information of a straight line as is shown in FIG. 28A is transmitted from a superordinate apparatus, and it is determined from a test scanning operation for acquiring positional deviation information that a non-linear latent image as is shown in FIG. 28B will be formed based on the line image information of FIG. 28A, appropriate drive modes may be selected for the respective pixels of the line image as is shown in FIG. 28C so that the pixels may be formed at their appropriate positions with respect to the sub scanning direction to thereby realize a latent image as is shown in FIG. 28D.

Referring back to FIG. 24, the pixel clock generating circuit 120 is configured to generate a pixel clock signal PCLK' with a partially different phase based on the phase data Sphase. In turn, the pixel clock signal PCLK' is supplied to the positional deviation information acquiring circuit 110 and the pulse sequence generating circuit 130.

The image data generating circuit 140 is configured to generate image data based on image information from the superordinate apparatus. In turn, the generated image data are output to the pulse sequence generating circuit 130.

The pulse sequence generating circuit 130 is configured to generate a pulse sequence signal based on the image data, the correction signal Sdev, and the pixel clock signal PCLK'.

FIGS. 29A and 29B illustrate an exemplary case in which sub scanning direction deviations of pixels of an image to be formed do not go beyond a predetermined permissible range. In this case, pixels corresponding to the image may be formed at their appropriate positions with main pixels and sub pixels do not have to be formed as is shown in FIG. 29A. Also, in this case, a pulse sequence signal for the light emitting element B5 is generated, but pulse sequence signals for the light emitting elements B4 and B6 are not generated as is shown in FIG. 29B. In other words, under normal circumstances (i.e., in a case where sub scanning direction deviation of a pixel is within the permissible range), only the main light sources are used. However, when the sub scanning direction deviation exceeds the permissible range to thereby require sub scanning direction deviation correction, the sub light sources and/or auxiliary light sources are used according to the amount and direction of the deviation, for example.

As can be appreciated from the above descriptions, in the optical scanning apparatus 900 according to the above-described embodiment of the present invention, the processing circuit 1815 comprises a signal generating circuit.

Also, according to the present embodiment, the charger 902, the developing roller 903, the toner cartridge 904, and the transfer roller 911 of the laser printer 100 comprise a transfer apparatus.

Also, in the optical scanning apparatus 900 according the present embodiment, when scanning light including image information from the light source unit 1801 on the photoconductor drum 901, drive signals for plural light sources arranged in the light source unit 1801 are generated by the processing circuit 1815 based on position information of a pixel to be formed by the scanning, the light source unit 1801 having plural light sources including main light sources, sub light sources, and auxiliary light sources. According to the present embodiment, when positional deviation with respect to the sub scanning direction that exceeds a predetermined permissible range occurs in the position of light from a main light source, and the amount of the positional deviation is less than the size of one pixel (single pixel size), a drive signal for at least one sub light source is generated for correcting the relevant positional deviation. When the amount of the positional deviation is greater than or equal to the size of one pixel, a drive signal for at least one auxiliary light source is generated for correcting the relevant positional deviation. In this way, sub scanning direction deviation of a pixel position may be corrected by scanning light emitted from plural light sources on the photoconductor drum 901.

According to one aspect of the present embodiment, plural sets of light emitted from a light source unit may be accurately scanned on a scanning object.

According to another aspect of the present embodiment, the distance with respect to the direction dir_sub between two main light sources that are juxtaposed to each other with respect to the direction dir_sub may be increased so that crosstalk may be reduced.

Also, the laser printer 100 according to the present embodiment includes the optical scanning apparatus 900 as is described above that is capable of accurately scanning plural sets of light on a scanning object so that it may generate a high quality image at high speed.

It is noted that in the above-described embodiment of the present invention, eleven different drive modes are used. However, the present invention is not limited to such an embodiment.

Also, it is noted that in the above-described embodiment of the present invention, the same number of drive modes are provided respectively for a case in which the sub scanning direction deviation of a pixel position is directed toward the positive side and a case in which the sub scanning direction deviation is directed toward the negative side. However, the present invention is not limited to such an embodiment, and a different number of drive modes may be provided for a case in which the sub scanning direction deviation is directed toward the positive side, and a case in which the sub scanning direction deviation is directed toward the negative side, in another embodiment.

Also, it is noted that in the above-described preferred embodiments of the present invention, the semiconductor laser LD and LDa correspond to the VCSEL (Vertical Cavity Surface Emitting Laser). However, the present invention is not limited to such an embodiment, and other types of coherent light sources having plural light emitting elements that are arranged into an array may be used including an edge emitting laser as well as a surface emitting laser such as the VCSEL (Vertical Cavity Surface Emitting Laser), for example.

Figure 30:
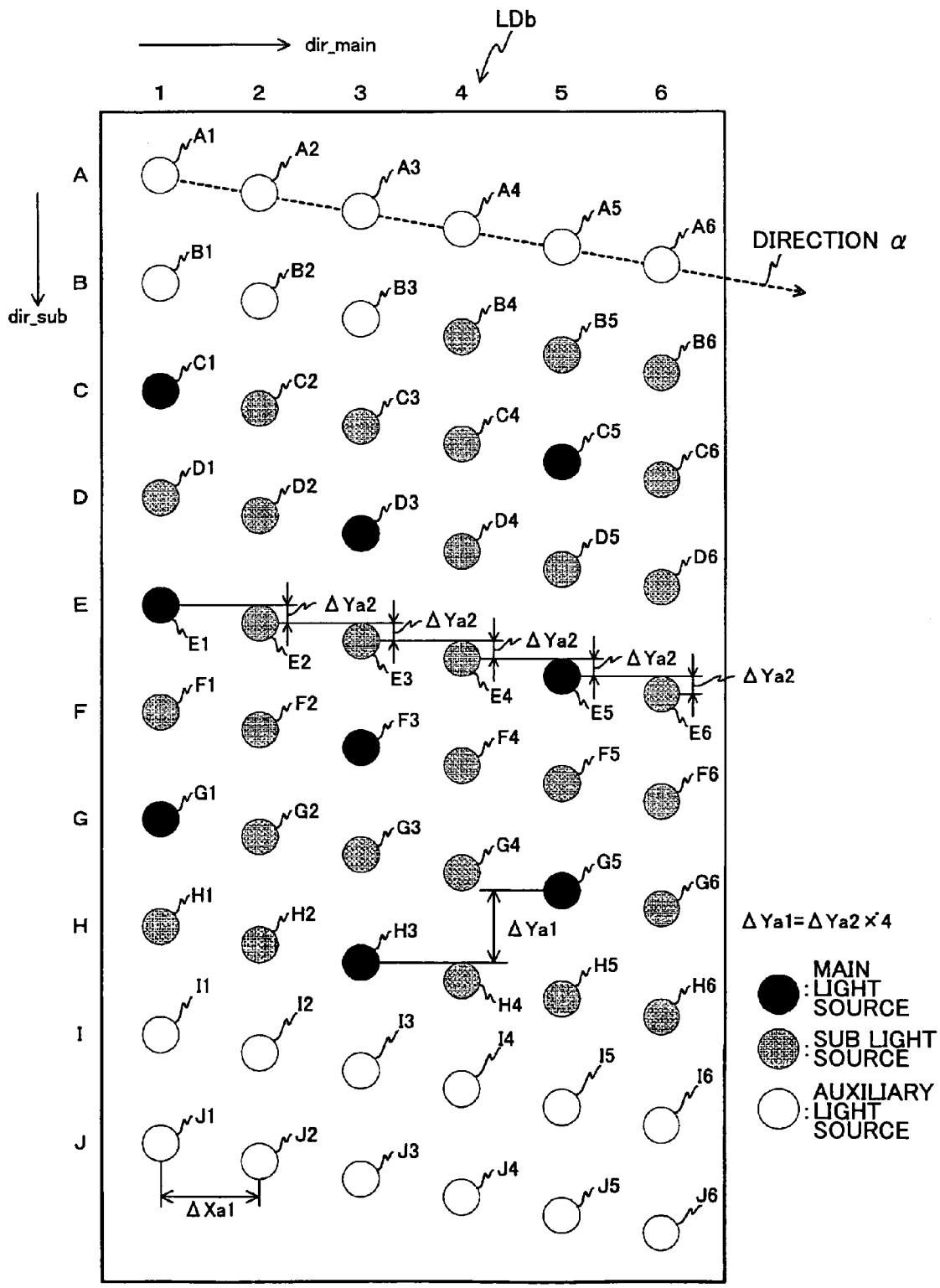
FIG. 30 is a diagram showing a first modified example of the semiconductor laser shown in FIG. 21.

In one embodiment, a semiconductor laser LDb as is shown in FIG. 30 may be used instead of the semiconductor laser LDa. The semiconductor laser LDb shown in FIG. 30 differs from the semiconductor laser LDa in that it includes additional auxiliary light sources. Accordingly, the semiconductor laser LDb may be capable of correcting sub a scanning direction deviation that is too large to be corrected by the auxiliary light sources of the semiconductor laser LDa, for example, in addition to realizing advantages similar to those realized by the semiconductor laser LDa as is described above.

Figure 31:
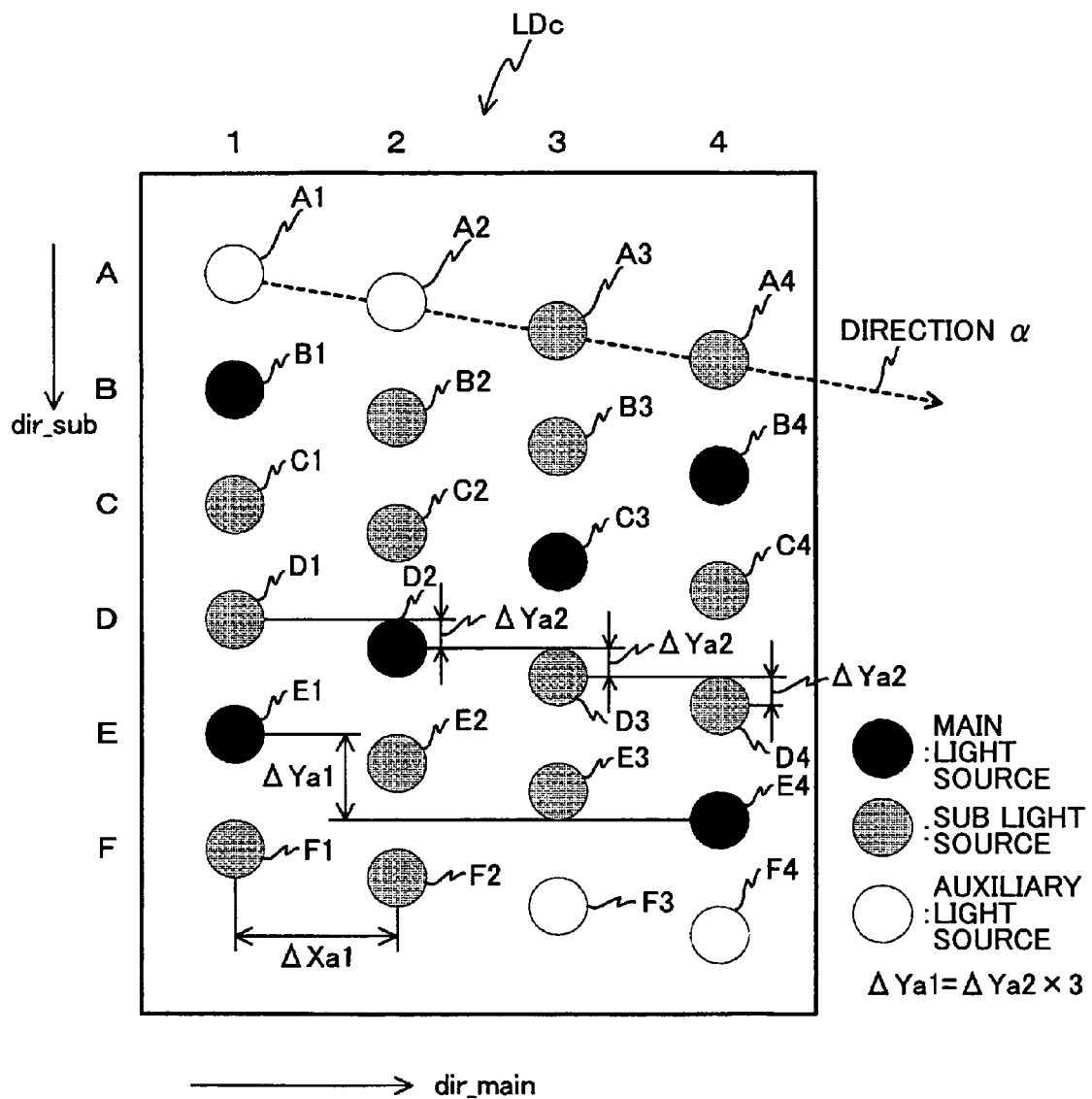
FIG. 31 is a diagram showing a second modified example of the semiconductor laser shown in FIG. 21.

In another embodiment, a semiconductor laser LDc as is shown in FIG. 31 may be used instead of the semiconductor laser LDa. The semiconductor laser LDc has two sub light sources arranged between two main light sources that are juxtapose to each other with respect to the direction dir_sub. Also, the semiconductor laser LDc has light emitting elements arranged into six rows extending in the direction α (i.e., rows A-F) and four lines extending in the direction dir_sub (i.e., lines 1-4). The semiconductor laser LDc having such a configuration may also realize advantages similar to those realized by the semiconductor laser LDa. It is noted that in the case where the semiconductor laser LDc is used, the resolution of pixels formed by the main light sources may be subdivided into three by the sub light sources so that when the resolution of the pixels formed by the main light sources is 1200 dpi, for example, the sub light sources may correct sub scanning direction deviations at an accuracy of 3600 dpi.

Figure 32:
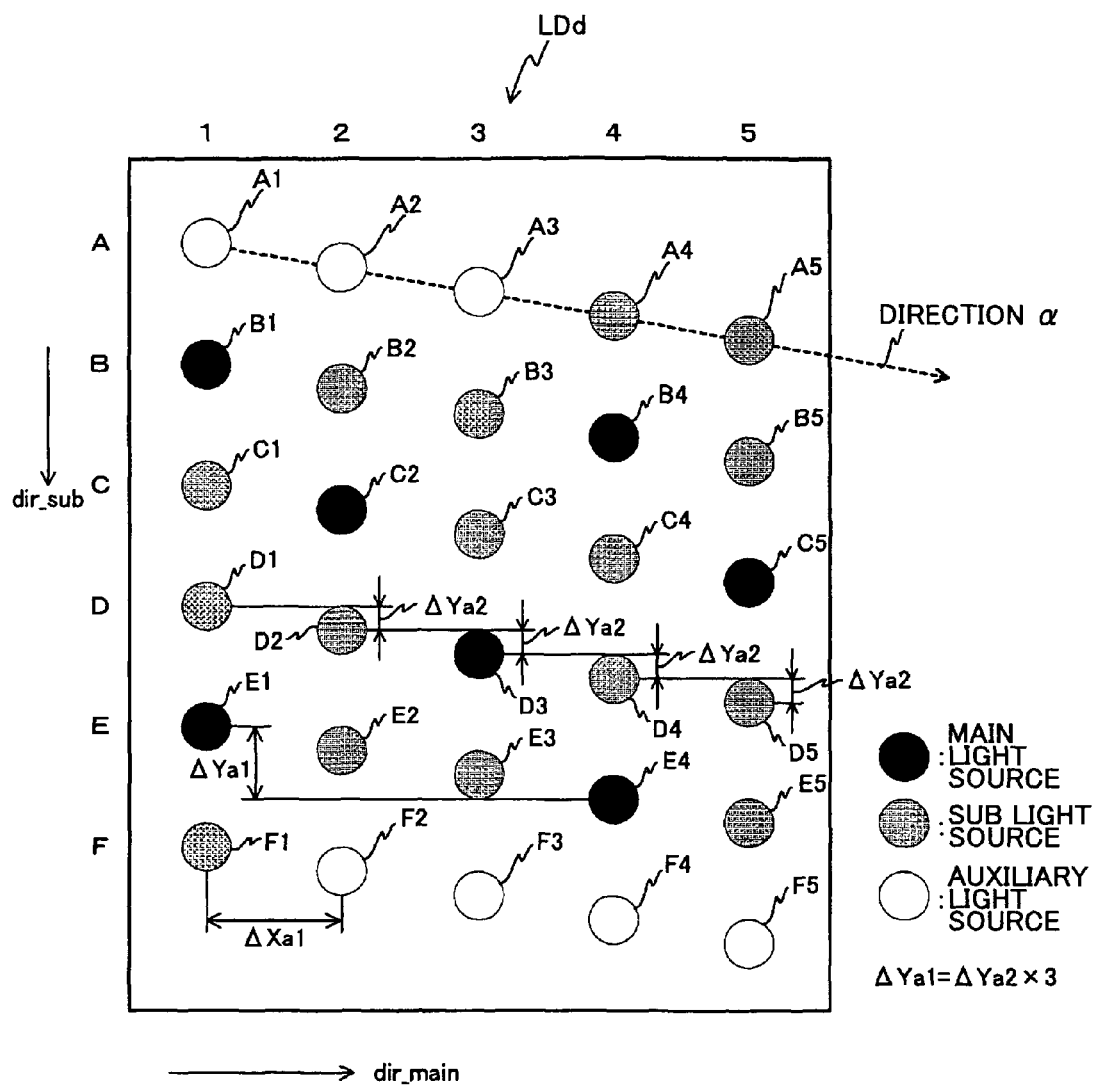
FIG. 32 is a diagram showing a third modified example of the semiconductor laser shown in FIG. 21.

In another embodiment, a semiconductor laser LDd as is shown in FIG. 32 may be used instead of the semiconductor laser LDa. The semiconductor laser LDd has two sub light sources arranged between two main light sources that are juxtapose to each other with respect to the direction dir_sub. Also, the semiconductor laser LDd has light emitting elements arranged into six rows extending in the direction α (i.e., rows A-F) and five lines extending in the direction dir_sub (i.e., lines 1-5). The semiconductor laser LDd having such a configuration may also realize advantages similar to those realized by the semiconductor laser LDa. It is noted that in the case where the semiconductor laser LDd is used, the resolution of pixels formed by the main light sources may be subdivided into three by the sub light sources so that when the resolution of the pixels formed by the main light sources is 1200 dpi, for example, the sub light sources may correct sub scanning direction deviations at an accuracy of 3600 dpi.

Figure 33:
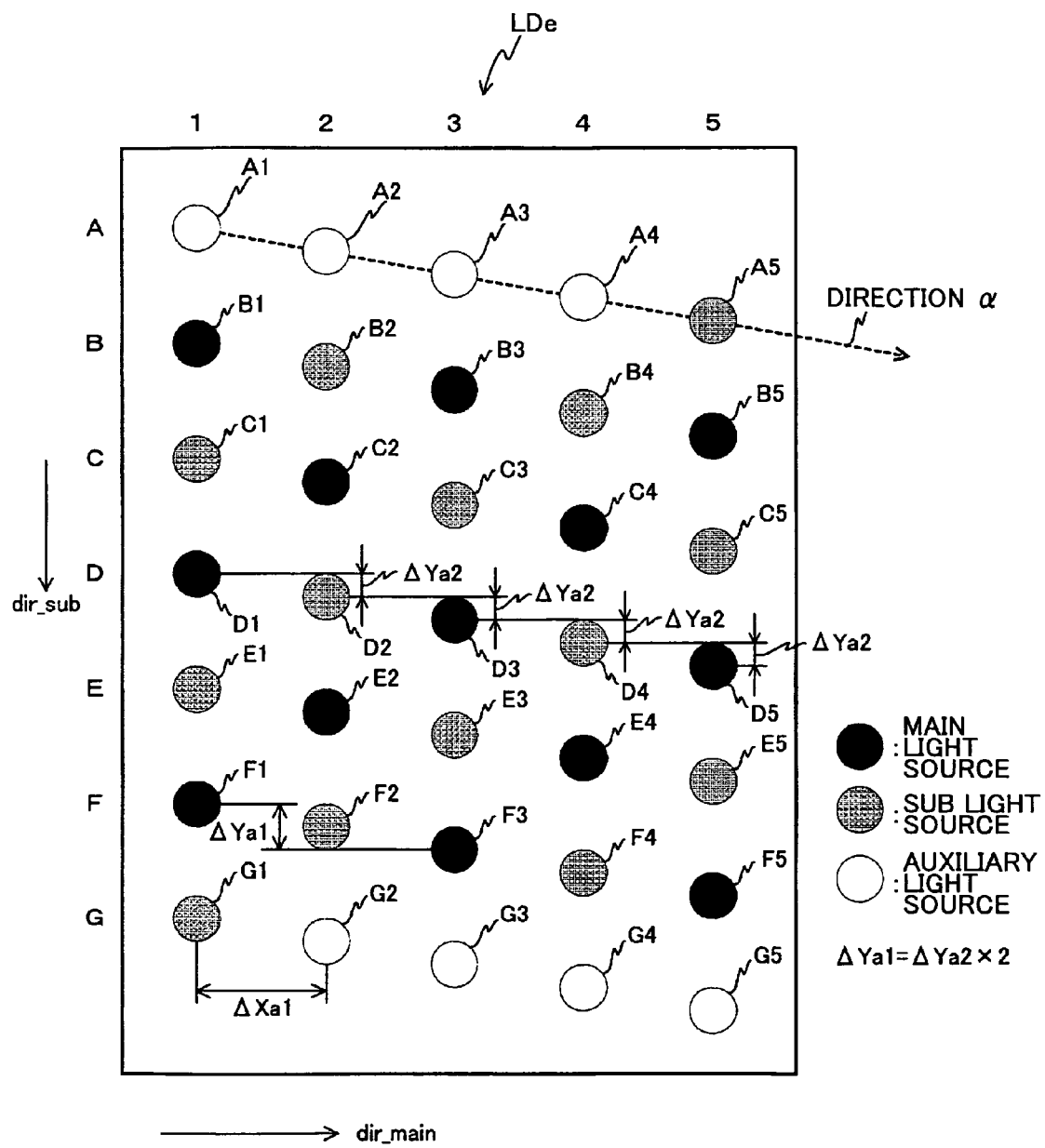
FIG. 33 is a diagram showing a fourth modified example of the semiconductor laser shown in FIG. 21.

In another embodiment, a semiconductor laser LDe as is shown in FIG. 33 may be used instead of the semiconductor laser LDa. The semiconductor laser LDe has one sub light source arranged between two main light sources that are juxtapose to each other with respect to the direction dir_sub. Also, the semiconductor laser LDe has light emitting elements arranged into seven rows extending in the direction α (i.e., rows A-G) and five lines extending in the direction dir_sub (i.e., lines 1-5). The semiconductor laser LDe having such a configuration may also realize advantages similar to those realized by the semiconductor laser LDa. It is noted that in the case where the semiconductor laser LDe is used, the resolution of pixels formed by the main light sources may be subdivided into two by the sub light sources so that when the resolution of the pixels formed by the main light sources is 1200 dpi, for example, the sub light sources may correct sub scanning direction deviations at an accuracy of 2400 dpi.

Figure 34:
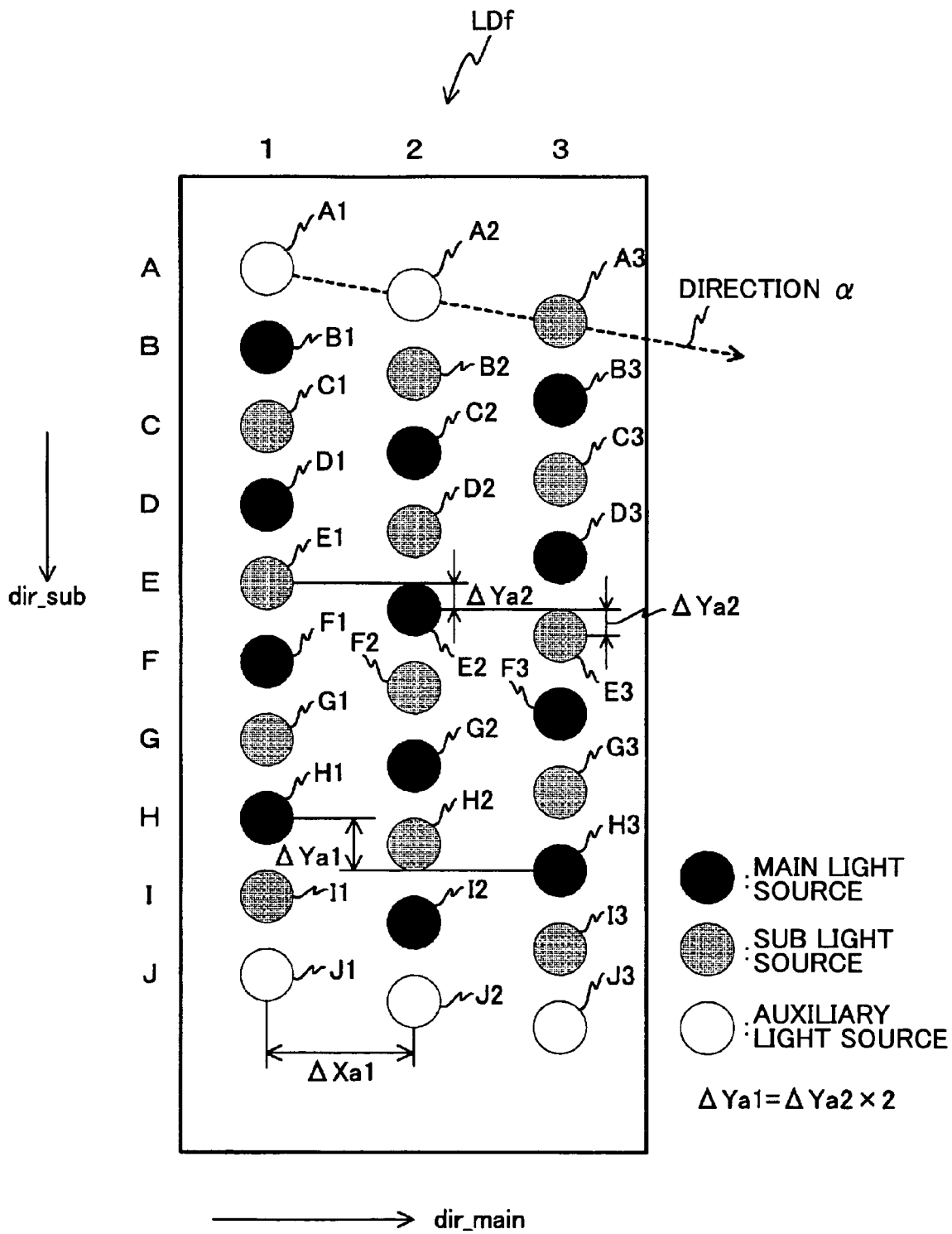
FIG. 34 is a diagram showing a fifth modified example of the semiconductor laser shown in FIG. 21.

In another embodiment, a semiconductor laser LDf as is shown in FIG. 34 may be used instead of the semiconductor laser LDa. The semiconductor laser LDf has one sub light source arranged between two main light sources that are juxtapose to each other with respect to the direction dir_sub. Also, the semiconductor laser LDf has light emitting elements arranged into ten rows extending in the direction a (i.e., rows A-J) and three lines extending in the direction dir_sub (i.e., lines 1-3). The semiconductor laser LDf having such a configuration may also realize advantages similar to those realized by the semiconductor laser LDa. It is noted that in the case where the semiconductor laser LDf is used, the resolution of pixels formed by the main light sources may be subdivided into two by the sub light sources so that when the resolution of the pixels formed by the main light sources is 1200 dpi, for example, the sub light sources may correct sub scanning direction deviations at an accuracy of 2400 dpi.

Figure 35:
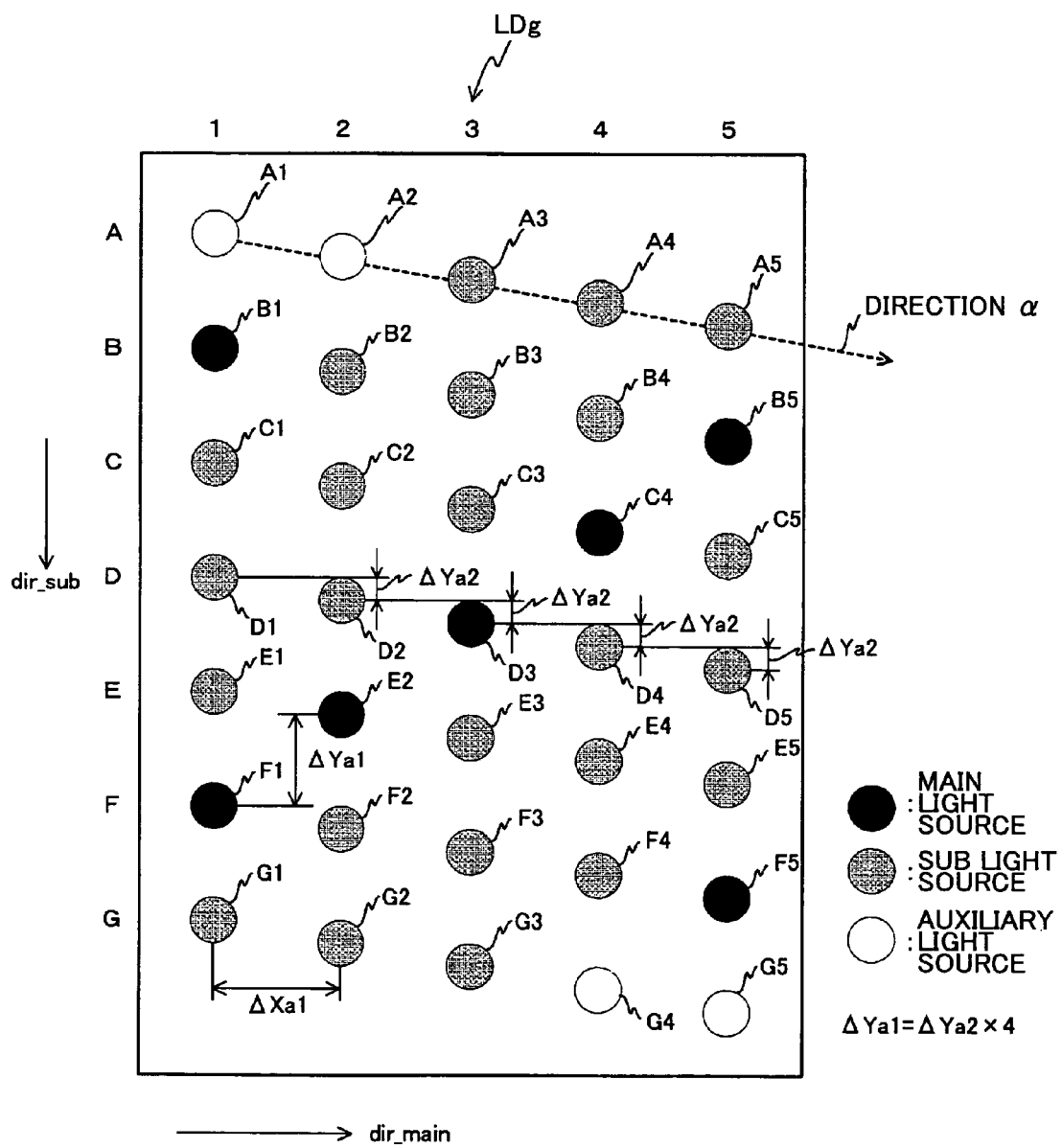
FIG. 35 is a diagram showing a sixth modified example of the semiconductor laser shown in FIG. 21.
Figure 36:
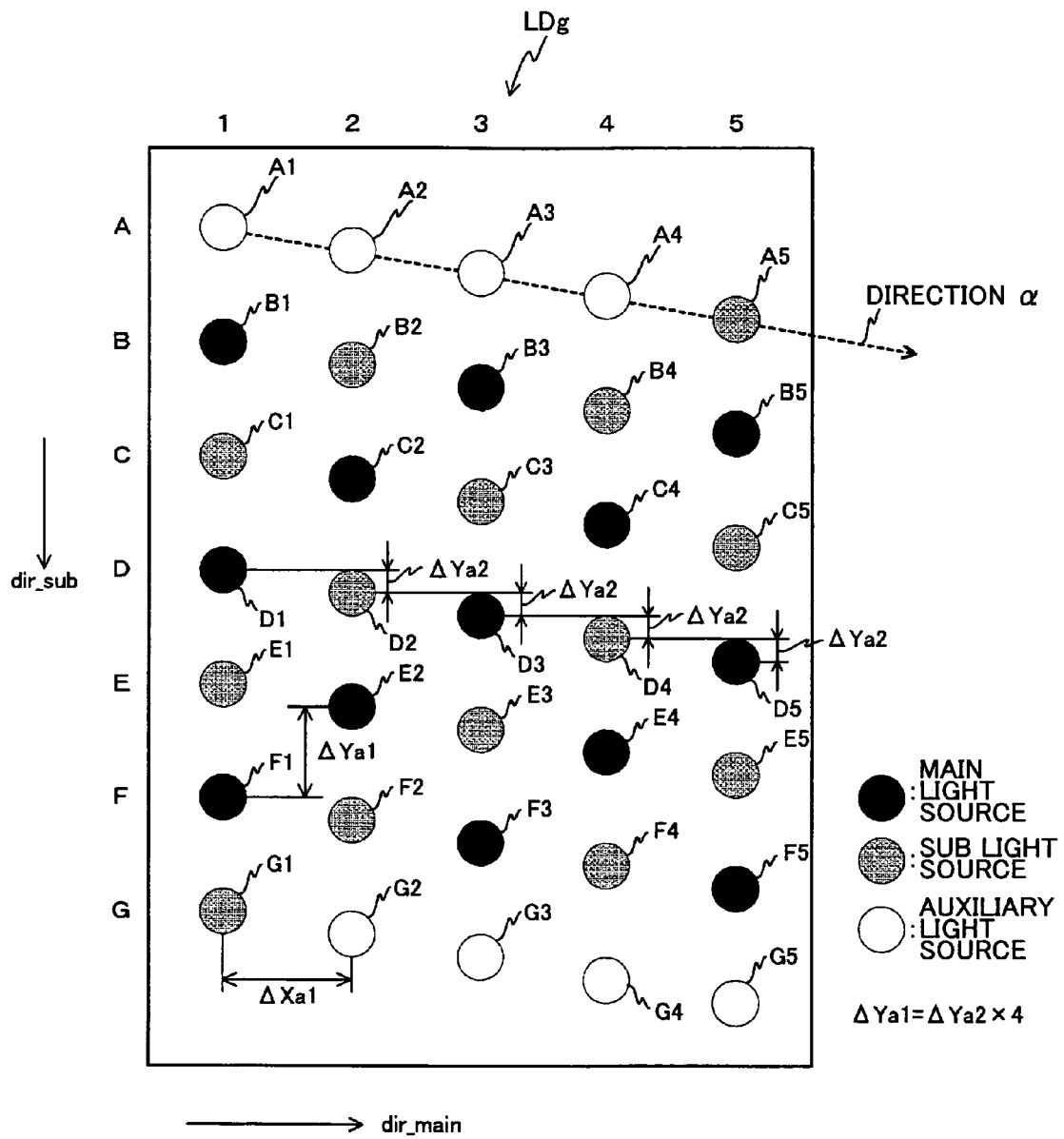
FIG. 36 is a diagram showing the semiconductor laser of FIG. 35 where some of the sub light sources are switched to function as main light sources.

In another embodiment, a semiconductor laser LDg as is shown in FIGS. 36 and 37 may be used instead of the semiconductor laser LDa. The semiconductor laser LDg may have three sub light sources arranged between two main light sources that are juxtapose to each other with respect to the direction dir_sub as is shown in FIG. 35. Also, the semiconductor laser LDg has light emitting elements arranged into seven rows extending in the direction α (i.e., rows A-G) and five lines extending in the direction dir_sub (i.e., lines 1-5). Further, the semiconductor laser LDg is configured to realize function switching of the light sources. Specifically, when the size of one pixel is reduced to half (½), the sub light source positioned in the middle of the three sub light sources arranged between two juxtaposed main light sources in FIG. 35 may be switched to a main light source as is shown in FIG. 36. For example, when the resolution in the sub scanning direction is 600 dpi in the case where the light emitting elements are arranged to have functions as is shown in FIG. 35, a resolution of 1200 dpi may be realized when the functions of the light emitting elements are switched to the functions shown in FIG. 36. As can be appreciated from the above descriptions, resolution switching may be realized by switching the functions of the light sources. It is noted that the function switching of the light sources may be performed by the processing circuit 1815, for example.

Figure 37A:
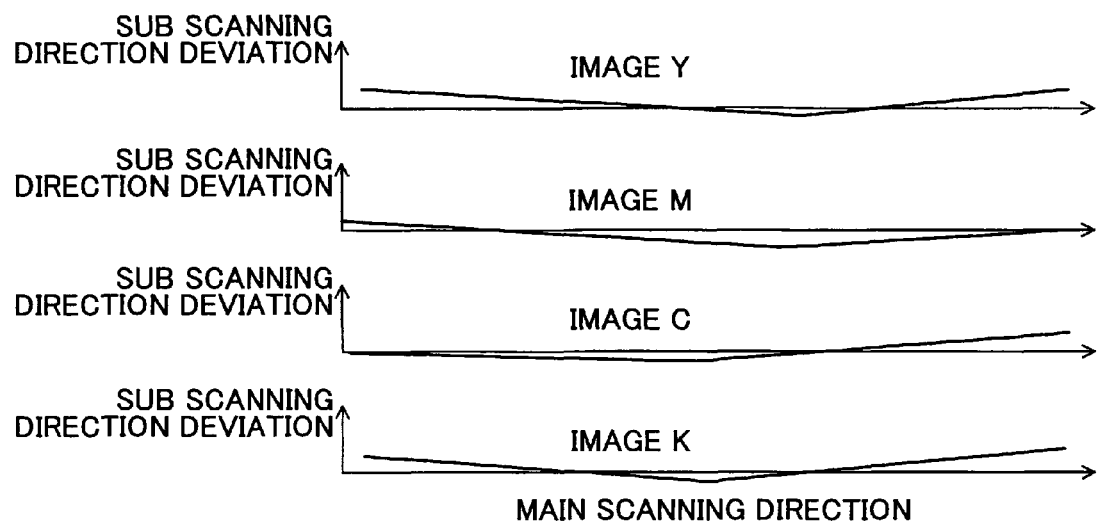
FIGS. 37A and 37B are diagrams illustrating an exemplary case of correcting sub scanning direction deviations for a color image.
Figure 37B:
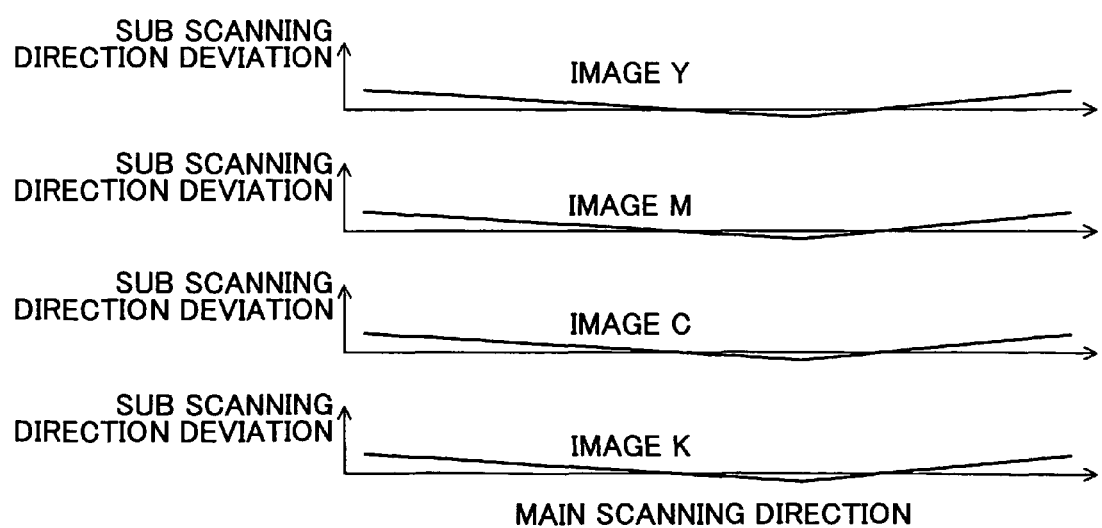

Also, it is noted that the present invention may be applied to an imaging apparatus that is configured to form a color image in which case an optical scanning apparatus of the present embodiment that is adapted for scanning a color image may be used to realize high quality color imaging. For example, when image information comprises yellow image information (referred to as 'Y image information' hereinafter), magenta image information (referred to as 'M image information' hereinafter), cyan image information (referred to as 'C image information' hereinafter), and black image information (referred to as 'K image information' hereinafter), the sub scanning direction deviation information table as described above may be provided for each color information, or the sub scanning direction deviation information table may be provided for color image information of a particular color (e.g., yellow). In the latter case, the sub scanning direction deviation information table for the particular color image information may be referred to for acquiring deviation information of the color image information other than the particular color image information, and the acquired deviation information may be directly used or the acquired deviation information may be converted according to a predetermined conversion scheme (e.g., using a conversion formula or a conversion table). In this example, the sub scanning direction deviations of the respective color image information may be arranged to be substantially identical as is illustrated in FIGS. 37A and 37B so that color drifts may be prevented. Also, the storage capacity of the memory storing the sub scanning direction deviation information table may be reduced. It is noted that in one example, plural light source groups (e.g., four in the present example) each including main light sources, sub light sources, and auxiliary light sources may be provided for the respective color image information.

Figure 38:
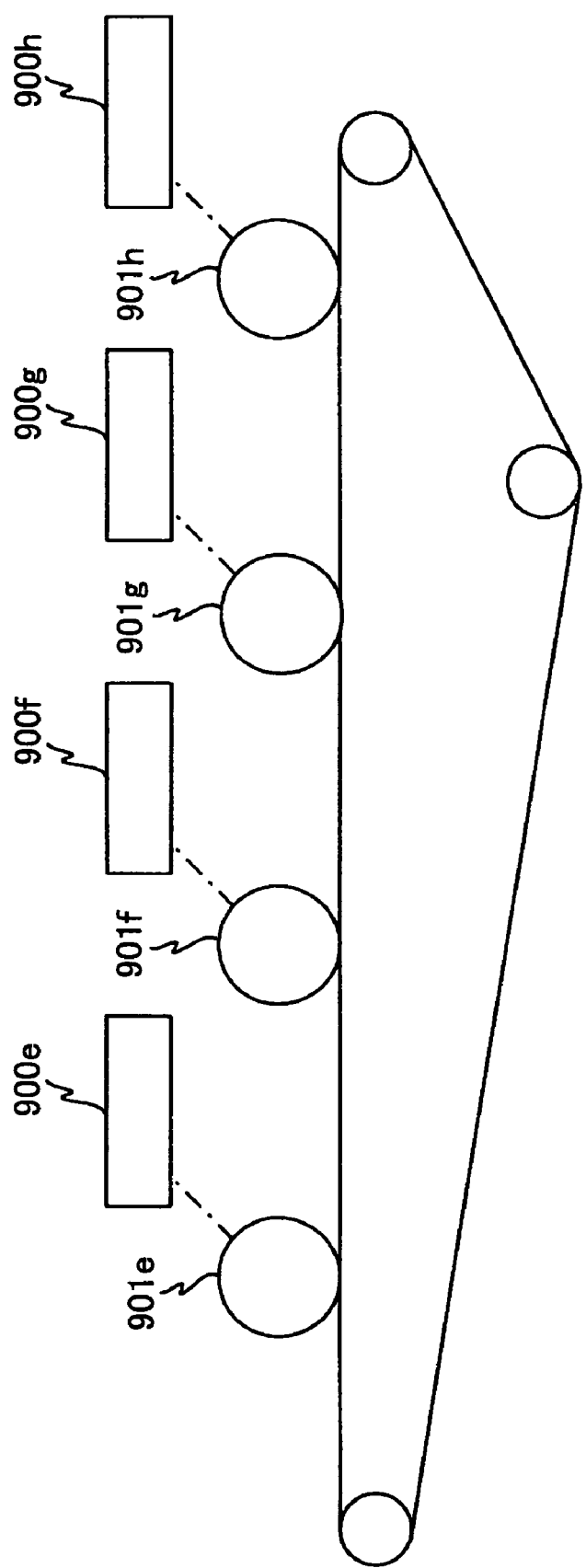
FIG. 38 is a diagram showing a configuration of a tandem color machine that uses the optical scanning apparatuses of second embodiment.

Also, an imaging apparatus according to an embodiment of the present invention may be a tandem color machine that includes a photoconductor drum directed for image information of each color. FIG. 38 is a diagram showing an exemplary configuration of a tandem color machine that includes plural optical scanning apparatuses according to the present embodiment as is described above. The tandem color machine shown in FIG. 38 includes an optical scanning apparatus 900e that is configured to form a latent image according to Y image information on a photoconductor drum 901e for Y image information, an optical scanning apparatus 900f that is configured to form a latent image according to M image information on a photoconductor drum 901f for M image information, an optical scanning apparatus 900g that is configured to form a latent image according to C image information on a photoconductor drum 901g for C image information, and an optical scanning apparatus 900h that is configured to form a latent image according to K image information on a photoconductor drum 901h for K image information. In the illustrated tandem color machine, sub scanning direction deviations of light scanned on the photoconductor drums 901e-901h may be accurately corrected by the optical scanning apparatuses 900e-900h, respectively to realize high quality imaging.

Also, the present invention is not limited to using the processing circuit 1815 as is described above, and other similar processing means may be used in alternative embodiments of the present invention. For example, one or more of the circuits included in the processing circuit 1815 may be included in the printed substrate 1802.

Also, it is noted that although the present invention is applied to the laser printer 100 in the above-described embodiment, the present invention may equally be applied to other types of imaging apparatuses. For example, the present invention may be applied to a digital copier, a scanner, a facsimile machine, a multifunction machine, or any other type of imaging apparatus that includes the optical scanning apparatus 900. In other words, an imaging apparatus according to an embodiment of the present invention uses the optical scanning apparatus 900 as is described above to realize high quality imaging without causing cost increase.

As can be appreciated from the above descriptions, an optical scanning apparatus according to the above-described embodiment is configured to be capable of accurately scanning plural sets of light from a light source unit on a scanning object, and an imaging apparatus according to the above-described embodiment is configured to be capable of forming a high quality image at high speed.

Third Embodiment

In the following, a third embodiment of the present invention is described.

Figure 39:
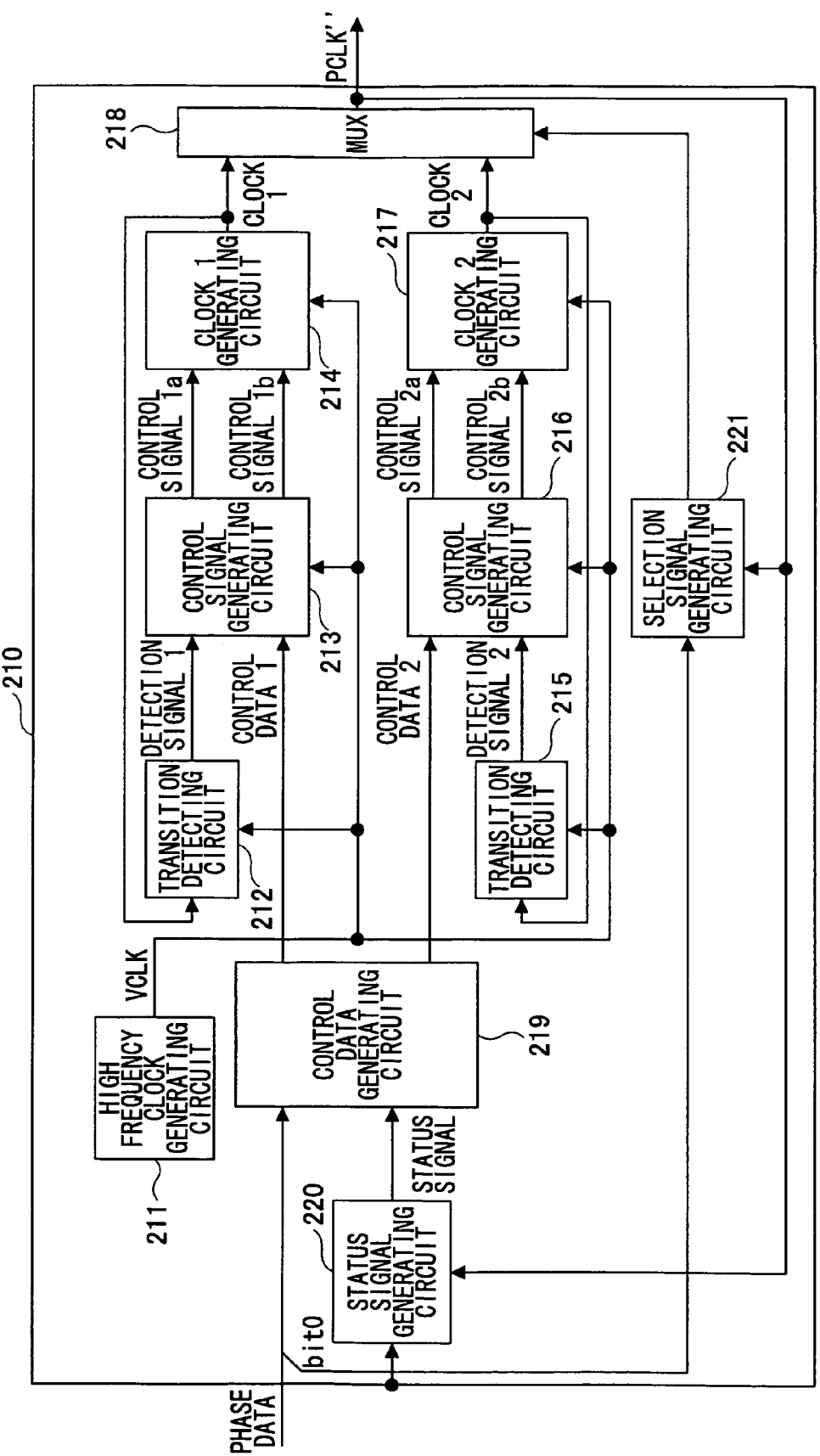
FIG. 39 is a block diagram showing a configuration of a pixel clock generating circuit used in an optical scanning apparatus according to a third embodiment of the present invention.

FIG. 39 is a block diagram showing a configuration of a pixel clock generating unit 210 used in the third embodiment of the present invention. The pixel clock generating unit 210 of FIG. 39 includes a high frequency clock generating circuit 211 as a high frequency clock generating unit for generating a high frequency clock, a transition detecting circuit 212 as a first detecting unit for detecting signal transition of a first clock (clock 1), a control signal generating circuit 213 as a first control signal generating unit for generating a first control signal (control signal 1a and 1b) based on an output from the first detecting unit and first control data (control data 1), a clock 1 generating circuit 214 as a first signal transitioning unit for inducing transition of a signal at a first change-point timing of the high frequency clock based on the first control signal and outputting the signal as the first clock, a transition detecting circuit 215 as a second transition detecting unit for detecting a signal transition of a second clock (clock 2), a control signal generating circuit 216 as a second control signal generating unit for generating a second control signal (control signal 2a and 2b) based on an output from the second detecting unit and second control data, a clock 2 generating circuit 217 as a second signal transitioning unit for inducing transition of a signal at a second change-point timing of the high frequency clock based on the second control data and outputting the signal as the second clock, a multiplexer 218 as a clock selecting unit for selecting one of either the first clock or the second clock and outputting the selected clock as a pixel clock, a control data generating circuit 219 as a control data generating unit for generating the first control data (control data 1) and the second control data (control data 2) based on phase data indicating the amount of phase shift in the pixel clock and a status signal indicating the status of the pixel clock, a status signal generating circuit 220, and a selection signal generating circuit 221.

The transition detecting circuit 212 as an embodiment of the first detecting unit, the control signal generating circuit 213 as an embodiment of the first control signal generating unit, and the clock 1 signal generating circuit 214 as an embodiment of the first signal transitioning unit comprise a first clock generating unit according to an embodiment of the present invention. The transition detecting circuit 215 as an embodiment of the second detecting unit, the control signal generating circuit 216 as an embodiment of the second control signal generating unit, and the clock 2 signal generating circuit 217 as an embodiment of the second signal transitioning unit comprise a second clock generating unit according to an embodiment of the present invention.

The high frequency clock generating circuit 211 generates a high frequency clock VCLK that is used as a reference clock for a pixel clock PCLK". The transition detecting circuit 212 operates in response to the rise of the high frequency clock VCLK from the high frequency clock generating circuit 211, and is configured to detect the rise of the clock 1 from the clock 1 generating circuit 214 and output a pulse signal of one clock width (one period) of the high frequency clock VCLK as a detection signal 1. The control signal generating circuit 213 operates in response to the rise of the high frequency clock VCLK, and outputs the control signals 1a and 1b for shifting the phase of the clock 1 based on the output signal of the transition detecting circuit 212 and the control data 1 (control data for shifting the phase of the pixel clock PCLK" in accordance with the rise of the high frequency clock VCLK) from the control data generating circuit 219. The clock 1 generating circuit 214 operates in response to the rise of the high frequency clock VCLK, and generates the clock 1 according to phase data supplied from the exterior side based on the control signals 1a and 1b from the control signal generating circuit 213.

The transition detecting circuit 215 operates in response to the fall of the high frequency clock VCLK from the high frequency clock generating circuit 211, and is configured to detect the rise of the clock 2 from the clock 2 generating circuit 217 and output a pulse signal of one clock width (one period) of the high frequency clock VCLK as a detection signal 2. The control signal generating circuit 216 operates in response to the fall of the high frequency clock VCLK, and outputs the control signals 2a and 2b for shifting the phase of the clock 2 based on the output signal of the transition detecting circuit 215 and the control data 2 (control data for shifting the phase of the pixel clock PCLK" in accordance with the fall of the high frequency clock VCLK) from the control data generating circuit 219. The clock 2 generating circuit 217 operates in response to the fall of the high frequency clock VCLK from the high frequency clock generating circuit 211, and generates the clock 2 based on the control signals 2a and 2b from the control signal generating circuit 216. The multiplexer 218 selects either the clock 1 from the clock 1 generating circuit 214 or the clock 2 from the clock 2 generating circuit 217 based on a selection signal from the selection signal generating circuit 221, and outputs the selected signal as the pixel clock PCLK".

The control data generating circuit 219 outputs control data 1 and control data 2 based on phase data as is shown in FIG. 40 that are supplied from the exterior side and a status signal that is output by the status signal generating circuit 220. It is noted that the phase data indicate the amount of phase shift to be implemented on the pixel clock in order to correct scanning irregularities owing to the characteristics of the scanning lens of the optical scanning apparatus, dot position deviations owing to irregularities in the rotation of the polygon mirror of the optical scanning apparatus, and/or dot position deviations owing to color aberration of laser emitted by the optical scanning apparatus, for example. In FIG. 40, the phase data correspond to 3-bit data that are associated with a corresponding phase shift amount.

The status signal generating circuit 220 receives the phase data as is described above and generates a status signal indicating the status of the pixel clock. The status signal generating circuit 220 toggles a signal to be output at the rise timing of the pixel clock PCLK" when the bit 0 of the phase data is set to '1', and outputs the toggled signal as the status signal. In this way, the status signal output by the status signal generating circuit 220 represents a first state when the pixel clock PCLK" is in a risen state at the time the high frequency clock VCLK rises, and represents a second state when the pixel clock PCLK" is in a fallen state at the time the high frequency clock VCLK falls. In the present example, the status signal is set to '0' when the pixel clock PCLK" is in a risen state at the time the high frequency clock VCLK rises, and the status signal is set to '1' when the pixel clock PCLK" is in a fallen state at the time the high frequency clock VCLK falls.

The selection signal generating circuit 221 receives the phase data as is described above, toggles a signal to be output at the fall timing of the pixel clock PCLK" when the bit 0 of the phase data is set to '1', and outputs the toggled signal as a selection signal.

Figure 41:
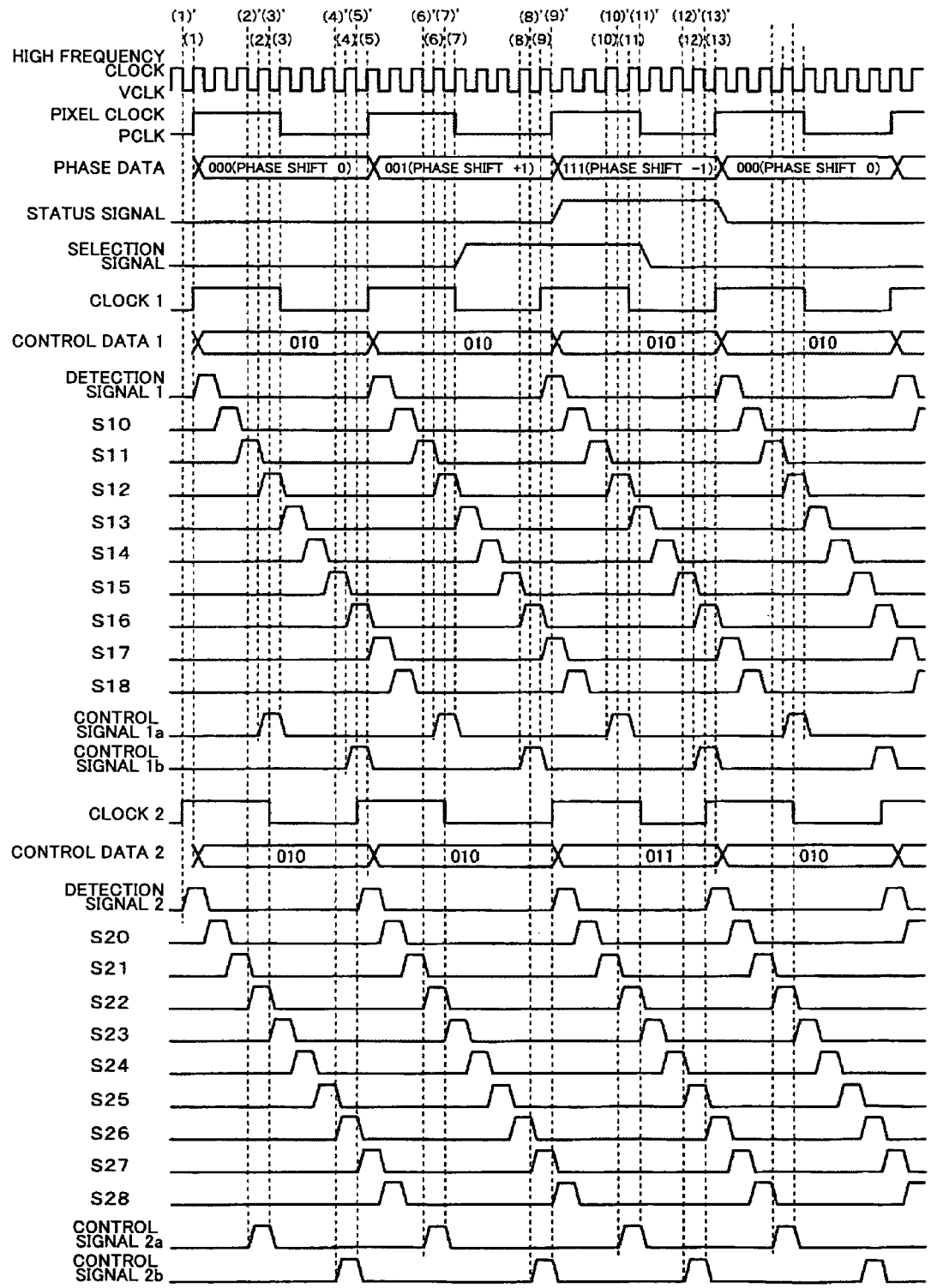
FIG. 41 is a timing chart showing operations timings of the pixel clock generating circuit of FIG. 39.

In the following, operations of the pixel clock generating unit 210 are described with reference to FIG. 41. FIG. 41 illustrates a case of generating a pixel clock PCLK" with a period corresponding to eight periods of the high frequency clock VCLK when the amount of phase shift is zero (0), and generating pixel clocks PCLK" that are phase-shifted by +1/16 (+1/16 period) and −1/16 (−1/16 period), respectively.

First, the case of generating the pixel clock PCLK" with a phase shift of 0 is described.

(Generation of Control Data 1 and Control Data 2)

The pixel clock generating unit 210 receives phase data '000' representing a phase shift amount of 0 in sync with the pixel clock PCLK" (i.e., at the high frequency clock VCLK rise timing (1) shown in FIG. 41). The control data generating circuit 219 inputs the phase data and the status signal (which is initially set to '0') from the status signal generating circuit 220, and outputs corresponding control data 1 (010) and control data 2 (010) for controlling the amount of phase shift to 0 by referring to the truth table of FIG. 40.

(Generation of Clock 1)

The transition detecting circuit 212 operates at the high frequency clock VCLK rise timing (1) shown in FIG. 41, detects the rise of the clock 1 from the clock generating circuit 214, and outputs a pulse signal with a pulse width corresponding to one clock width of the high frequency clock VCLK as detection signal 1. The detection signal 1 is supplied to a shift register (shift register 1) of the control signal generating circuit 213, and in turn, register output signals S10-S18 as is shown in FIG. 41 are obtained. It is noted that the control signal generating circuit 213 outputs the register output signal S12 as the control signal 1a. The control signal 1a is changed to 'H' at the high frequency clock VCLK rise timing (2) shown in FIG. 41, and is at 'H' at the next high frequency clock VCLK rise timing (3) shown in FIG. 41. In turn, the clock 1 generating circuit 214 changes the clock 1 to 'L' at the high frequency clock VCLK rise timing (3). In the present case, since the control data 1 corresponds to data '010' representing a phase shift amount of 0, the control signal generating circuit 213 outputs the register output signal S16 as the control signal 1b. The control signal 1b changes to 'H' at the high frequency clock VCLK rise timing (4) shown in FIG. 41, and is at 'H' at the high frequency clock VCLK rise timing (5) shown in FIG. 41. In turn, the clock 1 generating circuit 214 changes the clock 1 to 'H' at the high frequency clock VCLK rise timing (5).

(Generation of Clock 2)

The transition detection circuit 215 operates at the high frequency clock VCLK fall timing (1)' shown in FIG. 41, detects the rise of the clock 2 from the clock 2 generating circuit 217, and outputs a pulse signal having a pulse width corresponding to the one clock width of the high frequency clock VCLK as detection signal 2. The detection signal 2 is supplied to a shift register (shift register 2) of the control signal generating circuit 216, and in turn, register output signals S20-S28 as is shown in FIG. 41 are obtained. The control signal generating circuit 216 outputs the register output signal S22 as the control signal 2a. The control signal 2a changes to 'H' at the high frequency clock VCLK fall timing (2)' and is at 'H' at the next high frequency clock VCLK fall timing (3)'. In turn, the clock 2 generating circuit 217 changes the clock 2 to 'L' at the high frequency clock VCLK fall timing (3)'. In the present case, since the control data 2 correspond to '010' representing a phase shift amount of 0, the control signal generating circuit 216 outputs the register output signal S26 as the control signal 2b. The control signal 2b changes to 'H' at the high frequency clock VCLK fall timing (4)', and is at 'H' at the next high frequency clock VCLK fall timing (5)' shown in FIG. 41, the clock 2 generating circuit 217 changes the clock 2 to 'H' at the high frequency clock VCLK fall timing (5)'.

(Generation of Pixel Clock PCLK")

In the present case, since the selection signal from the selection signal generating circuit 221 is set to 'L', the multiplexer 218 selects the clock 1 from the clock 1 generating circuit 214 as the pixel clock PCLK" and outputs the pixel clock PCLK".

In the following, the generation of the pixel clock PCLK" that is phase-shifted by +1/16 (+1/16 period) is described.

(Generation of Control Data 1 and Control Data 2)

The pixel clock generating unit 210 receives phase data '001' representing a phase shift amount of +1/16 in sync with the pixel clock PCLK" (i.e., at the high frequency clock VCLK rise timing (5) shown in FIG. 41). In the present case, since the bit 0 of the previous phase data is set to '0', the status signal to be output by the status signal generating circuit 220 is not toggled and remains set to '0'. The control data generating circuit 219 inputs the phase data and the status signal from the status signal generating circuit 220, and outputs corresponding control data 1 (010) representing a phase shift amount of 0 and control data 2 (001) representing a phase shift amount of +1/16 by referring to the truth table of FIG. 40.

(Generation of Clock 1)

The transition detecting circuit 212 operates at the high frequency clock VCLK rise timing (5) shown in FIG. 41, detects the rise of the clock 1 from the clock generating circuit 214, and outputs a pulse signal with a pulse width corresponding to one clock width of the high frequency clock VCLK as detection signal 1. The detection signal 1 is supplied to a shift register (shift register 1) of the control signal generating circuit 213, and in turn, register output signals S10-S18 as is shown in FIG. 41 are obtained. It is noted that the control signal generating circuit 213 outputs the register output signal S12 as the control signal 1a. The control signal 1a changes to 'H' at the high frequency clock VCLK rise timing (6) shown in FIG. 41, and is at 'H' at the next high frequency clock VCLK rise timing (7) shown in FIG. 41. In turn, the clock 1 generating circuit 214 changes the clock 1 to 'L' at the high frequency clock VCLK rise timing (7). In the present case, since the control data 1 corresponds to data '010' representing a phase shift amount of 0, the control signal generating circuit 213 outputs the register output signal S16 as the control signal 1b. The control signal 1b changes to 'H' at the high frequency clock VCLK rise timing (8) shown in FIG. 41, and is at 'H' at the high frequency clock VCLK rise timing (9) shown in FIG.

41. In turn, the clock 1 generating circuit 214 changes the clock 1 to 'H' at the high frequency clock VCLK rise timing (9).

(Generation of Clock 2)

The transition detection circuit 215 operates at the high frequency clock VCLK fall timing (5)' shown in FIG. 41, detects the rise of the clock 2 from the clock 2 generating circuit 217, and outputs a pulse signal having a pulse width corresponding to the one clock width of the high frequency clock VCLK as detection signal 2. The detection signal 2 is supplied to a shift register (shift register 2) of the control signal generating circuit 216, and in turn, register output signals S20-S28 as is shown in FIG. 41 are obtained. The control signal generating circuit 216 outputs the register output signal S22 as the control signal 2a. The control signal 2a changes to 'H' at the high frequency clock VCLK fall timing (6)' and is at 'H' at the next high frequency clock VCLK fall timing (7)'. In turn, the clock 2 generating circuit 217 changes the clock 2 to 'L' at the high frequency clock VCLK fall timing (7)'. In the present case, since the control data 2 correspond to '001' representing a phase shift amount of $+\frac{1}{16}$, the control signal generating circuit 216 outputs the register output signal S27 as the control signal 2b the phase of which register output signal S27 is shifted by +1 (one clock width of the high frequency clock VCLK). The control signal 2b changes to 'H' at the high frequency clock VCLK fall timing (8)', and is at 'H' at the next high frequency clock VCLK fall timing (9)' shown in FIG. 41, the clock 2 generating circuit 217 changes the clock 2 to 'H' at the high frequency clock VCLK fall timing (9)'.

(Generation of Pixel Clock PCLK")

In the present case, since the bit 0 of the phase data is set to '1', the selection signal generating circuit 221 toggles the selection signal to be output at the high frequency clock VCLK rise timing (7) shown in FIG. 41 which timing (7) corresponds to the fall timing of the pixel clock PCLK" to set the selection signal to '1'. In turn, the multiplexer 218 initially (i.e., during the period between the high frequency clock VCLK rise timings (5)-(7)) selects and outputs the clock 1 from the clock 1 generating circuit 214 as the pixel clock PCLK", and after the selection signal is changed to '1' at the high frequency clock VCLK raise timing (7), (i.e., during the period between the high frequency clock VCLK rise timings (7)-(9)), selects and outputs the clock 2 from the clock 2 generating circuit 217 as the pixel clock PCLK".

In the following, the generation of the pixel clock PCLK" that is phase-shifted by $-\frac{1}{16}$ ($+\frac{1}{16}$ period) is described.

(Generation of Control Data 1 and Control Data 2)

The pixel clock generating unit 210 receives phase data '111' representing a phase shift amount of $-\frac{1}{16}$ in sync with the pixel clock PCLK" (i.e., at the high frequency clock VCLK fall timing (9)' shown in FIG. 41). In the present case, since the bit 0 of the previous phase data is set to '1', the status signal to be output by the status signal generating circuit 220 is toggled to be set to '1' (i.e., at the high frequency clock VCLK fall timing (9)' shown in FIG. 41). The control data generating circuit 219 inputs the phase data and the status signal from the status signal generating circuit 220, and outputs corresponding control data 1 (010) representing a phase shift amount of 0 and control data 2 (011) representing a phase shift amount of $-\frac{1}{16}$ by referring to the truth table of FIG. 40.

(Generation of Clock 1)

The transition detecting circuit 212 operates at the high frequency clock VCLK rise timing (9) shown in FIG. 41, detects the rise of the clock 1 from the clock generating circuit 214, and outputs a pulse signal with a pulse width corresponding to one clock width of the high frequency clock VCLK as detection signal 1. The detection signal 1 is supplied to a shift register (shift register 1) of the control signal generating circuit 213, and in turn, register output signals S10-S18 as is shown in FIG. 41 are obtained. It is noted that the control signal generating circuit 213 outputs the register output signal S12 as the control signal 1a. The control signal 1a changes to 'H' at the high frequency clock VCLK rise timing (10) shown in FIG. 41, and is at 'H' at the next high frequency clock VCLK rise timing (11) shown in FIG. 41. In turn, the clock 1 generating circuit 214 changes the clock 1 to 'L' at the high frequency clock VCLK rise timing (11). In the present case, since the control data 1 corresponds to data '010' representing a phase shift amount of 0, the control signal generating circuit 213 outputs the register output signal S16 as the control signal 1b. The control signal 1b changes to 'H' at the high frequency clock VCLK rise timing (12) shown in FIG. 41, and is at 'H' at the high frequency clock VCLK rise timing (13) shown in FIG. 41. In turn, the clock 1 generating circuit 214 changes the clock 1 to 'H' at the high frequency clock VCLK rise timing (13).

(Generation of Clock 2)

The transition detection circuit 215 operates at the high frequency clock VCLK fall timing (9)' shown in FIG. 41, detects the rise of the clock 2 from the clock 2 generating circuit 217, and outputs a pulse signal having a pulse width corresponding to the one clock width of the high frequency clock VCLK as detection signal 2. The detection signal 2 is supplied to a shift register (shift register 2) of the control signal generating circuit 216, and in turn, register output signals S20-S28 as is shown in FIG. 41 are obtained. The control signal generating circuit 216 outputs the register output signal S22 as the control signal 2a. The control signal 2a changes to 'H' at the high frequency clock VCLK fall timing (10)' and is at 'H' at the next high frequency clock VCLK fall timing (11)'. In turn, the clock 2 generating circuit 217 changes the clock 2 to 'L' at the high frequency clock VCLK fall timing (11)'. In the present case, since the control data 2 correspond to '011' representing a phase shift amount of $-\frac{1}{16}$, the control signal generating circuit 216 outputs the register output signal S25 as the control signal 2b the phase of which register output signal S25 is shifted by -1 (one clock width of the high frequency clock VCLK). The control signal 2b changes to 'H' at the high frequency clock VCLK fall timing (12)', and is at 'H' at the next high frequency clock VCLK fall timing (13)' shown in FIG. 41, the clock 2 generating circuit 217 changes the clock 2 to 'H' at the high frequency clock VCLK fall timing (13)'.

(Generation of Pixel Clock PCLK")

In the present case, since the bit 0 of the phase data is set to '1', the selection signal generating circuit 221 toggles the selection signal to be output at the high frequency clock VCLK fall timing (11)' shown in FIG. 41 which timing (11) corresponds to the fall timing of the pixel clock PCLK" to set the selection signal to '0'. In turn, the multiplexer 218 initially (i.e., during the period between the high frequency clock VCLK fall timings (9)'-(11)') selects and outputs the clock 2 from the clock 2 generating circuit 217 as the pixel clock PCLK", and after the selection signal is changed to '0' at the high frequency clock VCLK fall timing (11)' (i.e., during the period between the high frequency clock VCLK fall timings (11)'-(13)'), selects and outputs the clock 1 from the clock 1 generating circuit 214 as the pixel clock PCLK".

It is noted that in the above-described operations, generation of pixel clocks PCLK" with phase shifts of 0, $+\frac{1}{16}$, and $-\frac{1}{16}$ are described as illustrative examples. However, pixel clocks PCLK" with phase shifts of +2/16, +3/16, −2/16, and −3/16, for example, may be generated in a similar manner.

As can be appreciated from the above descriptions, a pixel clock PCLK" of which one clock may be phase-shifted by ±1/16 step (i.e., half the pitch of the high frequency clock VCLK) may be obtained.

It is noted that in one embodiment, a clock that is obtained by inverting the high frequency clock VCLK may be supplied to the transition detecting circuit 215, the control signal generating circuit 216, and the clock 2 generating circuit 217 of FIG. 39. In this case, the transition detecting circuit 215, the control signal generating circuit 216, and the clock 2 generating circuit 217 may be identical to the transition detecting circuit 212, the control signal generating circuit 213, and the clock 2 generating circuit 214 so that cost reduction may be realized.

Figure 42:
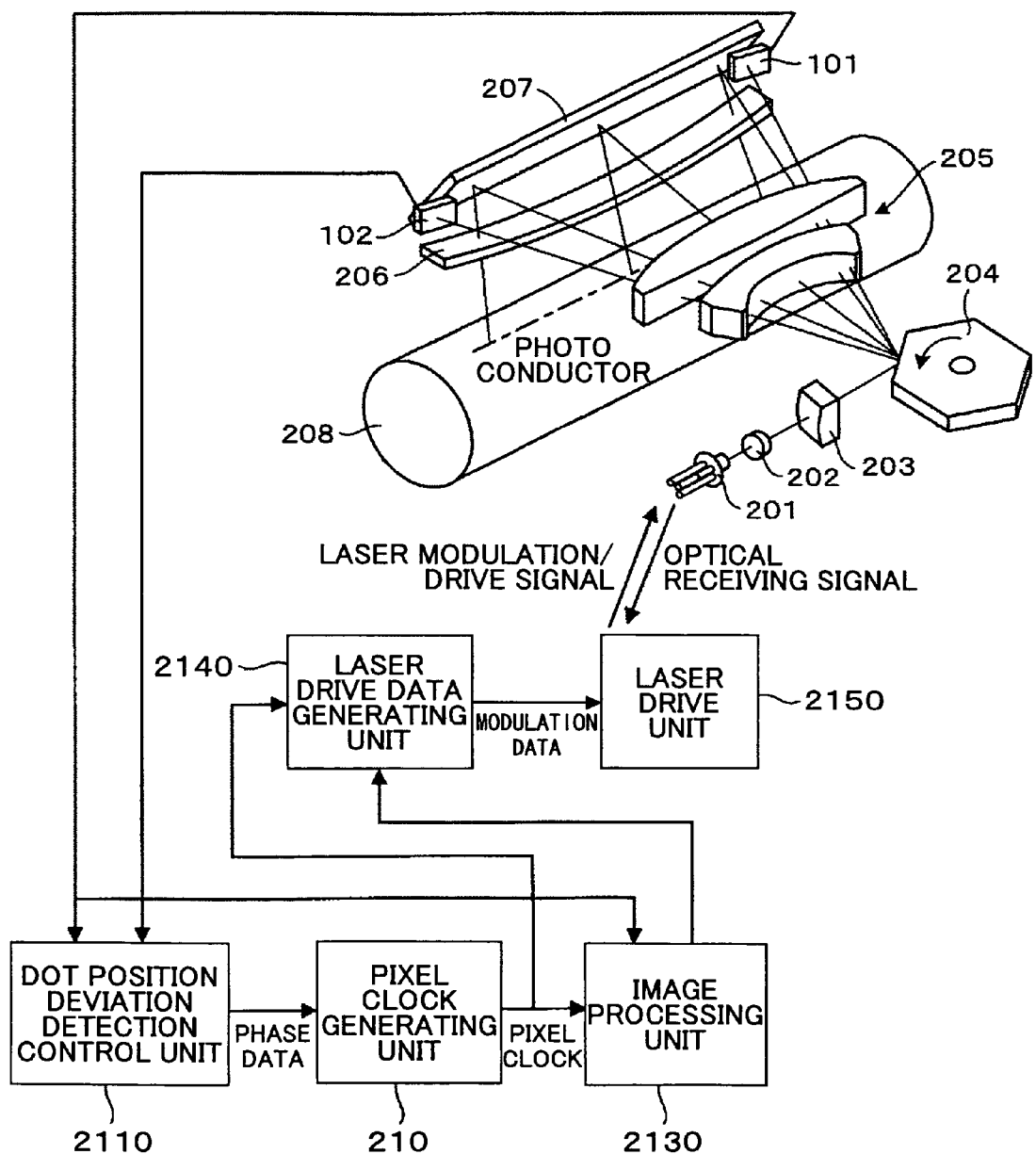
FIG. 42 is a diagram showing a configuration of an optical scanning apparatus according to the third embodiment.

FIG. 42 is a diagram showing a configuration of an optical scanning apparatus used in the present embodiment.

The optical scanning apparatus shown in FIG. 42 includes a semiconductor laser unit 201 as a light source unit that uses the VCSEL (Vertical Cavity Surface Emitting Laser), a collimator lens 202, a cylinder lens 203, a polygon mirror 204 as a deflector, a fθ lens 205 as a scanning lens, a torriodal lens 206, a retro-reflective mirror 207, and a photoconductor 208 as a scanning object. Plural laser beams emitted from the semiconductor laser unit 201 pass through the collimator lens 202 and the cylinder lens 203 to be scanned on the polygon mirror 204. The laser beams then pass through the fθ lens 205 to be reflected by the retro-reflective mirror 207 and pass through the torroidal lens 206 to be incident on the photoconductor 208. In this way, the laser beams may scan and expose the photoconductor 208 in the main scanning direction. It is noted that the photoconductor 208 is rotated by a drive unit (not shown) and evenly charged by a charger (not shown) before the laser beams are scanned, and in this way, a latent image may be formed on the photoconductor 208 through exposure of the laser beam. Then, the latent image may be developed into a toner image by a developer (not shown), and the toner image formed on the photoconductor 208 may be transferred onto transfer paper by a transferring unit (not shown). Then, the toner image may be fixed onto the transfer paper by a fixing unit (not shown) after which the transfer paper with the toner image fixed thereon may be discharged to the exterior.

In the present embodiment, the scanning laser from the fθ lens 205 is detected by photo-sensors 101 and 102 corresponding to optical detectors that are respectively provided at the start point and end point of the main scanning direction (i.e., outside the image forming region of the photoconductor 208). The output signals of the photo-sensors 101 and 102 are input to a dot position deviation detection/control unit 2110. The dot position deviation detection/control unit 2110 measures the scanning time of the laser being scanned between the photo-sensors 101 and 102 based on the output signals of the photo-sensor 101 and 102, and compares the measured time with a reference time, for example, to obtain an amount of dot position deviation with respect to the main scanning direction, generate phase data for correcting such a deviation, and output the generated phase data to the pixel clock generating unit 210. It is noted that the output signal of the photo-sensor 101 is also supplied to an image processing unit 2130 as a line synchronization signal.

In one embodiment, the pixel clock generating unit 210 may not include a phase data storing circuit for storing the phase data. In this case, the dot position deviation detection/control unit 2110 outputs the phase data for each line. In another embodiment, the pixel clock generating unit 210 may include a phase data storing circuit in which case the phase data may be supplied to and stored in the pixel clock generating circuit 210 beforehand. Also, in a preferred embodiment, the dot position deviation detection/control unit 2110 generates phase data that is identical with respect to every line for correcting dot position deviations occurring due to scanning deviations caused by characteristics of the scanning lens 205 (first phase data) as well as phase data that maybe used for correcting dot position deviations that vary according to each line that occur due to rotation deviations of the polygon mirror 204, for example (second phase data). In one embodiment, the pixel clock generating circuit 210 may include a phase data combining circuit, and in this case, the different types of phase data may be output to the pixel clock generating unit 210 to be combined at the phase data combining circuit. Also, in the case of using a multi-beam scanning apparatus, plural sets of the photo-sensors 101 and 102 may be provided so that phase data for plural lines may be simultaneously generated. It is noted that the dot position deviation detection/control unit 2110 and the pixel clock generating unit 210 may comprise a main scanning-direction correcting unit according to an embodiment of the present invention.

The pixel clock generating unit 210 generates a pixel clock based on the phase data from the dot position deviation detection/control unit 2110, and supplies the pixel clock to the image processing unit 2130 and a laser drive data generating unit 2140. The image processing unit 2130 generates image data based on the pixel clock from the pixel clock generating unit 210 and outputs the generated image data to the laser drive data generating unit 2140. The laser drive data generating unit 2140 generates laser drive data (modulation data) from the image data from the image processing unit 2130 based on the pixel clock-from the pixel clock generating unit 210, and outputs the generated laser drive data (modulation data) to a laser drive unit 2150. The laser drive unit 2150 drives the light sources of the semiconductor laser (light source unit) 201 by the laser drive data (modulation data) from the laser drive data generating unit 2140. In this way, an image substantially free of dot position deviations may be formed on the photoconductor 208.

Figure 43:
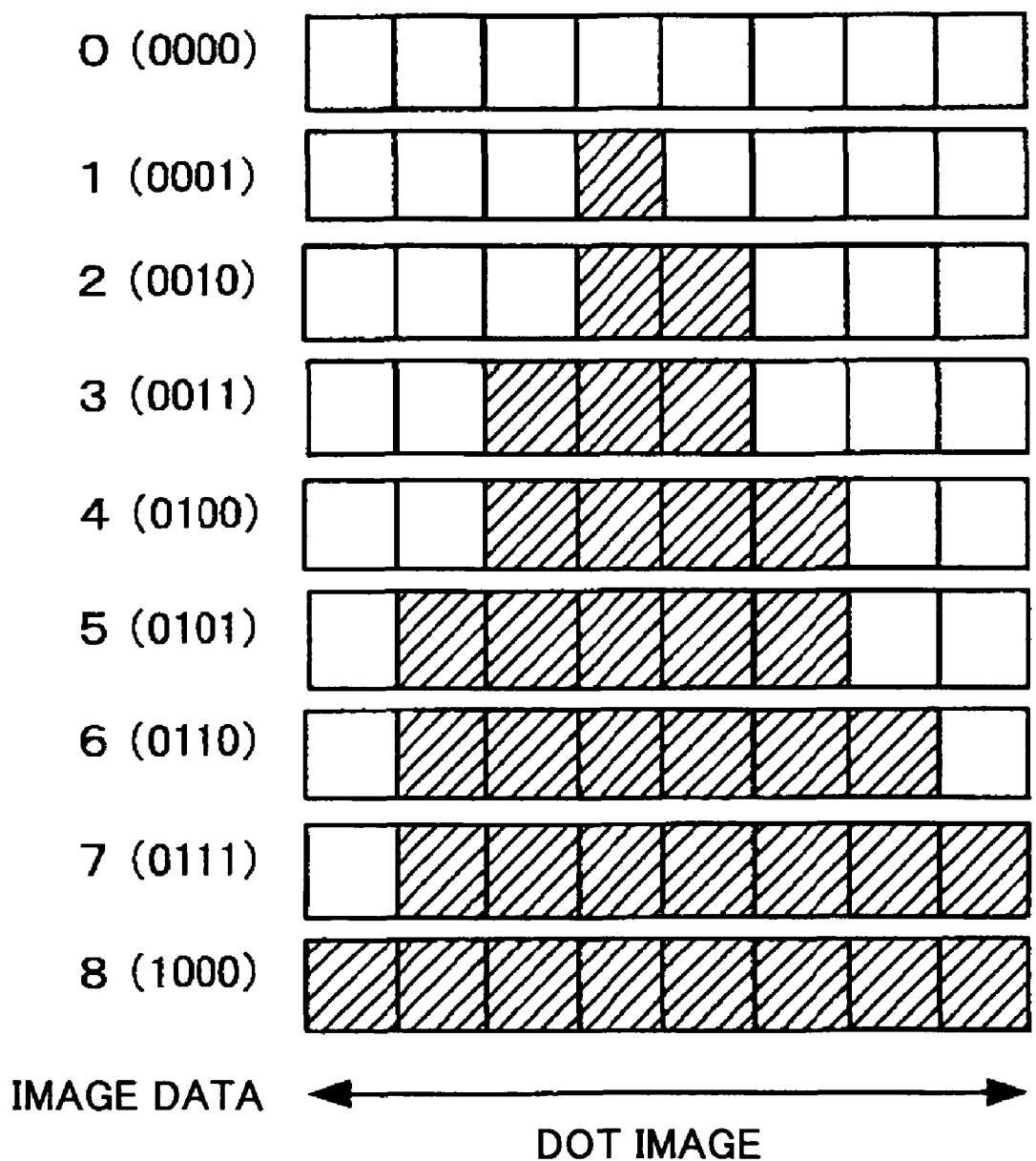
FIG. 43 is a diagram illustrating exemplary pulses generated by a pulse width modulating circuit, the pulses representing image data and corresponding dot images.

FIG. 43 is a diagram showing exemplary pulses generated at a pulse width modulating circuit arranged within the laser drive data generating unit 2140 in a case where one dot is formed by eight pulses. In FIG. 43 the pulses are shown in relation to image data and a dot image. In the example of FIG. 43, it is assumed that a pulse is formed from the center of a dot. Also, in FIG. 43, the dot image represents the width of one dot, image data 1 represents a width of 1/8 the dot image, image data 2 represents a width of 2/8 the dot image, . . . , and image data 8 represents a width of 8/8 the dot image. As is descried above, image data are defined by the time width according to the present example. FIG. 44 is a table indicating different patterns of supplying image data to light sources A, B, and C, respectively, in a case where the image data and the dot image output have the relationship as is shown in FIG. 43. Specifically, FIG. 44 illustrates different patterns of supplying image data to the light sources A, B, and C, using a pulse width modulating circuit that applies the relationship between the image data and the dot image output as is shown in FIG. 43. In the table of FIG. 44, sixteen different data patterns for the light sources A, B, and C, configured to form one pixel are listed vertically, and the specific image data (image data number) to be supplied to the respective light sources according to each pattern are indicated. It is noted that the data pattern to be used may be changed according to the amount of sub scanning direction deviation of a relevant pixel, and in this way, the positioning of the center of gravity of the scanning light distribution may be shifted. That is, a suitable data pattern may be supplied to the light sources A, B, and C so that the sub scanning direction deviation of the relevant pixel may be corrected.

Figure 45:
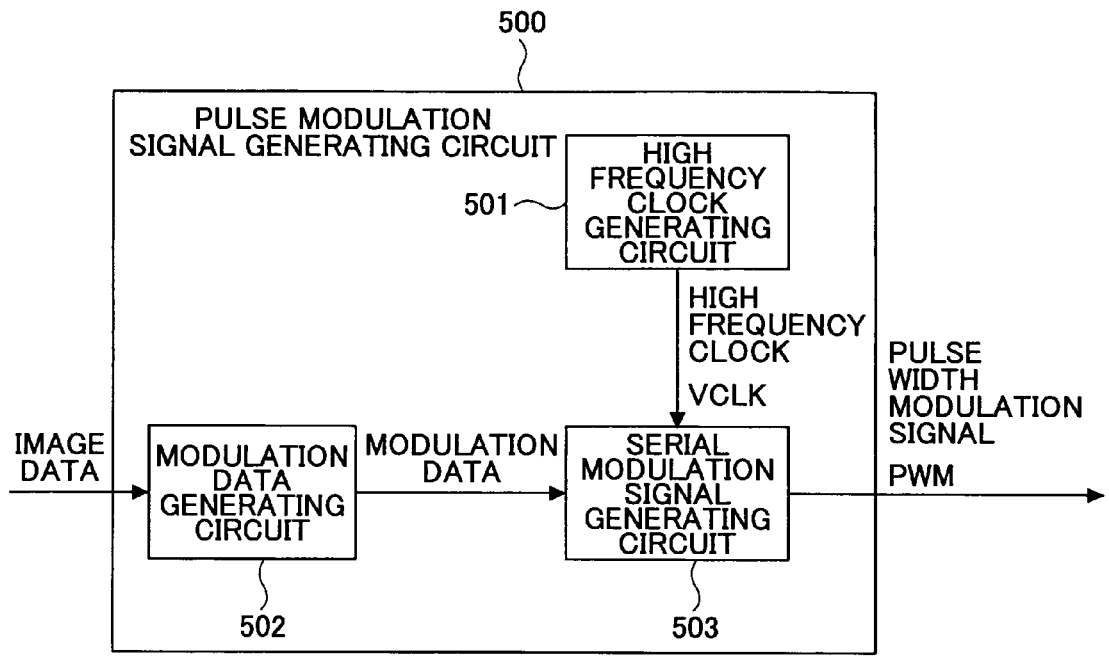
FIG. 45 is a block diagram showing an exemplary configuration of a pulse modulation signal generating circuit.

FIG. 45 is a diagram showing an exemplary configuration of a pulse modulation signal generating circuit.

The pulse modulation signal generating circuit 500 shown in FIG. 45 corresponds to a pulse width modulation signal generating circuit that includes a high frequency clock generating circuit 501, a modulation data generating circuit 502, and a serial modulation signal generating circuit 503. The high frequency clock generating circuit 501 generates the high frequency clock VCLK which has a substantially shorter period compared to that of a basic pixel clock that represents one dot.

The modulation data generating circuit 502 generates modulation data representing a desired bit pattern based on image data obtained from an external unit such as the image processing unit 2130. The serial modulation signal generating circuit 503 inputs the modulation data output by the modulation data generating circuit 502, converts the input modulation data into a serial pulse pattern train (pulse train) based on the high frequency clock VCLK from the high frequency clock generating circuit 501, and outputs the pulse train as a pulse modulation signal PWM. In one embodiment, modulation data from an external unit may be directly input to the serial modulation signal generating circuit 503 in which case the modulation data generating circuit 502 may be omitted.

As can be appreciated from the above descriptions, the pulse modulation signal generating circuit 500 inputs modulation data to the serial modulation signal generating circuit 503, and generates the pulse modulation signal PWM by serially outputting a pulse train corresponding to the bit pattern of the modulation data. It is noted that the serial modulation signal generating circuit 503 may be a shift register, for example.

In another example, the data patterns shown in FIG. 44 may be stored in a lookup table to be used as the serial modulation signal generating circuit 503. In this case, when the modulation data corresponds to data pattern 6, for example, image data 5 are input to the pulse modulation signal generating circuit 500 as image data for the light source B, and image data 3 are input to the pulse modulation signal generating circuit 500 as image data for the light source C, and the corresponding pulse pattern is output with the dot image shown in FIG. 43.

In the following, an exemplary case of controlling the light emitting amount of the light sources A, B, and C using the information table of FIG. 44 is described. In the present example, it is assumed that the numbers assigned to the light sources A, B, and C with respect to each data pattern represent the light emitting levels of the respective light sources, and the maximum light emitting level for each of the light sources A, B, and C is set to 8. In this case, the data patterns are defined such that the sum of the light emitting levels of the light sources A, B, and C for each data pattern is equal to 8. By controlling the light emitting levels of light sources A, B, and C according to the data patterns shown in FIG. 43, the light emitting amount ratio between the light sources A, B, and C may be adjusted through simple means. It is noted that the positioning of the center of gravity of the scanning light distribution may be changed with respect to the sub scanning direction (i.e., direction in which the light sources A, B, and C are arranged) by varying the light emitting amounts of the three light sources A, B, and C. Accordingly, a sub scanning direction deviation may be corrected in the present case by changing the light emitting pattern of the light sources A, B, and C according to the amount of the dot position deviation in the sub scanning direction.

Figure 46:
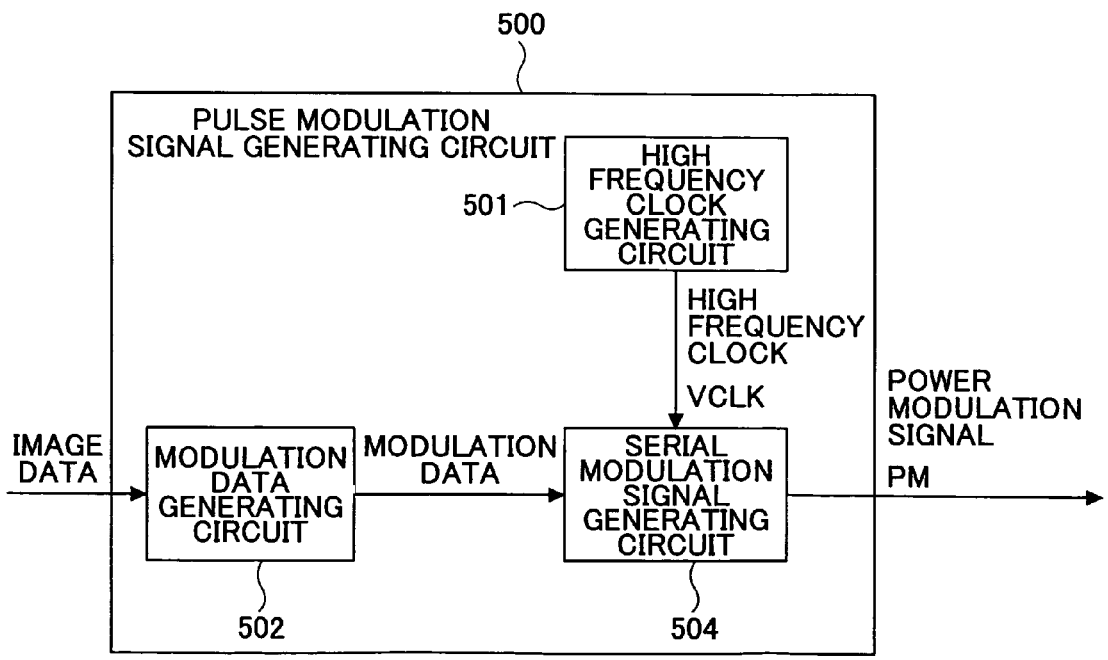
FIG. 46 is a block diagram showing another exemplary configuration of a pulse modulation signal generating circuit.

FIG. 46 is a diagram showing another exemplary configuration of the pulse modulation signal generating circuit 500 that is arranged within the laser drive data generating unit 2140. The pulse modulation signal generating circuit 500 shown in FIG. 46 corresponds to a power modulation signal generating circuit. It is noted that components of the pulse modulation signal generating circuit 500 of the present example that are identical to the components of the pulse modulation signal generating circuit 500 shown in FIG. 45 are given the same reference numerals. In the pulse modulation signal generating circuit 500 according to the present example, image data input to the modulation data generating circuit 502 represent light emitting amounts for the light sources A, B, and C, and intensity modulation is performed on the input image data at the modulation data generating unit 502 to generate modulation data. The modulation data from the modulation data generating unit 502 are serially converted into a power signal corresponding to the light emitting intensity of the modulation data at a serial modulation signal generating circuit 504 based on the high frequency clock VCLK generated at the high frequency clock generating circuit 501, and the power signal is output as a power modulation signal PM. As can be appreciated from the above descriptions, in the present example, the light emitting powers of the light sources A, B, and C are adjusted according to the values of image data specified in each data pattern shown in FIG. 44 so that dot position deviations in the sub scanning direction may be corrected. It is noted that the serial modulation signal generating circuit 503/504 of the pulse modulation signal generating circuit 500 of FIGS. 46 and 47 may comprise a sub scanning direction correcting unit according to embodiments of the present invention.

Figure 47:
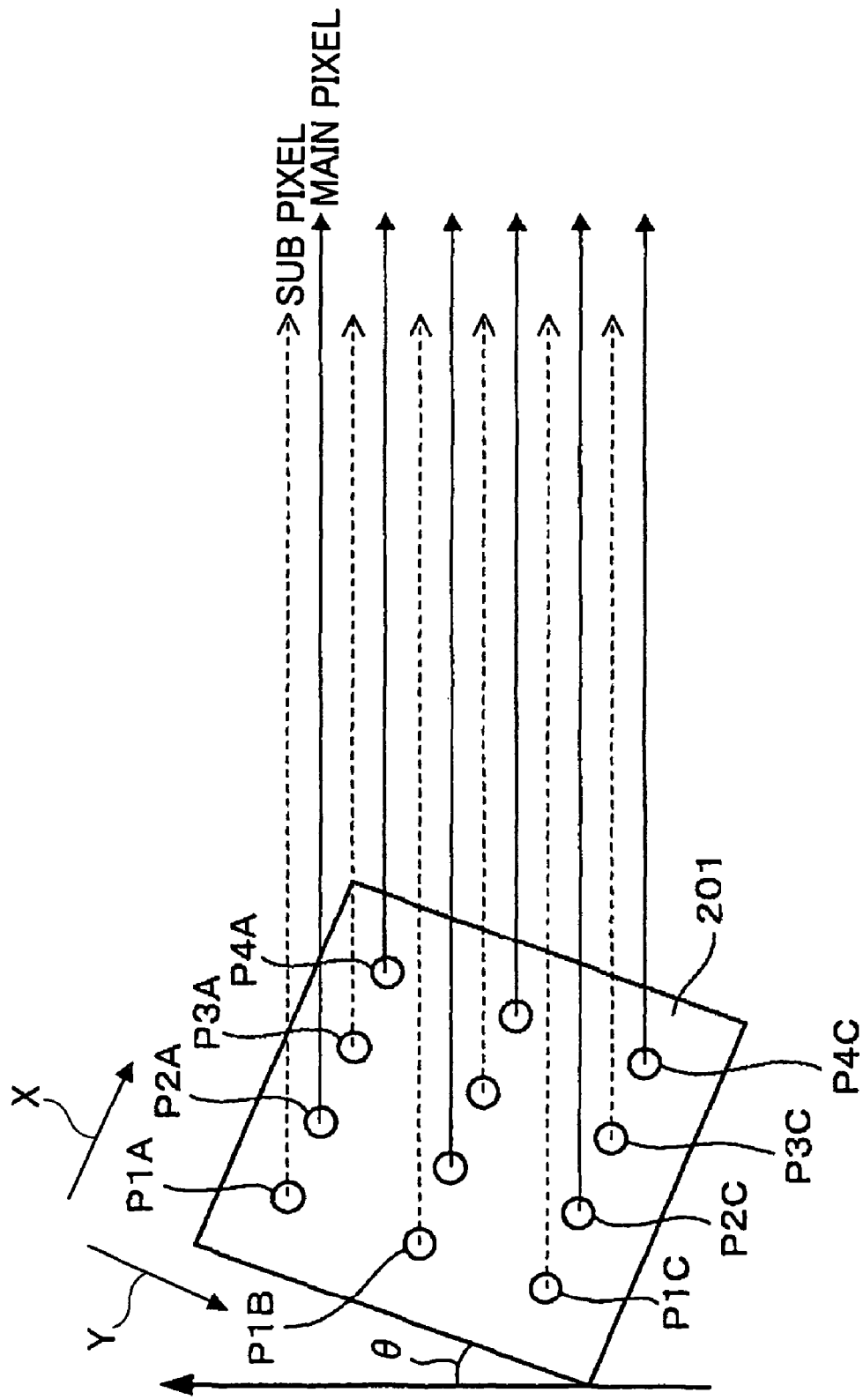
FIG. 47 is a diagram showing an exemplary configuration of a light source unit.

FIG. 47 is a diagram showing an exemplary configuration of the light source unit (semiconductor laser) 201.

The light source unit 201 according to the example of FIG. 47 may comprise a multi-chip laser array having plural laser elements P1A, P1B, P1C, P2A, P2B, P2C, ... P4A, P4B, and P4C as plural light sources arranged along directions x and y that are perpendicular to each other, or a single-chip laser array having plural laser elements P1A, P1B, P1C, P2A, P2B, P2C, ... P4A, P4B, and P4C as plural light sources arranged within the same chip, for example. In the present example, the light sources P1A-P4C are arranged such that the alignment direction of the light sources P1A-P4C forms a predetermined angle θ with respect to the deflector (polygon mirror) 204. In FIG. 47, assuming that one pixel is formed by the light sources P1A and P2A, the light source P2A is configured to form a main pixel, and the light sources P1A and P3A are configured to form sub pixels. Similarly, the light sources P2B, P2C, P4A, P4B, and P4C are configured to form main pixels (referred to as main light sources hereinafter), and the light sources P1B, P1C, P3B, P3C are configured to form sub pixels (referred to as sub light sources hereinafter).

Figure 48:
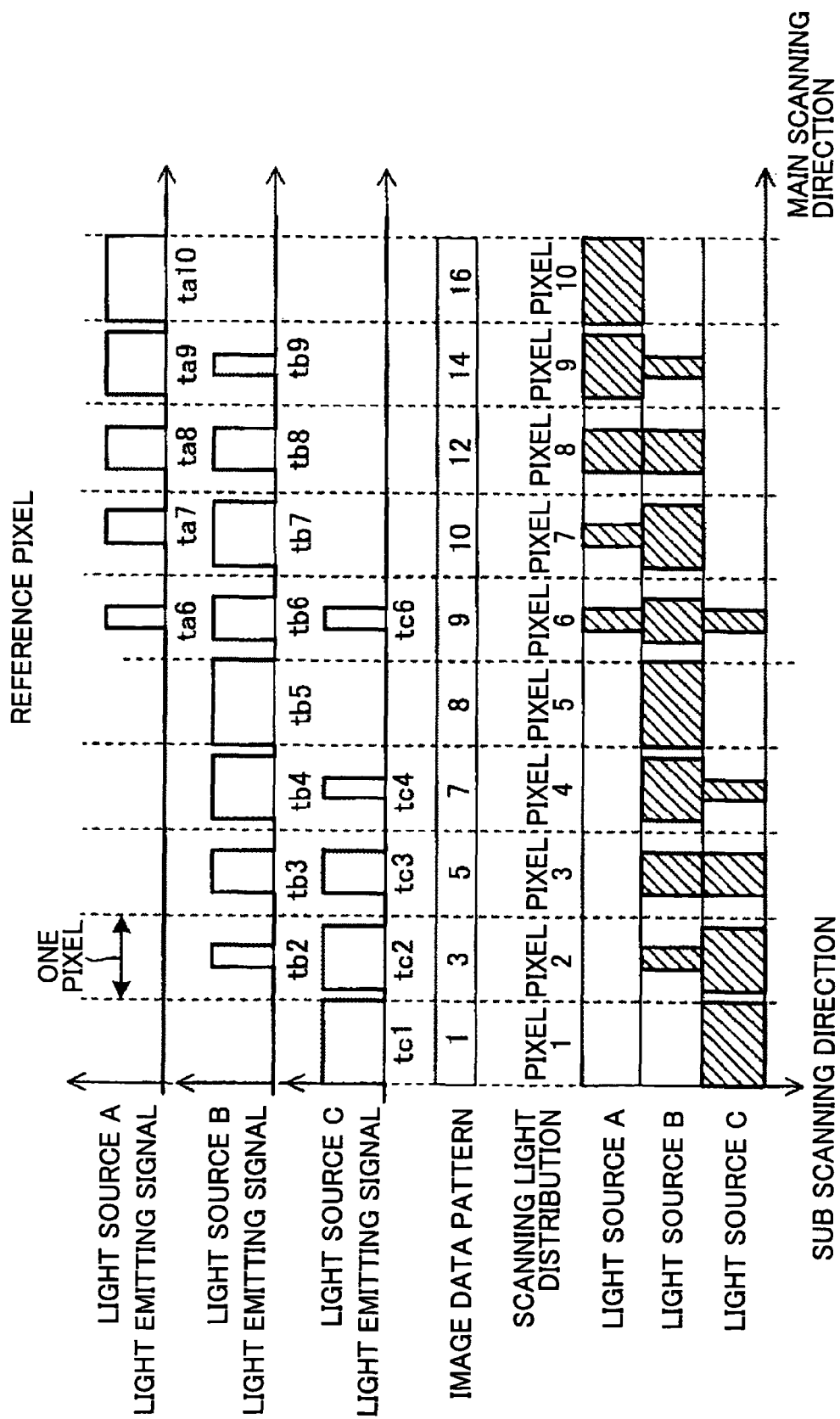
FIG. 48 is a diagram showing exemplary light emitting signals for plural light sources and the distribution of scanning light scanned on a scanning medium in the main scanning direction according to the light emitting signals.

FIG. 48 is a diagram illustrating an exemplary case of correcting dot position deviations in the sub scanning direction according data pertaining to main pixels and sub pixels that are supplied to light sources A, B, and C.

In FIG. 48, light emitting signals for the light sources A, B, and C are shown at the upper side, and the amount of scanning light scanned on the scanning medium (photoconductor) 208 in the main scanning direction according to the light emitting signals for the light sources A, B, and C are shown on the lower side. For example, assuming that the light source P2A of FIG. 47 corresponds to the light source B of FIG. 48, the light source P1A of FIG. 47 corresponds to the light source A of FIG. 48, the light source P3A of FIG. 47 corresponds to the light source C of FIG. 48, and the light source B (P2A) corresponds to a main light source configured to form a main pixel, pixel 5 shown in FIG. 48 corresponds to a reference pixel representing a dot image that does not require sub scanning direction dot position correction. Specifically, only the main light source B is illuminated to form pixel 5.

In the case of pixel 1, only the light source C is illuminated, and in the case of pixel 10, only the light source A is illuminated. As can be appreciated, assuming that the direction extending toward the lower side of FIG. 48 corresponds to the sub scanning direction, the dot position of the pixel 1 is deviated in the sub scanning direction (+ sub scanning direction), and the dot position of the pixel 10 is deviated in the opposite direction of the sub scanning direction (− sub scanning direction). It is noted that the amount of deviation in the dot position depends on the spacing between the scanning light emitted on the scanning medium 208 by the light sources A, B, and C. For example, in the case of using image data of the data patterns shown in FIG. 44, the light emitting amount of the light sources A, B, and C may be controlled by the image data patterns supplied to the light sources as is shown in FIG. 48.

Referring to the light emitting signals and the scanning light distribution for pixels 1 through 5 shown in FIG. 48, it can be appreciated that the light emitting time tc of the light source C gradually decreases from pixel 1 to pixel 5, and the light emitting time tb of the light source B gradually increases from pixel 1 to pixel 5. In this case, the center of gravity of the image formed by the at least one of the light sources B and C moves toward to the light emitting position of the light source B corresponding to the main light source. Referring to the light emitting signals and the scanning light distribution for the pixel 5, and pixels 7 through 10, it can be appreciated that the light emitting time tb of the light source B gradually decreases from pixel 5 to pixel 10, and the light emitting time ta of the light source A gradually increases from pixel 5 to pixel 10. In this case, the center of gravity of the image formed by at least one of the light sources B and A moves toward the light emitting position of the light source A.

As can be appreciated from the above descriptions, deviations in the center of gravity of an image may be induced by varying the light emitting time of light sources A, B, and C, for example, and the deviations in the center of gravity of the image may be recognized as dot position deviations in the sub scanning direction at an optical scanning apparatus or an imaging apparatus. Therefore, in one embodiment, dot position deviations in the sub scanning direction may be corrected by controlling the light emitting time of the light sources.

In the following, a case is described in which the total light emitting time of the light sources A, B, and C for forming one pixel is arranged to be substantially the same. For example, the total light emitting time of the light sources A, B, and C may be set to tall=ta+tb+tc, and the light emitting times ta, tb, and tc of the light sources A, B, and C may be controlled so that the total light emitting time for forming a pixel may be substantially the same in the case of performing sub scanning direction dot position correction as well as the case of not performing the sub scanning direction dot position correction. In this way, accurate sub scanning direction dot position correction may be realized through simple control means. For example, in FIG. 48, the total light emitting time for forming pixel 3 may be represented as tall3=tb3+tc3, and the total light emitting time for forming pixel 5 may be represented as tall5=tb5, where the condition tall3=tall5=talln (n being a natural number) is satisfied.

As is described above, in the example of FIG. 48, the pixel 5 corresponds to the reference pixel which is formed by illuminating only the light source B. The light sources A and C are primarily used for inducing deviations in the sub scanning direction. However, in a preferred embodiment, some of the dots that do not require sub scanning direction correction may be formed by pixel 6 which is realized by illuminating the light sources A and C for the same light emitting amount in addition to illuminating the light source B (the light emitting amount of the light sources A and C being less than the light emitting amount of the light source B) so that the gray level characteristics of an image may be improved.

Also, in another preferred embodiment, the sub scanning direction dot position deviation correction as is described above may be combined with main scanning direction dot position correction to realize dot position deviation correction with respect to the main scanning direction as well as the sub scanning direction.

Figure 49:
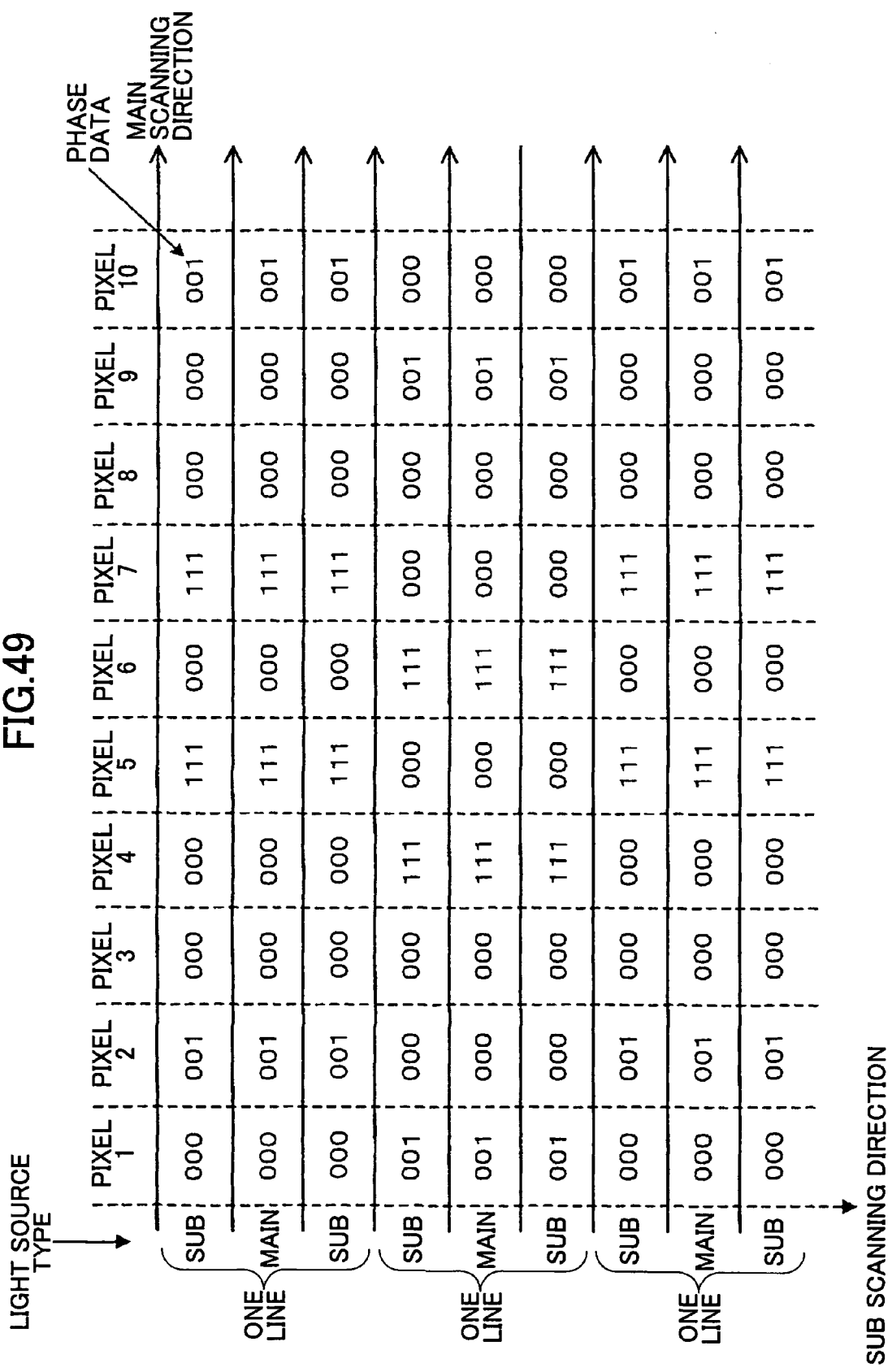
FIG. 49 is a table showing exemplary main scanning direction dot position deviation control data that are generated for pixels of an image.

FIG. 49 is a table illustrating an exemplary set of control data for controlling main scanning direction dot position deviations of respective pixels of an image in a case where three lines are formed in the sub scanning direction (vertical direction in FIG. 49) and ten pixels are formed in the main scanning direction (horizontal direction in FIG. 49). It is noted that in the present example, each of the three lines formed in the sub scanning direction is formed by a main light source and sub light sources arranged above and below the main light source with respect to the sub scanning direction. In other words, one pixel is formed by a combination of light emitted from three light sources aligned in the sub scanning direction.

In the example of FIG. 49, the control data for the main scanning direction dot position deviations correspond to the phase data shown in FIG. 40, and the phase data '000' represent a phase shift amount of 0, the phase data '001' represent a phase shift amount of +1, and the phase data '111' represent a phase shift amount of −1. It is noted that when the main scanning direction deviation amount is varied for a main light source and sub light sources that are directed for forming the same pixel, main scanning direction dot position deviations may occur within the same pixel thereby leading to image degradation. Therefore, a main light source and sub light sources within the same line are preferably supplied with the same phase data for a given pixel.

Figure 50:
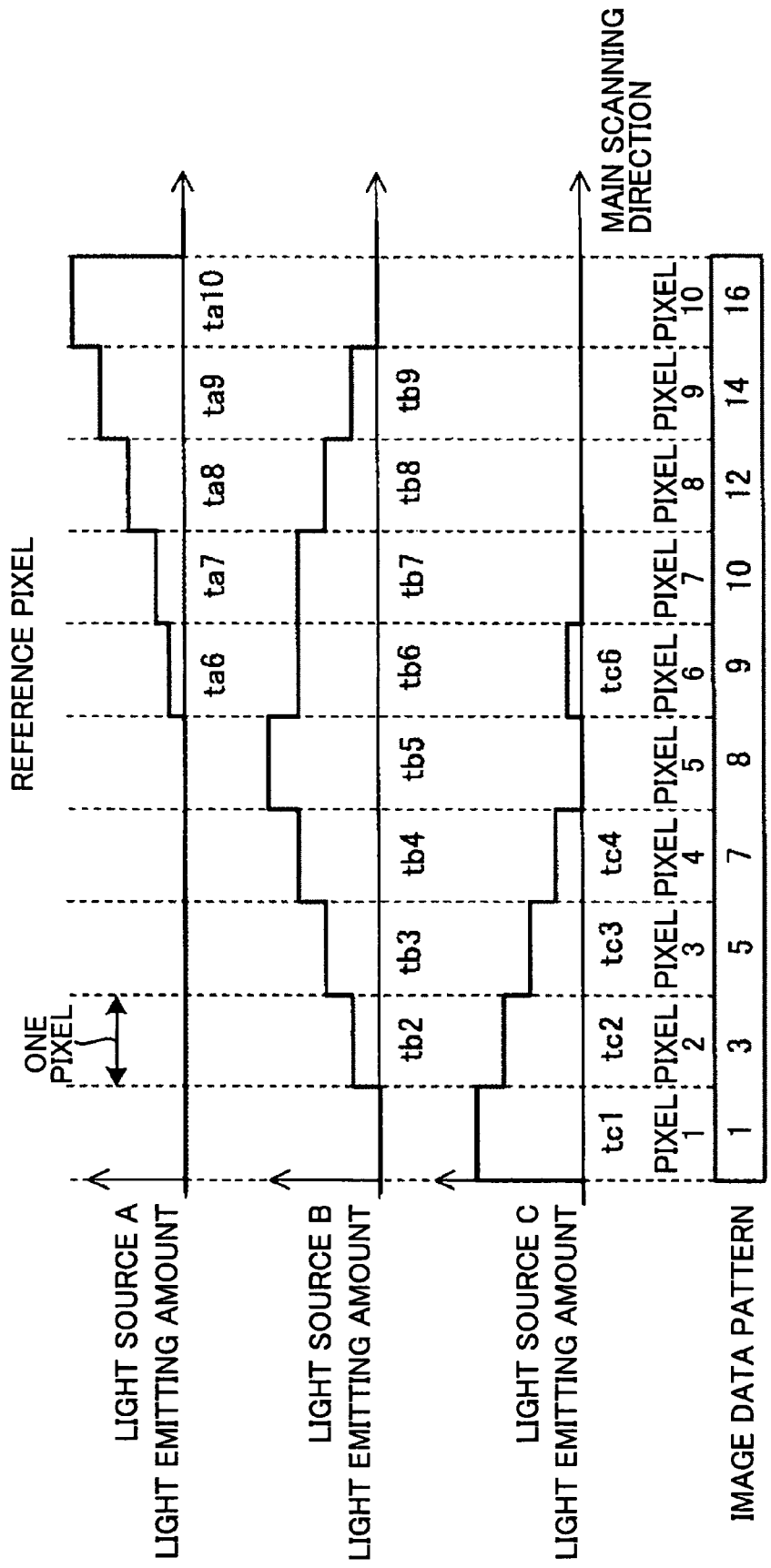
FIG. 50 is a diagram showing the amount of light emitted by the light sources with respect to each pixel.

FIG. 50 is a diagram showing light emitting amounts of the light sources A, B, and C with respect to each of pixels 1 through 10 in another exemplary case of correcting dot position deviations in the sub scanning direction.

It is noted that in the example of FIG. 48, the total light emitting time of the light sources forming one pixel is arranged to be substantially the same.

In the present example of FIG. 50, the total amount of light emitted by the light sources forming one pixel is arranged to be substantially the same. Specifically, provided that the amount of light emitted by the light source A is denoted as pa, the amount of light emitted by the light source B is denoted as pb, the amount of light emitted by the light source C is denoted as pc, and the total amount of light emitted by the light sources A, B, and C is denoted as 'pall', pall4=pb4+pc4 for pixel 4, pall6=pa6+pb6+pc6 for pixel 6, and pall4=pall6=palln (n being a natural numebr).

It is noted that in a case where a semiconductor laser is used as the light source, for example, and a light flux from the light source is scanned on a scanning medium, the distribution of light emitted by the light source may be similar to a Gaussian distribution. In FIG. 50, the total amount of light emitted by the light sources for each pixel is illustrated in a schematic manner. According to the present example, in actually performing the dot position deviation correction, a light emitting control signal for maintaining the total amount of light of plural patterns for the light sources A, B, and C to be constant while deviating the center of gravity in the sub scanning direction is obtained beforehand at the scanning medium from measurement value data, and based on the value of the control signal, a pulse pattern train or a power signal corresponding to the light emitting intensity of modulation data are serially output by the serial modulation signal generating circuit 503/504 to control the respective light emitting amounts of the light sources. In this way, accurate correction of dot position deviations in the sub scanning direction may be realized. For example, in a case where image data are supplied to the light sources according to the data patterns shown in FIG. 44, the image data patterns shown in FIG. 50 may be supplied to the light sources so that the amount of light emitted by each light source may be controlled.

Figure 51:
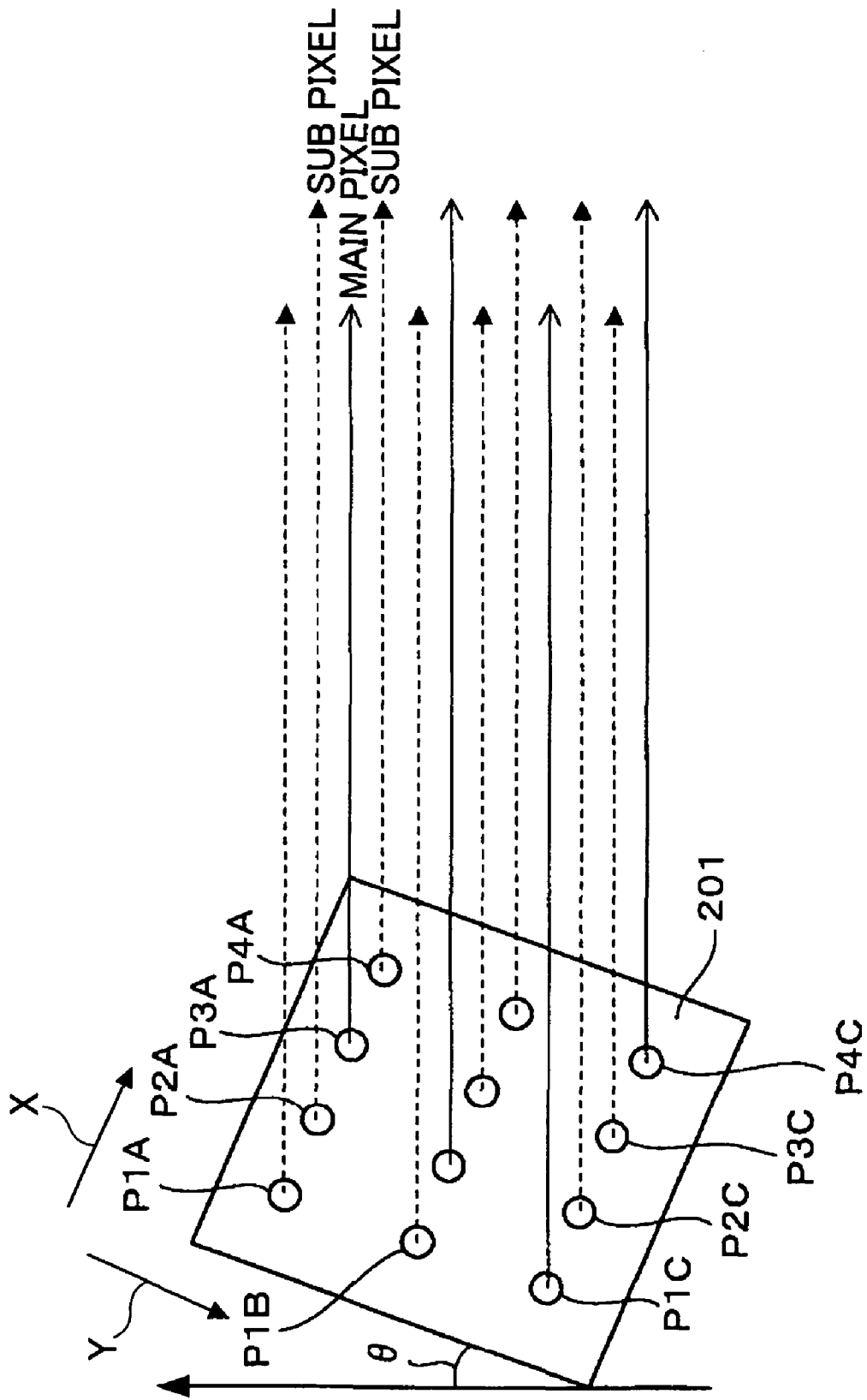
FIG. 51 is a diagram showing another exemplary configuration of a light source unit.

FIG. 51 is a diagram showing another exemplary configuration of a semiconductor laser using the VCSEL (Vertical Cavity Surface Emitting Laser) provided in an optical scanning apparatus according to an embodiment of the present invention. In the present example, two sub pixels are respectively arranged at the positive sub scanning direction side and negative sub scanning direction side of a main pixel to form one pixel. In this arrangement, the scanning apparatus may adjust the center of gravity of the combined light (i.e., light from one main light source and two sub light sources) from the VCSEL (Vertical Cavity Surface Emitting Laser) as the light source in accordance with a sub scanning direction deviation in either side so that accurate correction of sub scanning direction positional deviations may be realized.

It is noted that a line buffer for storing correction data may be used and pixel data conversion for reflecting the pixel data of different line scanning with each other may be performed. However, in the present example, the serial modulation signal generating circuit 503 or 504 controls the amount of light emitted by the main light source to be no greater than ½ the amount of light emitted by the main light source, and controls the amount of light emitted by the main light source to be constant while adjusting the amount of light emitted by the sub light sources. In this way, sub scanning direction dot position deviation correction may be performed without data conversion and with reduced buffer capacity.

It is noted that in the example of FIG. 47, the amount of light emitted by a main light source may be arranged to be greater than the amount of light emitted by a sub light source and the amount of time light is emitted by the main light source may be arranged to be longer than the light emitting time of the sub light source. In such a case, the service life of the main light source may be shorter than that of the sub light source, and in turn the service life of the optical scanning apparatus may be shortened. Accordingly, in a preferred embodiment, the functions of the light sources of the semiconductor laser of FIG. 47 are switched at predetermined timings such as with respect to every scanning line or with respect to every page. In this way, the service life of the optical scanning apparatus may be prolonged. It is noted that such an arrangement may similarly be applied to the semiconductor laser of FIG. 51 to prolong the service life of the optical scanning apparatus, for example.

Also, in the example of FIG. 51, assuming that the distance between two main light sources with respect to the main scanning direction is denoted as Δx, in a preferred embodiment, the respective distances between main light sources P3A, P2B, P1C, P4C and sub light sources P2A, P4A, P1B, P3B, P4B, P2C, P3C are arranged to be Δx/2. In this case, the sub light sources are arranged in the vicinity of a main light source, and the distance between sub light sources may be increased so that overlapping of pixels with respect to the sub scanning direction may be prevented and accurate optical scanning and dot position deviation correction may be realized.

Figure 52:
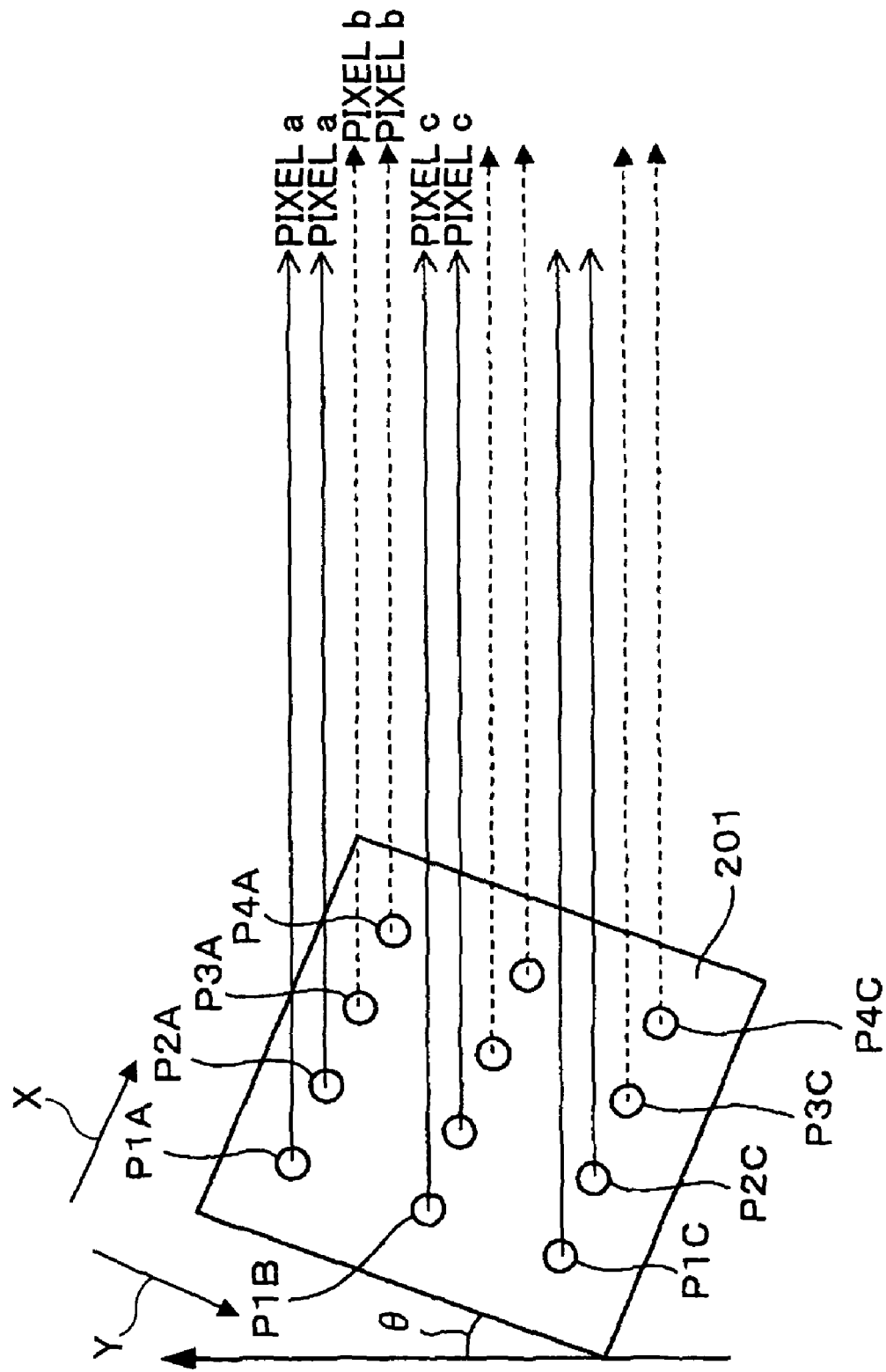
FIG. 52 is a diagram showing another exemplary configuration of a light source unit.

FIG. 52 is a diagram showing another exemplary configuration of a light source unit that may be used in an optical scanning apparatus according to an embodiment of the present invention. The light source unit 201 shown in FIG. 52 may comprise plural light sources arranged into a two dimensional array or plural light sources arranged within the same chip, wherein the alignment direction of the light source array is arranged to form a predetermined angle θ with the deflector 204. Also, in the present example, light source P1A is arranged to correspond to a first main light source and light P2A is arranged to correspond to a second main light source, for example, and a pixel is arranged to be formed by two main light sources. The other pairs of main light sources P3A and P4A, P1B and P2B, P3B and P4B, P1C and P2C, P3C and P4C are respectively arranged to form one pixel as well. In the present example, in a case where the light emitting time and the amount of light emitted by the two main light sources are substantially the same, the center of gravity of light emitted by the two main light sources will be located at the reference pixel position. The light emitting time and the amount of light emitted by the light sources are adjusted by the serial modulation signal generating circuit 503 or 504 so that the center of gravity of light emitted by the light sources may be moved and dot position deviations in the sub scanning direction may be corrected. In this way, sub scanning direction dot position correction may be accurately performed with respect to every pixel, for example.

Figure 53:
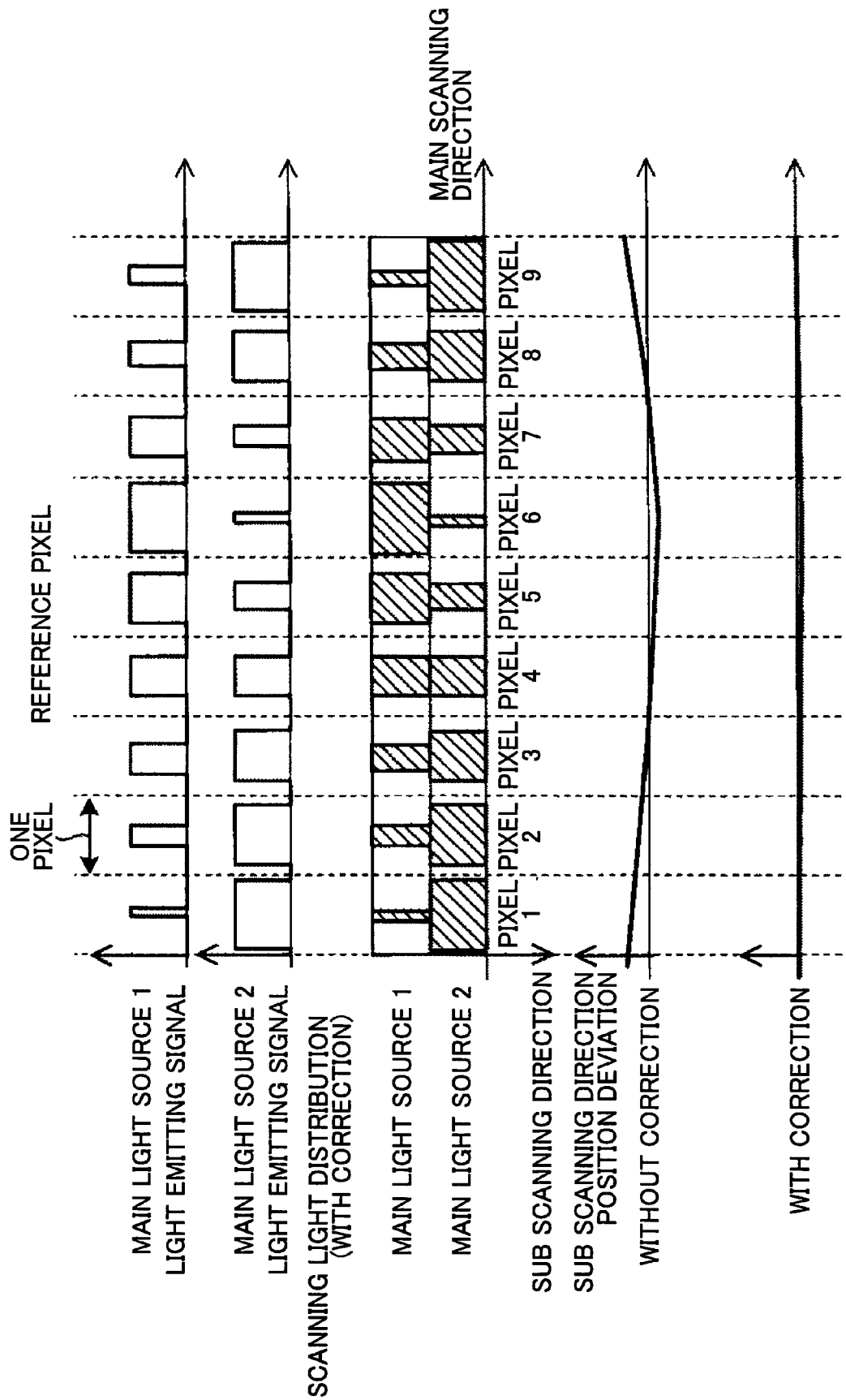
FIG. 53 is a diagram showing exemplary sub scanning direction dot position deviation correction realized in the case of using the light source unit of FIG. 52.

FIG. 53 is a diagram illustrating an example of sub scanning direction dot position correction realized by an optical scanning apparatus according to an embodiment of the present invention that uses the semiconductor laser as is shown in FIG. 52 configured to form one pixel with two main pixels. It is noted that the respective light emitting signals for the first and second main light sources are shown at the upper section of FIG. 53, the scanning light distribution of light emitted by the first and second main light sources is shown in the middle section of FIG. 53, and dot positions in the sub scanning direction without dot position correction performed thereon and with the dot position correction performed thereon are shown in the lower section of FIG. 53. As can be appreciated from the dot position data without dot correction performed thereon shown in the lower section of FIG. 53 (data representing the sub scanning direction pixel position deviation amount of the respective pixels), sub scanning direction dot positions may occur in the positive direction (sub scanning direction) as well as the negative direction (inverse sub scanning direction) with respect to the sub scanning direction scanning position. In a specific example, for pixel 1, dot position deviation occurs in the positive direction with respect to a scanning position, and accordingly, the serial modulation signal generating circuit 503 or 504 controls the light emitting amount and/or the light emitting time of the first light source directed for forming pixel 1 to be less than that of the second light source for forming pixel 1 as is represented by the scanning light distribution of FIG. 53 so that the center of gravity of light emitted by the light sources for forming the pixel 1 is shifted. In this way, the dot position of the pixel formed (with dot position correction) may be positioned at its intended position. Similarly, for pixel 6, pixel position deviation occurs in the negative sub scanning direction, and accordingly, the serial modulation signal generating circuit 503 or 504 controls the light emitting amount and/or the light emitting time of the first main light source for forming pixel 6 to be greater than that of the second main light source for forming pixel 6 so that dot position correction for the pixel position of pixel 6 may be realized. It is noted that in the present example, the shift amount realized by forming a pixel through illuminating only one of the two main pixels corresponds to the maximum sub scanning direction dot position deviation correction capacity of the optical scanning apparatus.

Figure 54:
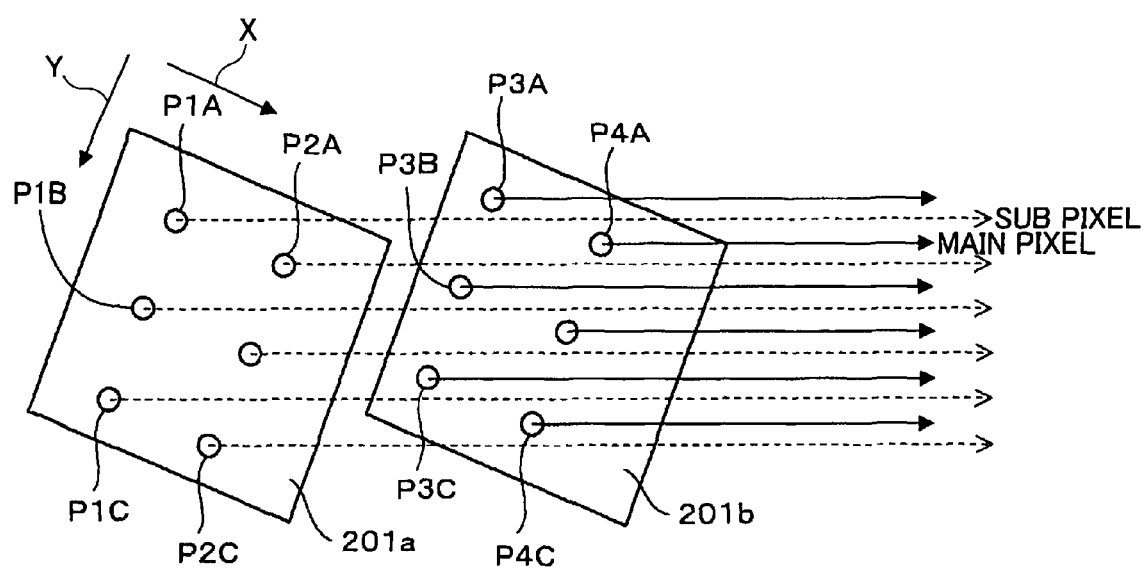
FIG. 54 is a diagram showing another exemplary configuration of a light source unit.

FIG. 54 is a diagram showing another exemplary configuration of a light source unit that may be used in an optical scanning apparatus according to an embodiment of the present invention. The light source unit according to the present example includes two semiconductor lasers 201a and 201b. The semiconductor lasers 201a and 201b may comprise multi-chip laser arrays having laser elements P1A, P1B, P1C, P2A, P2B, P2C and laser elements P3A, P3B, P3C, P4A, P4B, P4C, respectively, as plural light sources two-dimensionally arranged in directions x and y that are perpendicular to each other, or single-chip laser arrays having laser elements P1A, P1B, P1C, P2A, P2B, P2C and laser elements P3A, P3B, P3C, P4A, P4B, P4C, respectively, as plural light sources arranged within the same chip. It is noted that the light sources P1A-P2C and the light sources P3A-P4C are arranged such that the alignment directions of the light sources form a predetermined angle θ with the deflector 204. In the present example, the light sources of one of either the semiconductor laser 201a or 201b (i.e., semiconductor laser 201b in FIG. 54) are arranged to function as main light sources and the light sources of the other one of the semiconductor lasers are arranged to function as sub light sources. It is noted that the serial modulation signal generating circuit 503 or 504 switches the functions of the main light sources and the sub light sources at predetermined timings such as every line or every page in order to increase the service life of the light sources.

Figures 55, 56:
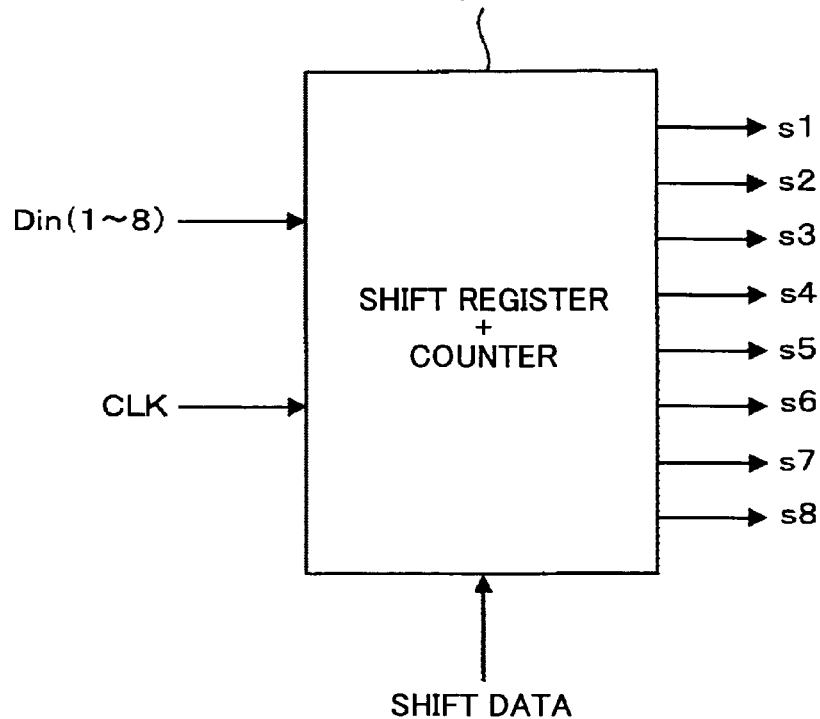
FIG. 55 is a block diagram showing a configuration of a shift register for switching the functions of the light sources.
FIG. 56 is a table showing a relationship between shift data and input/output signals of the shift register of FIG. 55.

FIG. 55 is a diagram showing an exemplary structure for switching the functions of the light sources. In the following descriptions, a case in which input data from the serial modulation signal generating circuit 503 or 504 are directly output to light sources S1-s8 (e.g., light sources P1A, P1B, P2A, P2B, P3A, P3B, P4A, P4B) via a shift register 505 is referred to as reference data status. It is noted that shift data as a control signal for shifting the status of the input/output signals of the shift register 505 by one bit are used in the present example. In this case, a counter for counting the shift data is provided so that timing control of the shift register 505 may be realized by a timing control unit based on a shift data count value of the counter. FIG. 56 is a table showing an exemplary relationship between shift data and the input/output signals of the shift register 505. The timing control unit sets the shift register 505 to the reference data status when the shift data are '00' or '10', and shifts the input/output relationship between the input/output signals of the shift register 505 and the output terminals (light sources) s1-s8 by one bit when the shift data are '01' or '11'.

In the present example, the light sources s1-s8 are defined as either an auxiliary light source that is normally not illuminated (also referred to as 'aux' hereinafter), a main light source (also referred to as 'main' hereinafter), or a sub light source (also referred to as 'sub' hereinafter). For example, provided that the light sources s1-s8 are defined as aux, sub, main, sub, sub, main, sub, aux, respectively, under a predetermined condition, when shift data 01 are input to the shift register 505, the respective functions of the light sources s1-s8 may be set to aux, aux, sub, main, sub, sub, main, sub.

In the following, embodiments of an optical scanning apparatus, an imaging apparatus, and a color imaging apparatus are described.

Figure 57:
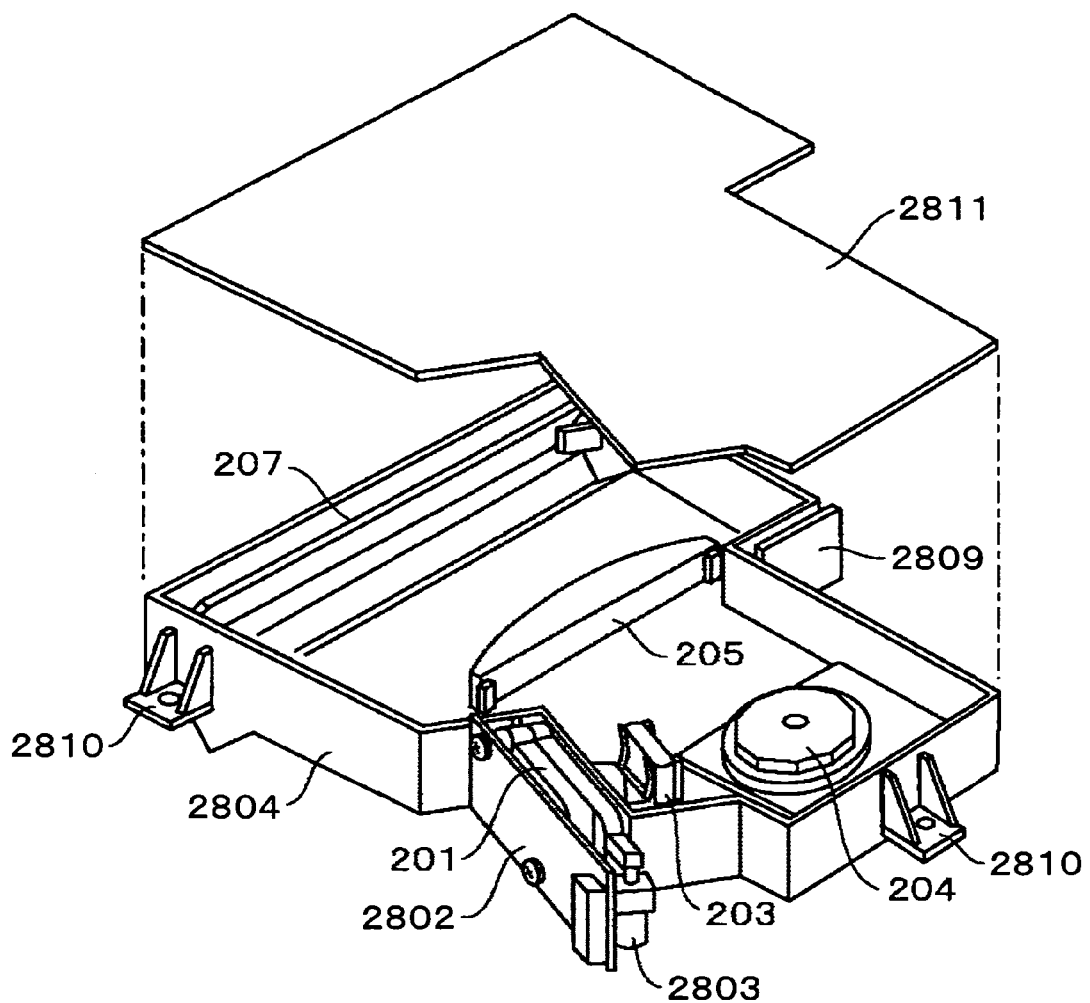
FIG. 57 is diagram showing an exemplary application of the optical scanning apparatus according to the third embodiment.

FIG. 57 is a diagram showing an exemplary configuration of an optical scanning apparatus according to an embodiment of the present invention. It is noted that the exemplary light source units as is described above may be used in the illustrated optical scanning apparatus. As is shown in FIG. 57, the optical scanning apparatus according to the present example includes a printed substrate 2802 arranged at the rear surface side of the light source unit 201, on which printed substrate 2802 the laser drive unit 2150 for controlling the light source unit (semiconductor laser) 201 and the pixel clock generating unit 210 (see FIG. 42) are formed. The printed substrate 2802 is held in contact with a side wall 2804 of an optical housing by a spring (not shown) and is held in position by an adjustment screw 2803 that adjusts the sloping angle of the printed substrate 2802. The adjustment screw 2803 is screwed to a protruding portion formed at the side wall 2804 of the optical housing. The cylinder lens 203, the polygon mirror 204, the polygon mirror motor (not shown) that rotates the polygon mirror 204, the fθ lens 205, the torroidal lens 206, and the retro-reflective mirror 207 are fixed in position and supported within the optical housing. A printed substrate 2809 on which the photo sensors 101 and 102 are arranged is attached to the outer side of the housing side wall 2804. The upper portion of the optical housing is covered by a cover 2811 and is fixed to a frame member of an imaging apparatus main body by screws that are screwed into plural mount portions 2810 that protrude from the side wall 2804.

In the following, an exemplary configuration of a multi-beam scanning apparatus (multi-beam optical system) that uses plural light sources is described.

Figure 58:
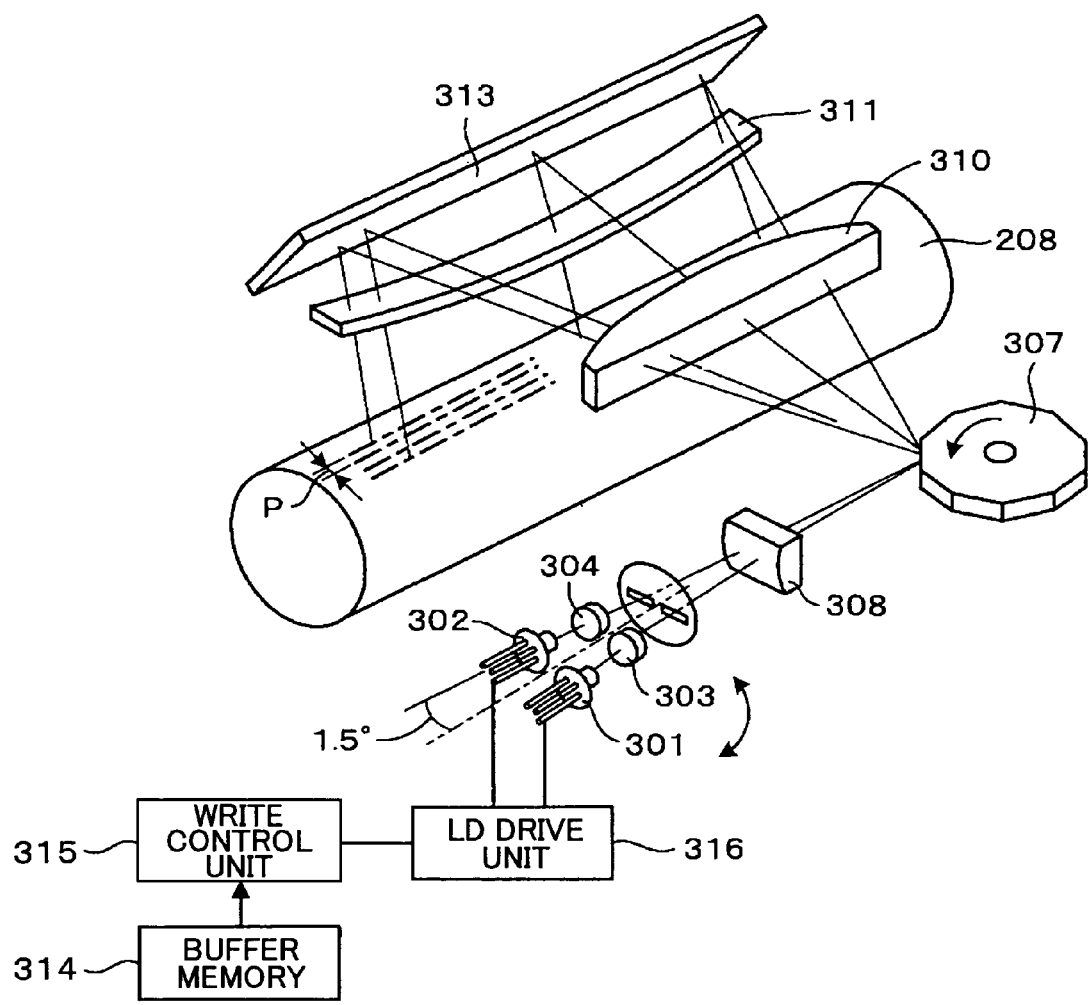
FIG. 58 is a diagram showing a multi-beam scanning apparatus as another exemplary application of the optical scanning apparatus according to the third embodiment.

FIG. 58 is a diagram showing a multi-beam scanning apparatus according to an embodiment of the present invention. The illustrated multi-beam scanning apparatus includes two semiconductor laser arrays 301 and 302 that are monolithically arranged and set apart from each other by a distance of ds=25 μm which semiconductor laser arrays 301 and 302 may embody the light source unit 201 as is described above.

In the example of FIG. 58, the optical axes of the semiconductor laser arrays 301 and 302 are arranged to correspond to the optical axes of collimator lenses 303 and 304, respectively, the light emitting angles of the semiconductor laser arrays 301 and 302 are arranged to be symmetrical with respect to the main scanning direction, and the light emitting axes of the semiconductor laser arrays 301 and 302 are arranged to intersect at the reflection point of a polygon mirror 307. Plural beams emitted from the semiconductor laser arrays 301 and 302 are collectively scanned on the polygon mirror 307 via a cylinder lens 308 after which the beams are incident on the photoconductor 208 corresponding to the scanning medium via a fθ lens 310 and a torroidal lens 311 to form an image on the photoconductor 208. It is noted that print data of one line for each light source are stored in a buffer memory 314 of an imaging apparatus, and the print data are read in units of data (light beams) that are incident on a surface of the polygon mirror 307 which data are supplied to a write control unit 315 including the photo sensors 101 and 102, the dot position deviation detection control unit 2110, the pixel clock generating unit 210, the image processing unit 2130, and the laser drive data generating unit 2140 of FIG. 42, for example. In turn, a laser drive unit 316 drives the semiconductor laser arrays 301 and 302 based on the laser drive data (modulation data) from the write control unit 315 so that four lines may be simultaneously recorded. Also, phase shifting of the pixel clock generated at the pixel clock generating unit 210 is performed in order to compensate for variations in the optical scanning length and scale caused by variations in the wavelength of the laser beams from the semiconductor laser arrays 301 and 302, and in this way, the variations in the scanning length may be corrected up to a degree of accuracy corresponding to the unit amount of phase shift so that deviations of the scanning light may be reduced.

Figures 59A, 59B:
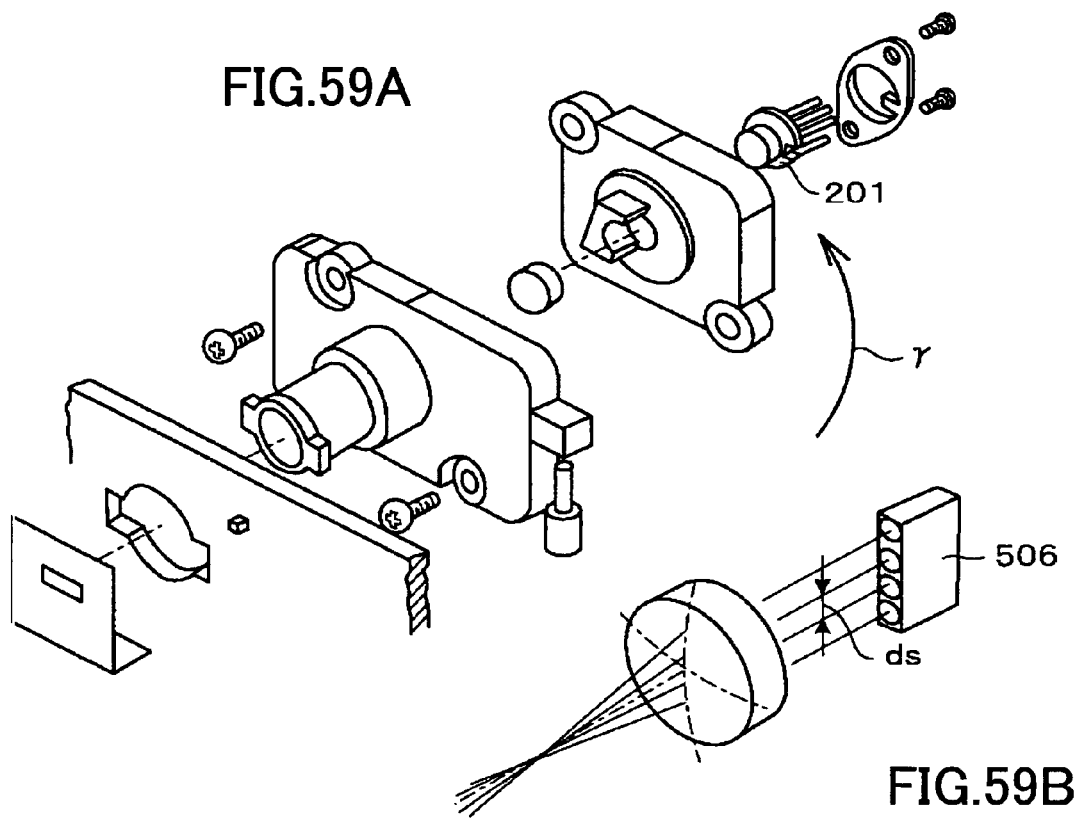
FIGS. 59A and 59B are diagrams showing a section of an optical scanning apparatus having a laser array.

FIGS. 59A and 59B are partial views of another optical scanning apparatus that includes a laser array having light sources arranged in the sub scanning direction (vertical direction in FIGS. 59A and 59B). The optical scanning apparatus according to the present example includes a light source unit 201 that uses a laser array 506 having four light sources arranged in the sub scanning direction (vertical direction).

Figures 60A, 60B:
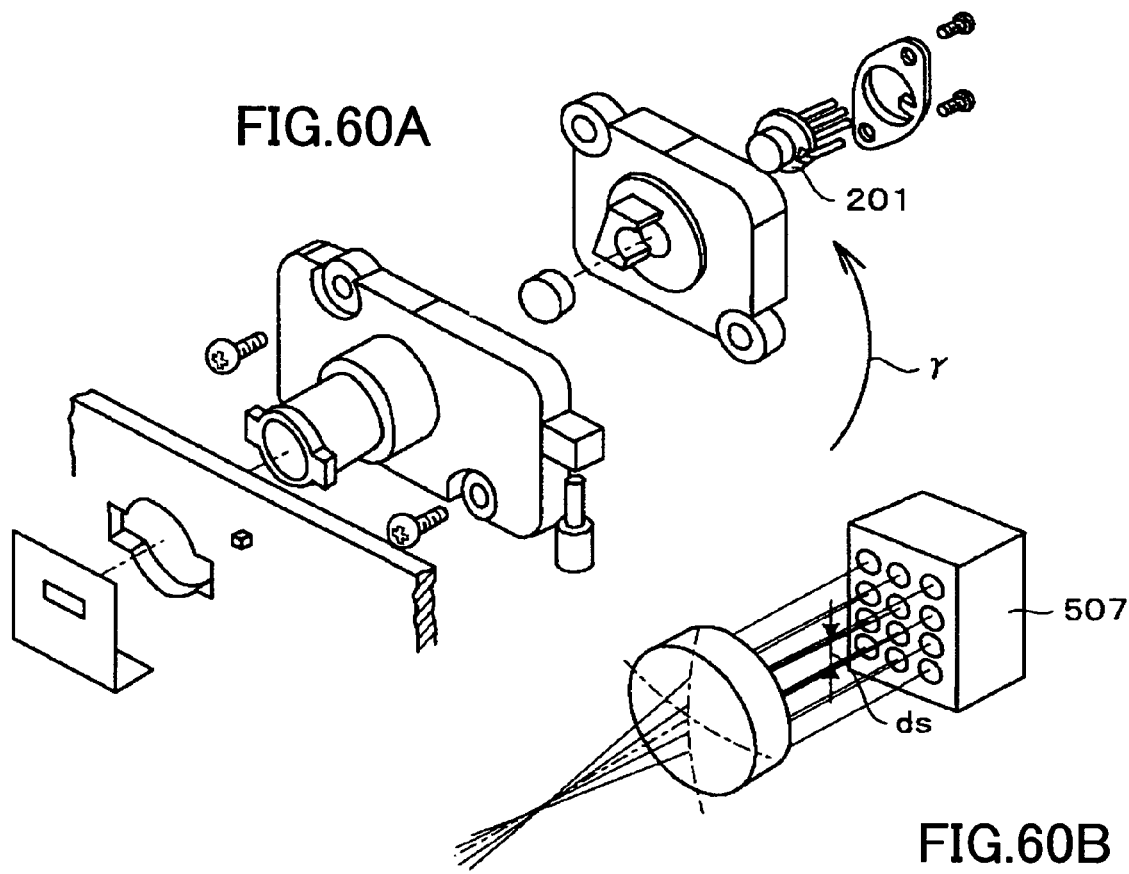
FIGS. 60A and 60B are diagrams showing a section of an optical scanning apparatus having a surface emitting laser.

FIGS. 60A and 60B are partial views of another optical scanning apparatus that includes a surface emitting laser 507 having plural light sources arranged into a two-dimensional array. The surface emitting laser 507 of the optical scanning apparatus according to the present example includes a total of twelve light sources that are arranged into threes in the horizontal direction and fours in the vertical direction.

Figure 61:
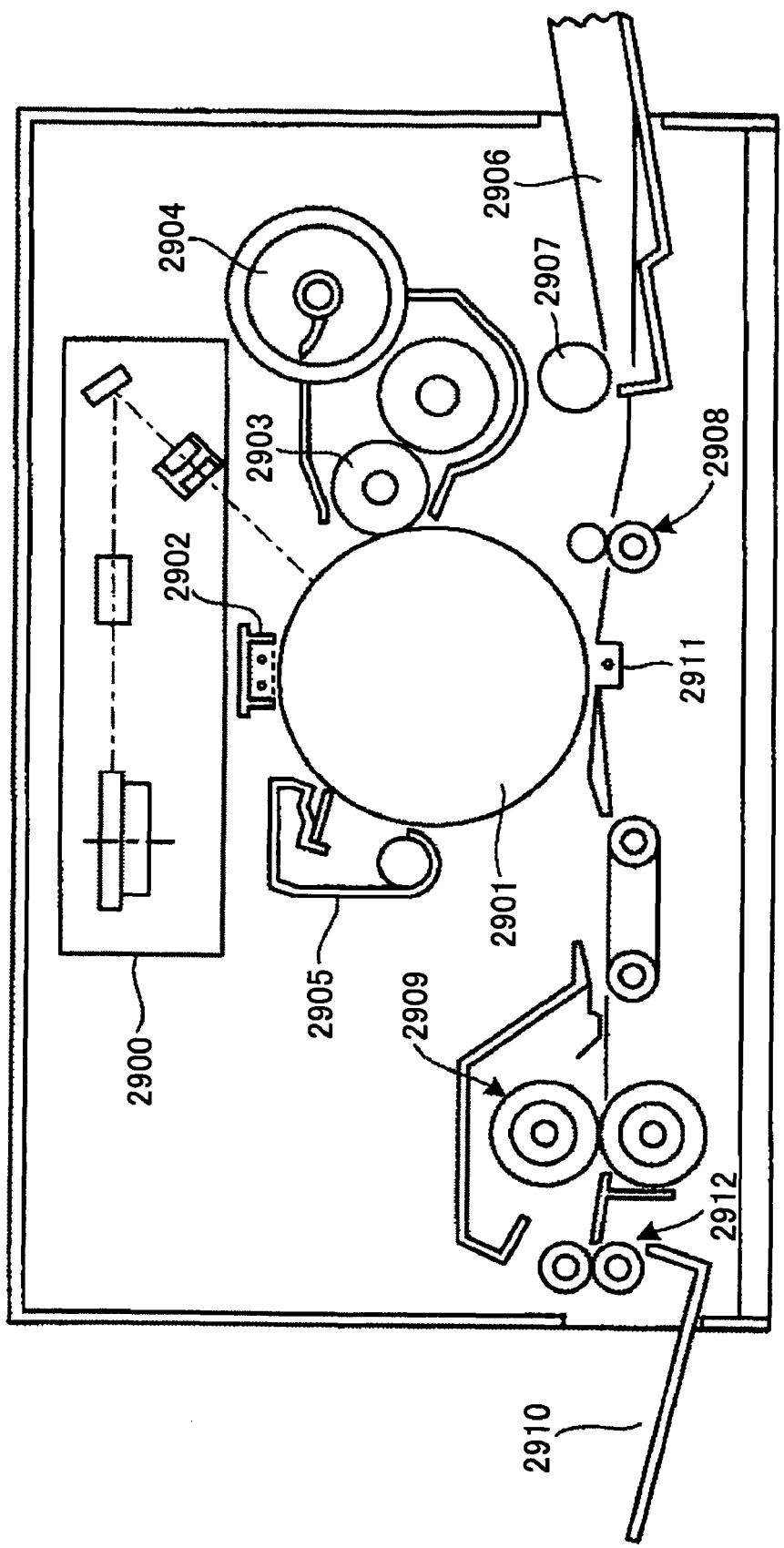
FIG. 61 is a diagram showing a configuration of an imaging apparatus according to an embodiment of the present invention.

FIG. 61 is a diagram showing a configuration of an imaging apparatus according to an embodiment of the present invention. The imaging apparatus shown in FIG. 61 includes an optical scanning apparatus 2900, a photoconductor drum 2901 as a scanning medium, a charger 2902 that charges the photoconductor drum 2901 to a high voltage, a developing roller 2903 that applies toner to a latent image formed on the photoconductor 2901 through light exposure realized by the optical scanning apparatus 2900 to develop a toner image, a toner cartridge 2904 that supplies toner to the developing roller 2903, a cleaning case 2905 that removes toner remaining on the photoconductor 901 and stores the removed toner, a paper feeding tray 2906 that accommodates recording paper (transfer paper), a paper feeding roller 2907, a resist roller pair 2908, a transfer charger 2911, a fixing unit 2909, a delivery tray 2910, and delivery rollers 2912, for example. The charger 2902, the developing roller 2903, the toner cartridge 2904, and the cleaning case 2905 are arranged close to the photoconductor drum 2901. It is noted that any of the optical scanning apparatuses as is described above or some other type of optical scanning apparatus may be used as the optical scanning apparatus 2900. In the present example, a latent image of plural lines is simultaneously formed on the photoconductor drum 2901 through light exposure realized by the optical scanning apparatus 2900. Recording paper accommodated in the paper feeding tray 2906 is fed into the apparatus by the paper feeding roller 2907, and is guided by the resist roller pair 2908 according to the sub scanning direction recording start timing. In turn, toner is transferred onto the transfer paper by the transfer charger 2911 when the transfer paper passes across the photoconductor drum 2901, and the transferred toner image is fixed on the transfer paper by the fixing unit 2909 so that the transfer paper with the toner image fixed thereon may be delivered to the delivery tray 2910 via the delivery roller 2912.

It is noted that the optical scanning apparatus 2900 used in the present example may include the photo sensors 101 and 102, the light source unit 201, the dot position detection/control unit 2110, the pixel clock generating unit 210, the image processing unit 2130, the laser drive data generating unit 2140, and the laser drive unit 2150 as is shown in FIG. 42, for example, and the laser drive unit 2150 may be configured to drive the light source unit 201 of the optical scanning apparatus 2900 according to laser drive data supplied from the laser drive data generating unit 2140. In this way, accurate dot position correction may be realized and a high quality image may be formed.

Figure 63:
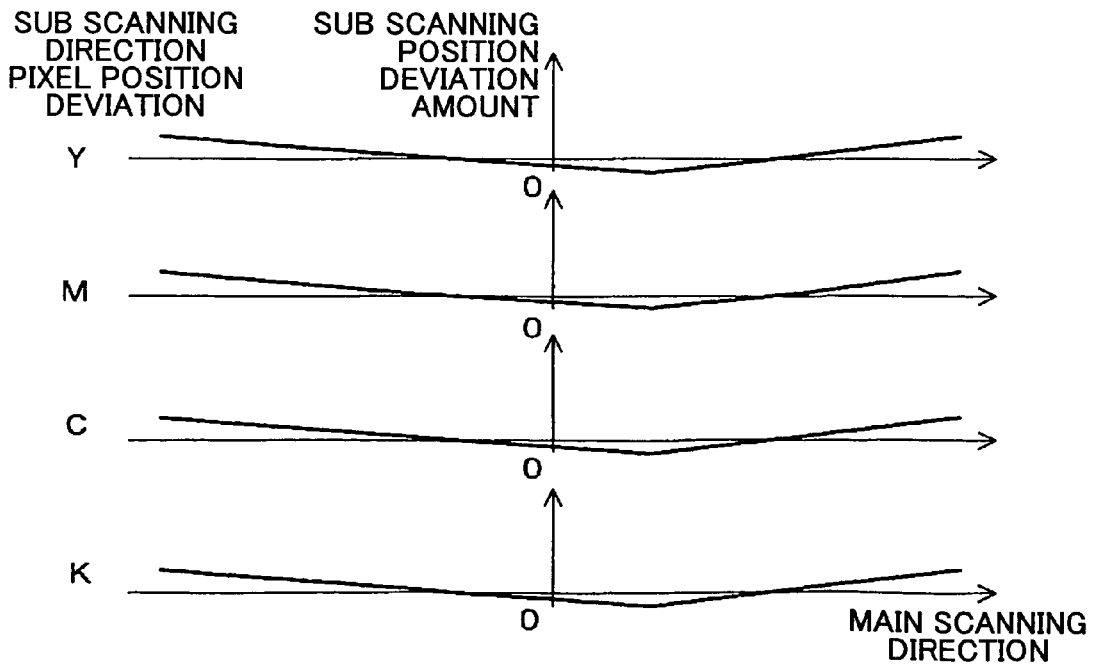
FIG. 63 is a diagram showing a result of performing sub scanning direction dot position deviation correction on the sub scanning direction dot position deviations shown in FIG. 62.

FIGS. 63 and 64 are diagrams illustrating sub scanning direction dot position deviation correction realized in a color imaging apparatus according to an embodiment of the present invention.

Figure 62:
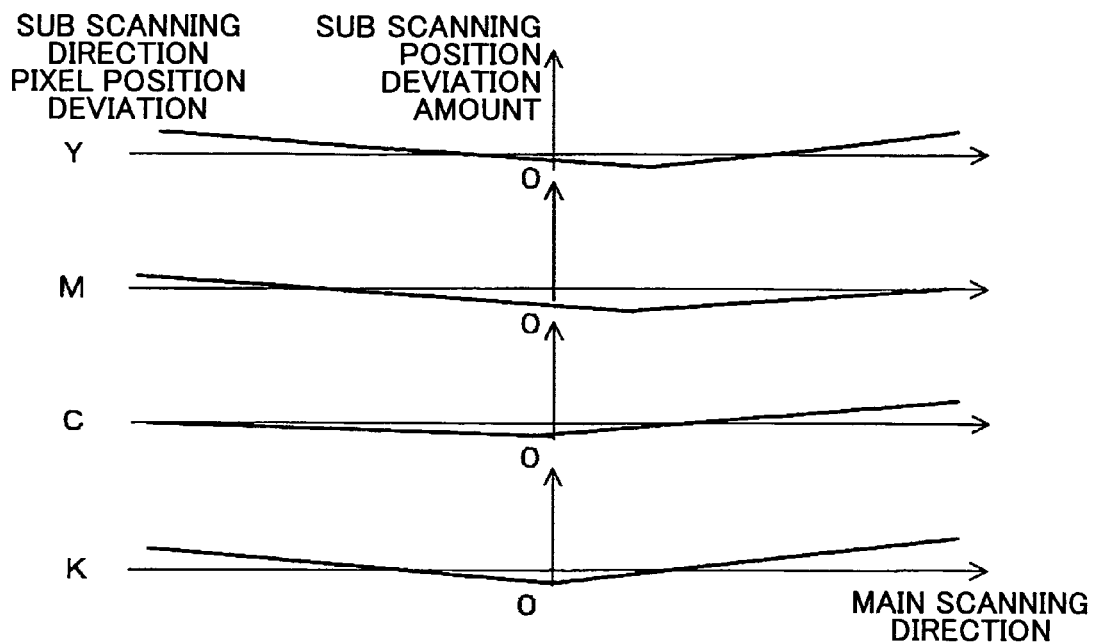
FIG. 62 is a diagram showing exemplary sub scanning direction dot position deviations varying with respect to each color.

Normally, in a color imaging apparatus, optical scanning is performed with respect to each color, and thereby, sub scanning direction dot position deviations may vary from one color to another. FIG. 62 shows exemplary sub scanning direction dot position deviations of the colors yellow (Y), magenta (M), cyan (C), and black (K). It is noted that correcting the dot position deviations with respect to each color may not be practical or effective in consideration of the amount of correction data that would be required or possible influences from dot position deviation correction errors, for example. Accordingly, in the present example, since the sub scanning direction dot position deviations of the different colors have a common pattern as is shown in FIG. 62, the sub scanning direction dot position of yellow is used as a sub scanning reference position, and the sub scanning direction dot position deviations that occurs for the color yellow upon optical scanning are measured beforehand, and for the colors magenta, cyan, and black their sub scanning direction dot position deviations with respect to the measured sub scanning direction dot position deviations of yellow are measured. Thus, the sub scanning direction dot position deviations of magenta, cyan, and black are corrected based on the measurement results using the sub scanning direction dot position deviations of yellow as a reference position. In this case, the amount of correction data to be used may be reduced, and the amount of correction to be implemented may also be reduced. According to the present example, position deviations between the colors yellow, magenta, cyan, and black may be accurately corrected as is shown in FIG. 63.

It is noted that in the case of using the light source unit shown in FIG. 47 or FIG. 51 in the imaging apparatus according to the present example, the light emitting amount and the light emitting time of the main light sources may be greater than the light emitting amount and light emitting time of the sub light sources so that the service life of the main light sources may be shorter than that of the sub light sources to reduce the overall service life of the optical scanning apparatus. Accordingly, in a preferred embodiment, means for switching the functions of the light sources of the light source unit used in the present imaging apparatus between main light sources and sub light sources is used so that the functions of the light sources may be switched according to predetermined timings such as every line scanning or every page scanning, for example. In this way, degradation of the light sources may be prevented, and the difference in the service life of the main light sources and the sub light sources may be reduced to increase the overall service life of the imaging apparatus.

FIG. 64 is a diagram showing a configuration of a tandem color imaging apparatus according to an embodiment of the present invention that includes an imaging system having plural photoconductors as scanning media. The tandem color imaging apparatus as is illustrated in FIG. 64 includes plural photoconductors corresponding to each of colors cyan, magenta, yellow, and black, for example, and plural optical scanning apparatuses as optical scanning systems for each of the photoconductors corresponding to the different colors, the optical scanning apparatuses each having individual optical paths for exposing light and forming a latent image on their corresponding photoconductors. In this case, dot position deviations with respect to the main scanning direction that occur at the respective photoconductors are likely to differ from each other.

The tandem color imaging apparatus of FIG. 64 includes a polygon mirror 601, scanning lenses 602-605 and 606-609, anti-dust glasses 610-613, photoconductors 614-617, optical receivers 618-621, retro-reflective mirrors 622-633, and an intermediate transfer belt 634. In the present example, the polygon mirror 601, the scanning lenses 602-605 and 606-609, the anti-dust glasses 610-613, the retro-reflective mirrors 622-633, and a polygon mirror motor (not shown) for rotating the polygon mirror 601 may comprise an optical scanning apparatus. In the present example, plural laser beams emitted from four light source units (not shown) are arranged to be collectively scanned on and deflected by the polygon mirror 601, and the deflected laser beams are incident on the scanning lenses 602-605 and 606-609, the retro-reflective mirrors 622-633, and the anti-dust glasses 610-613 to scan the photoconductors 614-617 in the main scanning direction. The polygon mirror 601 is arranged to be two-tiered so that the optical scanning apparatus may have scanning optical systems at an upper side and a lower side. Specifically, the scanning optical systems are arranged opposite one another with respect to the polygon mirror 601 corresponding to a deflector so that four scanning optical systems corresponding to the four photoconductors 614-617 as scanning media are provided. The optical receivers 618-621 are arranged to receive scanning laser reflected by the anti-dust glasses 610-613 and guided by mirrors arranged at the outer sides of the effective angle of view. It is noted that each of the scanning optical systems includes the light source unit 201, the dot position deviation detection control unit 2110, the pixel clock generating unit 210, the image processing unti 2130, the laser drive data generating unit 2140, and the laser drive unit 2150 as is described above, and the laser drive unit 2150 is configured to drive the light source unit 201 based on the laser drive data (modulation data) generated by the laser drive data generating unit 2140.

The photoconductors 614-617 are each rotated by a drive unit (not shown) and evenly charged by a charger (not shown) before having laser light irradiated thereon to form a latent image. Then, the latent image formed on each of the photoconductors 614-617 is developed into a toner image by a developer (not shown). Then, a full color image is formed by transferring the toner images of different colors formed on the photoconductors 614-617 on the intermediate transfer belt 634 by a transfer unit (not shown). Then, the full color image formed on the intermediate transfer belt is transferred onto transfer paper by another transfer unit (not shown), and the transfer paper with the full color image transferred thereon is fixed by a fixing unit before being discharged.

Also, it is noted that a pattern image for measuring is formed on the intermediate transfer belt 634 in a manner similar to that for forming the toner image as is described above. Plural sensors arranged at each of the scanning optical systems are configured to detect the pattern image and measure dot positions from the patter image. The dot position deviation detection/control unit 2110 of each of the scanning optical systems is configured to obtain a main scanning direction dot position deviation amount from detection signals output by the sensors, generate phase data for correcting the dot position deviation, and output the generated phase data to the pixel clock generating unit 210. In one preferred embodiment, the main scanning direction dot position deviation of the color yellow may be measured beforehand, and the main scanning direction dot position of yellow may be used as a reference position by the dot position deviation detection/ control unit 2110 of each of the scanning optical systems. In this case, the main scanning direction dot position deviations of magenta, cyan, and black with respect to the main scanning direction dot position of yellow are measured, and the main scanning direction dot positions of magenta, cyan, and black are corrected according to the measurement results using the main scanning direction dot position of yellow as a reference position.

According to the present example, sub scanning direction deviations may be accurately corrected so that a high quality image may be obtained. It is particularly noted that color drift caused by dot position deviations between imaging systems of different colors may be effectively prevented in the present example so that an image with good color reproducibility may be obtained.

In the following, exemplary advantageous effects that may be realized by the third embodiment of the present invention are described.

According to one aspect of the present embodiment, by using the pixel clock generating unit 210 configured to perform phase control and a combination of main light sources and sub light sources, dot position correction with respect to the main scanning direction and the sub scanning direction may be accurately performed.

According to another aspect of the present embodiment, by using the high frequency clock, phase shifting may be performed in units that are smaller than the phase of the pixel clock with a relatively simple configuration so that main scanning direction correction may be accurately performed.

According to another aspect of the present embodiment, by arranging the total light emitting time of a main light source and a sub light source for forming one dot to be substantially the same for each pixel, dot position correction with respect to the main scanning direction and the sub scanning direction may be performed with a simple circuit configuration.

According to another aspect of the present embodiment, by arranging the total amount of light emitted by a main light source and a sub light source for forming one dot to be substantially the same for each pixel, dot position correction with respect to the main scanning direction and the sub scanning direction may be performed with a simple circuit configuration.

According to another aspect of the present embodiment, by switching the functions of the main light sources and the sub light sources at predetermined timings, the service life of the light sources may be prolonged.

According to another aspect of the present embodiment, in forming a dot with a sub light source and a main light source, by arranging the main scanning direction deviation correction amount for the sub light source to be substantially the same as the main scanning direction deviation correction amount for the main light source, dot position correction with respect to the main scanning direction and the sub scanning direction may be accurately performed with a reduced amount of data.

According to another aspect of the present embodiment, by using a surface emitting laser having plural light sources arranged on a common chip, higher efficiency may be realized compared to a case of using a normal semiconductor laser so that the power consumption rate may be reduced and power may be saved.

According to another aspect of the present embodiment, by equipping an imaging apparatus with main scanning direction correcting means and sub scanning direction correcting means as is described above, a high quality image may be accurately formed and power conservation may be realized in the imaging apparatus.

According to another-aspect of the present embodiment, by configuring a color imaging apparatus to perform dot position correction for different colors in accordance with the dot position deviation of a predetermined color, the required memory capacity may be reduced, and main scanning direction correction and sub scanning direction correction may be realized with a relatively simple configuration.

According to another aspect of the present embodiment, by including plural semiconductor lasers each having plural light sources arranged into a two-dimensional array on a chip and corresponding to a different color, accurate dot formation may be realized.

According to another aspect of the present embodiment, by using mirrors as means for guiding light flux reflected by a deflector (e.g., polygon mirror 601) onto plural scanning media (e.g., photoconductors 614-617) and scanning the deflected light flux on the scanning media to form images thereon in a tandem color imaging apparatus, pixel positions with respect to the main scanning direction and the sub scanning direction may be accurately corrected, and a high quality image with reduced color drift may be accurately formed by the tandem color imaging apparatus.

In the following, an overview of preferred embodiments of the present invention is given.

According to one embodiment of the present invention, an optical scanning apparatus is provided that includes:

a light source unit including plural main light sources and plural sub light sources, the main light sources being two-dimensionally arranged in the main scanning direction and the sub scanning direction, and the sub light sources being arranged between rows of the main light sources which rows are aligned in the main scanning direction;

an optical system configured to scan light emitted from the light source unit on a scanning object and form an image on the scanning object; and a control apparatus configured to adjust a main scanning direction image position by controlling two main light sources of the main light sources which two main light sources are juxtaposed to each other with respect to the main scanning direction, and adjust a sub scanning direction image position by controlling a main light source of the main light sources and a sub light source of the sub light sources which main light source and sub light source are adjacent to each other.

In one preferred embodiment, the sub light sources are arranged such that distances with respect to the sub scanning direction between the sub light sources and the main light sources disposed adjacent to the sub light sources are equal.

In another preferred embodiment, the control apparatus is configured to adjust the sub scanning direction image position by controlling pulse widths of respective drive signals for the main light source and the sub light source that are adjacent to each other.

In another preferred embodiment, a total amount of light emitted from the main light source and the sub light source that are adjacent to each other is arranged to equal a predetermined value.

In another preferred embodiment, the control apparatus is configured to adjust the sub scanning direction image position by controlling respective light emitting powers of the main light source and the sub light source that are adjacent to each other.

In another preferred embodiment, a total amount of light emitted from the main light source and the sub light source that are adjacent to each other is arranged to equal a predetermined value.

In another preferred embodiment, the control apparatus is configured to adjust the main scanning direction image position by simultaneously driving the two main light sources that are juxtaposed to each other with respect to the main scanning direction.

In another preferred embodiment, the control apparatus is configured to adjust the main scanning direction image position by regulating a light emitting timing of at least one of the two main light sources that are juxtaposed to each other with respect to the main scanning direction.

In another preferred embodiment, the main light sources and the sub light sources are arranged within a common chip.

According to another embodiment of the present invention, an imaging apparatus is provided that includes:

a scanning object;

an optical scanning apparatus configured to scan light containing image information on the scanning object and form a corresponding image on the scanning object; and a transfer apparatus configured to transfer the corresponding image formed on the scanning object onto a transferring object;

wherein the optical scanning apparatus includes a light source unit including a plurality of main light sources and a plurality of sub light sources, the main light sources being two-dimensionally arranged in the main scanning direction and the sub scanning direction, and the sub light sources being arranged between rows of the main light sources which rows are aligned in the main scanning direction;

an optical system configured to scan the light containing image information emitted from the light source unit on the scanning object and form the corresponding image on the scanning object; and a control apparatus configured to adjust a main scanning direction image position by controlling two main light sources of the main light sources which two main light sources are juxtaposed to each other with respect to the main scanning direction, and adjust a sub scanning direction image position by controlling a main light source of the main light sources and a sub light source of the sub light sources which main light source and sub light source are adjacent to each other.

In a preferred embodiment, the image information corresponds to color image information.

According to another embodiment of the present invention, an optical scanning apparatus is provided that scans light including image information on a scanning object and forms an image on the scanning object, the optical scanning apparatus including:

a light source unit including plural light sources that are two-dimensionally arranged in the sub scanning direction and the main scanning direction, the light sources including a plurality of main light sources configured to form a plurality of main pixels on the scanning object and at least one auxiliary light source configured to correct a positional deviation with respect to the sub scanning direction of at least one main pixel of the main pixels; and a signal generating circuit configured to generate a plurality of main light source control signals for the main light sources based on the image information, and an auxiliary light source control signal for the auxiliary light source based on positional deviation information pertaining to the positional deviation of the main pixel, the auxiliary light source control signal being generated when an amount of the positional deviation of the main pixel is greater than or equal to a single pixel size.

In a preferred embodiment, the light sources further include at least one sub light source; and the signal generating circuit is configured to generate a sub-light source control signal for the sub light source based on the positional deviation information pertaining to the positional deviation of the main pixel with respect to the sub scanning direction, the sub light source control signal being generated when the amount of the positional deviation of the main pixel is less than the single pixel size.

According to another embodiment of the present invention, an optical scanning apparatus is provided that scans light including image information on a scanning object and forms an image on the scanning object, the optical scanning apparatus including:

a light source unit that includes plural light sources including a plurality of main light sources and at least one auxiliary light source, the main light sources being used for forming a plurality of main pixels on the scanning object according to the image information, and the auxiliary light source being used for correcting a positional deviation with respect to a sub scanning direction of at least one main pixel of the main pixels when an amount of the positional deviation of the main pixel is greater than or equal to a single pixel size; and a signal generating circuit configured to generate an auxiliary light source control signal for the auxiliary light source based on positional deviation information pertaining to the positional deviation of the main pixel with respect to the sub scanning direction when the amount of the positional deviation of the main pixel is greater than or equal to the single pixel size.

In a preferred embodiment, the light sources further include at least one sub light source configured to be used for correcting the positional deviation of the main pixel with respect to the sub scanning direction when the amount of the positional deviation of the main pixel is less than the single pixel size; and the signal generating circuit is configured to generate a sub light source control signal for the sub light source based on the positional deviation information pertaining to the positional deviation of the main pixel with respect to the sub scanning direction when the amount of the positional deviation of the main pixel is less than the single pixel size.

In another preferred embodiment, the light sources are two-dimensionally arranged in the sub scanning direction and the main scanning direction.

In another preferred embodiment, the light sources are arranged equidistant from each other with respect to the sub scanning direction and the main scanning direction.

In another preferred embodiment, the main light sources are arranged to be adjacent to at least one of the sub light source and the auxiliary light source with respect to the sub scanning direction and the main scanning direction.

In another preferred embodiment, at least one of the sub light source is arranged between two main light sources of the main light sources which two main light sources are juxtaposed to each other with respect to the sub scanning direction.

In another preferred embodiment, the number of the sub light source(s) arranged between the two main light sources is selected from numbers one, two, or three.

In another preferred embodiment, the number of the sub light source arranged between the two main light sources is one; and the light sources are arranged into an odd number of rows extending in the main scanning direction.

In another preferred embodiment, the number of the sub light source arranged between the two main light sources is two; and the light sources are arranged into a number of rows extending in the main scanning direction which number of rows is a number other than a multiple of three.

In another preferred embodiment, the number of the sub light source arranged between the two main light sources is three; and the light sources are arranged into a number of rows extending in the main scanning direction which number of rows is a multiple of three.

In another preferred embodiment, the number of the sub light source arranged between the two main light sources is three; and when the single pixel size is reduced to one-half, the signal generating circuit is configured to generate a main pixel generating control signal for a middle sub light source positioned in the middle of the three sub light sources arranged between the two main light sources, the control signal being configured to control the middle sub light source to generate a main pixel.

In another preferred embodiment, the number of the auxiliary light source(s) is determined based on an extent of positional deviation with respect to the sub scanning direction of light irradiated from the main light sources.

In another preferred embodiment, the light source unit corresponds to a surface-emitting laser having the light sources arranged in a same chip.

According to another embodiment of the present invention, an imaging apparatus is provided that includes:

a scanning object;

a scanning apparatus configured to scan light including image information on the scanning object and form an image on the scanning object; and a transfer apparatus configured to transfer the image formed on the scanning object onto a transferring object;

wherein the scanning apparatus includes a light source unit including plural light sources that include plural main light sources and at least one auxiliary light source, the main light sources being used for forming plural main pixels on the scanning object according to the image information, and the auxiliary light source being used for correcting a positional deviation with respect to a sub scanning direction of at least one main pixel of the main pixels when an amount of the positional deviation of the main pixel is greater than or equal to a single pixel size; and a signal generating circuit configured to generate an auxiliary light source control signal for the auxiliary light source based on positional deviation information pertaining to the positional deviation of the main pixel with respect to the sub scanning direction when the amount of the positional deviation of the main pixel is greater than or equal to the single pixel size.

In a preferred embodiment, the imaging apparatus of the above embodiment includes:

a plural number of the scanning objects which scanning objects correspond to a plural number of different colors making up the image; and a plural number of the scanning apparatuses which scanning apparatuses are individually directed for the scanning objects corresponding to the different colors.

According to another embodiment of the present invention, a dot position correcting apparatus is provided that includes:

a pixel clock generating unit that includes a high frequency clock generating unit that generates a high frequency clock;

a control data generating unit that generates first control data and second control data based on phase data representing a pixel clock phase shift amount and a status signal representing a pixel clock status;

a first clock generating unit that generates a first clock based on the high frequency clock and the first control data;

a second clock generating unit that generates a second clock based on the high frequency clock and the second control data; and a clock selecting unit that outputs one of the first clock and the second clock as a pixel clock;

wherein the first clock generating unit includes
a first detecting unit that detects a transition of the first clock;
a first control signal generating unit that generates a first control signal based on an output of the first detecting unit and the first control data; and
a first signal transitioning unit that transitions a signal at a first transition timing of the high frequency clock based on the first control signal and outputs the transitioned signal as the first clock;

a main scanning direction dot position correcting unit configured to perform dot position correction with respect to a main scanning direction based on the pixel clock phase shift amount of the pixel clock generated by the pixel clock generating unit; and a sub scanning direction dot position correcting unit configured to perform dot position correction in a sub scanning direction by controlling light emission of a light source unit that is configured to scan plural light beams on a scanning medium along the main scanning direction through a deflector, the light source unit including plural main light sources and plural sub light sources that are configured to scan the light beams along differing scanning lines;

wherein light emitting timings of the main light sources and the sub light sources are based on the pixel clock generated by the pixel clock generating unit.

In a preferred embodiment, the second clock generating unit includes
a second detecting unit that detects a transition of the second clock;
a second control signal generating unit that generates a second control signal based on an output of the second detecting unit and the second control data; and
a second signal transitioning unit that transitions a signal at a second transition timing of the high frequency clock based on the second control data and outputs the transitioned signal as the second clock.

In another preferred embodiment, one of the main light sources and at least one of the sub light sources are arranged to emit light for forming one dot and scan the light on the scanning medium at a substantially same position with respect to the main scanning direction; and
a total light emitting time of the light emitted by said one of the main light sources and said at least one of the sub light sources is arranged to be substantially constant.

In another preferred embodiment, one of the main light sources and at least one of the sub light sources are arranged to emit light for forming one dot and scan the light on the scanning medium at a substantially same position with respect to the main scanning direction; and
a total amount of energy of the light emitted by said one of the main light sources and at least one of the sub light sources is arranged to be constant.

In another preferred embodiment, the functions of the main light sources and the sub light sources are periodically switched according to a predetermined timing.

In another preferred embodiment, when a main light source of the main light sources and a sub light source of the sub light sources form one pixel, main scanning direction dot position deviation data for said main light source and main scanning direction dot position deviation data for said sub light source are arranged to be substantially identical.

In another preferred embodiment, the main light sources and the sub light sources are arranged on a same chip and comprise a surface emitting laser.

According to another embodiment of the present invention, an optical scanning apparatus is provided that forms an image by scanning plural light beams on a scanning medium which light beams are emitted from a light source unit and deflected by a deflector, the optical scanning apparatus including:

a pixel clock generating unit that includes
a high frequency clock generating unit that generates a high frequency clock;
a control data generating unit that generates first control data and second control data based on phase data representing a pixel clock phase shift amount and a status signal representing a pixel clock status;
a first clock generating unit that generates a first clock based on the high frequency clock and the first control data;
a second clock generating unit that generates a second clock based on the high frequency clock and the second control data; and
a clock selecting unit that outputs one of the first clock and the second clock as a pixel clock;
wherein the first clock generating unit includes
a first detecting unit that detects a transition of the first clock;
a first control signal generating unit that generates a first control signal based on an output of the first detecting unit and the first control data; and
a first signal transitioning unit that transitions a signal at a first transition timing of the high frequency clock based on the first control signal and outputs the transitioned signal as the first clock;

a main scanning direction dot position correcting unit configured to perform dot position correction with respect to a main scanning direction based on the pixel clock phase shift amount of the pixel clock generated by the pixel clock generating unit; and a sub scanning direction dot position correcting unit configured to perform dot position correction in a sub scanning direction by controlling light emission of the light source unit that includes plural main light sources and plural sub light sources that are configured to scan the light beams along differing scanning lines;

wherein light emitting timings of the main light sources and the sub light sources are based on the pixel clock generated by the pixel clock generating unit.

In a preferred embodiment, the second clock generating unit includes
a second detecting unit that detects a transition of the second clock;
a second control signal generating unit that generates a second control signal based on an output of the second detecting unit and the second control data; and
a second signal transitioning unit that transitions a signal at a second transition timing of the high frequency clock based on the second control data and outputs the transitioned signal as the second clock.

In another preferred embodiment, one of the main light sources and at least one of the sub light sources are arranged to emit light for forming one dot and scan the light on the scanning medium at a substantially same position with respect to the main scanning direction; and
a total light emitting time of the light emitted by said one of the main light sources and said at least one of the sub light sources is arranged to be substantially constant.

In another preferred embodiment, one of the main light sources and at least one of the sub light sources are arranged to emit light for forming one dot and scan the light on the scanning medium at a substantially same position with respect to the main scanning direction; and
a total amount of energy of the light emitted by said one of the main light sources and at least one of the sub light sources is arranged to be constant.

In another preferred embodiment, the functions of the main light sources and the sub light sources are periodically switched according to a predetermined timing.

In another preferred embodiment, when a main light source of the main light sources and a sub light source of the sub light sources form one pixel, main scanning direction dot position deviation data for said main light source and main scanning direction dot position deviation data for said sub light source are arranged to be substantially identical.

In another preferred embodiment, the main light sources and the sub light sources are arranged on a same chip and comprise a surface emitting laser.

According to another embodiment of the present invention, an imaging apparatus is provided that forms an image by scanning plural light beams on a scanning medium which light beams are emitted from a light source unit and deflected by a deflector, the imaging apparatus including:
a dot position correcting apparatus including
a pixel clock generating unit that includes
a high frequency clock generating unit that generates a high frequency clock;
a control data generating unit that generates first control data and second control data based on phase data representing a pixel clock phase shift amount and a status signal representing a pixel clock status;
a first clock generating unit that generates a first clock based on the high frequency clock and the first control data;
a second clock generating unit that generates a second clock based on the high frequency clock and the second control data; and
a clock selecting unit that outputs one of the first clock and the second clock as a pixel clock;
wherein the first clock generating unit includes a first detecting unit that detects a transition of the first clock, a first control signal generating unit that generates a first control signal based on an output of the first detecting unit and the first control data, and a first signal transitioning unit that transitions a signal at a first transition timing of the high frequency clock based on the first control signal and outputs the transitioned signal as the first clock;
a main scanning direction dot position correcting unit configured to perform dot position correction with respect to a main scanning direction based on the pixel clock phase shift amount of the pixel clock generated by the pixel clock generating unit; and
a sub scanning direction dot position correcting unit configured to perform dot position correction in a sub scanning direction by controlling light emission of the light source unit that includes plural main light sources and plural sub light sources that are configured to scan the light beams along differing scanning lines;
wherein light emitting timings of the main light sources and the sub light sources are based on the pixel clock generated by the pixel clock generating unit.

According to another embodiment of the present invention, a color imaging apparatus is provided that forms a color image by overlaying plural images in different colors, the color imaging apparatus including:
a dot position correcting apparatus configured to perform dot position correction on the images in the different colors using dot position deviation information pertaining to an image of a predetermined color of the different colors as a reference, the dot position correcting apparatus including
a pixel clock generating unit that includes
a high frequency clock generating unit that generates a high frequency clock;
a control data generating unit that generates first control data and second control data based on phase data representing a pixel clock phase shift amount and a status signal representing a pixel clock status;
a first clock generating unit that generates a first clock based on the high frequency clock and the first control data;
a second clock generating unit that generates a second clock based on the high frequency clock and the second control data; and
a clock selecting unit that outputs one of the first clock and the second clock as a pixel clock;
wherein the first clock generating unit includes a first detecting unit that detects a transition of the first clock, a first control signal generating unit that generates a first control signal based on an output of the first detecting unit and the first control data, and a first signal transitioning unit that transitions a signal at a first transition timing of the high frequency clock based on the first control signal and outputs the transitioned signal as the first clock;
a main scanning direction dot position correcting unit configured to perform dot position correction with respect to a main scanning direction based on the pixel clock phase shift amount of the pixel clock generated by the pixel clock generating unit; and
a sub scanning direction dot position correcting unit configured to perform dot position correction in a sub scanning direction by controlling light emission of a light source unit that includes plural main light sources and plural sub light sources that are configured to scan light along differing scanning lines;
wherein light emitting timings of the main light sources and the sub light sources are based on the pixel clock generated by the pixel clock generating unit.

According to another embodiment of the present invention, a color imaging apparatus is provided that includes:
plural of imaging systems for plural different colors, each of the imaging systems including
a surface emitting laser having plural main light sources and plural sub light sources which main light sources and sub light sources are arranged within a same chip and are configured to scan light along differing scanning lines; and
a dot position correcting apparatus including
a pixel clock generating unit that includes
a high frequency clock generating unit that generates a high frequency clock;
a control data generating unit that generates first control data and second control data based on phase data representing a pixel clock phase shift amount and a status signal representing a pixel clock status;

a first clock generating unit that generates a first clock based on the high frequency clock and the first control data;

a second clock generating unit that generates a second clock based on the high frequency clock and the second control data; and a clock selecting unit that outputs one of the first clock and the second clock as a pixel clock;

wherein the first clock generating unit includes a first detecting unit that detects a transition of the first clock, a first control signal generating unit that generates a first control signal based on an output of the first detecting unit and the first control data, and a first signal transitioning unit that transitions a signal at a first transition timing of the high frequency clock based on the first control signal and outputs the transitioned signal as the first clock;

a main scanning direction dot position correcting unit configured to perform dot position correction with respect to a main scanning direction based on the pixel clock phase shift amount of the pixel clock generated by the pixel clock generating unit; and a sub scanning direction dot position correcting unit configured to perform dot position correction in a sub scanning direction by controlling light emission of the surface emitting laser;

wherein light emitting timings of the main light sources and the sub light sources are based on the pixel clock generated by the pixel clock generating unit.

According to another embodiment of the present invention, a tandem color imaging apparatus is provided that is configured to form an image by scanning light deflected by a deflector on plural scanning media using a guide unit configured to guide the deflected light to the scanning media, the tandem color imaging apparatus including:

plural imaging systems for plural different colors, each of the imaging systems having a dot position correcting apparatus including a pixel clock generating unit that includes a high frequency clock generating unit that generates a high frequency clock;

a control data generating unit that generates first control data and second control data based on phase data representing a pixel clock phase shift amount and a status signal representing a pixel clock status;

a first clock generating unit that generates a first clock based on the high frequency clock and the first control data;

a second clock generating unit that generates a second clock based on the high frequency clock and the second control data; and a clock selecting unit that outputs one of the first clock and the second clock as a pixel clock;

wherein the first clock generating unit includes a first detecting unit that detects a transition of the first clock, a first control signal generating unit that generates a first control signal based on an output of the first detecting unit and the first control data, and a first signal transitioning unit that transitions a signal at a first transition timing of the high frequency clock based on the first control signal and outputs the transitioned signal as the first clock;

a main scanning direction dot position correcting unit configured to perform dot position correction with respect to a main scanning direction based on the pixel clock phase shift amount of the pixel clock generated by the pixel clock generating unit; and a sub scanning direction dot position correcting unit configured to perform dot position correction in a sub scanning direction by controlling light emission of a light source unit including plural main light sources and plural sub light sources that are configured to scan light along differing scanning lines;

wherein light emitting timings of the main light sources and the sub light sources are based on the pixel clock generated by the pixel clock generating unit.

It is noted that although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing dates of Japanese Patent Application No. 2005-180020 filed on Jun. 21, 2005, Japanese Patent Application No. 2005-195442 filed on Jul. 4, 2005, and Japanese Patent Application No. 2005-309244 filed on Oct. 25, 2005, the entire contents of which are hereby incorporated by reference.

What is claimed is:

1. An optical scanning apparatus that scans light including image information on a scanning object and forms an image on the scanning object, comprising:

a light source unit including a plurality of light sources, said plurality of light sources including a plurality of main light sources that are used to form a plurality of main pixels on the scanning object according to the image information, and a group of auxiliary light sources, at least one of the auxiliary light sources is used both (1) to correct a positional deviation with respect to a sub scanning direction of at least one main pixel of the main pixels when an amount of the positional deviation of the main pixel is greater than or equal to a single pixel size and (2) to scan the scanning object such that, when said at least one of the auxiliary light sources is driven in conjunction with one of the main light sources, a resultant position of a spot on the scanning object is shifted between a first position illuminated by said at least one main pixel and a second position illuminated by said at least one of the auxiliary light sources to produce a shifted pixel position on the scanning object to correct said positional deviation; and a signal generating circuit configured to generate an auxiliary light source control signal for the auxiliary light source based on positional deviation information pertaining to the positional deviation of the main pixel with respect to the sub scanning direction, the auxiliary light source control signal being used to correct the positional deviation of the main pixel that is greater than or equal to the single pixel size, wherein the auxiliary light source control signal is generated to control the auxiliary light source to emit light to be scanned on the scanning object, wherein said plurality of light sources further include at least one sub light source, and the signal generating circuit is configured to generate a sub light source control signal for the sub light source based on the positional deviation information pertaining to the positional deviation of the main pixel with respect to the sub scanning direction, the sub light source control signal being generated when the amount of the positional deviation of the main pixel is less than the single pixel size, said plurality of light sources are two-dimensionally arranged in the sub scanning direction and a main scanning direction, said plurality of light sources are arranged equidistant from each other with respect to the sub scanning direction, the main light sources are arranged to be adjacent to at least one of the sub light source and the auxiliary light source with respect to the sub scanning direction, a number of the sub light source is arranged between two main light sources of the main light sources which two main light sources are juxtaposed to each other with respect to the sub scanning direction, said number being selected from a group of numbers one, two, and three, and an auxiliary light source is separated by at least one pixel from said main light sources.

2. The optical scanning apparatus as claimed in claim 1, wherein said plurality of light sources are two-dimensionally arranged in the sub scanning direction and a main scanning direction, and the signal generating circuit is configured to generate a plurality of main light source control signals for the main light sources based on the image information.

3. The optical scanning apparatus as claimed in claim 1, wherein a number of the auxiliary light sources is determined based on an extent of positional deviation with respect to the sub scanning direction of light irradiated from the main light sources.

4. The optical scanning apparatus as claimed in claim 1, wherein the light source unit corresponds to a surface-emitting laser having the light sources arranged in a same chip.

* * * * *